(12) United States Patent
Saitoh

(10) Patent No.: US 9,303,764 B2
(45) Date of Patent: Apr. 5, 2016

(54) TRANSMISSION APPARATUS, SHIFT MECHANISM, AND VEHICLE

(71) Applicant: YAMAHA HATSUDOKI KABUSHIKI KAISHA, Iwata-shi, Shizuoka (JP)

(72) Inventor: Tetsushi Saitoh, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/570,069

(22) Filed: Dec. 15, 2014

(65) Prior Publication Data

US 2015/0176706 A1 Jun. 25, 2015

(30) Foreign Application Priority Data

Dec. 19, 2013 (JP) ................................. 2013-262653

(51) Int. Cl.
*F16H 63/18* (2006.01)
*F16H 63/14* (2006.01)
*F16H 63/38* (2006.01)

(52) U.S. Cl.
CPC ................ *F16H 63/38* (2013.01); *F16H 63/18* (2013.01); *B60Y 2400/414* (2013.01); *Y10T 74/20177* (2015.01)

(58) Field of Classification Search
CPC ......... F16H 63/14; F16H 63/18; F16H 63/16; F16H 2063/202; F16H 2200/0052; F16H 59/04; F16H 59/041; F16H 59/042
USPC .......... 74/335, 337.5, 473.21, 473.36, 473.37
See application file for complete search history.

(56) References Cited

U.S. PATENT DOCUMENTS

| 3,421,384 | A | * | 1/1969 | Okamoto | F16H 63/14 74/337.5 |
| 4,491,031 | A | * | 1/1985 | Ooka | F16H 63/18 74/337.5 |
| 7,600,446 | B2 | * | 10/2009 | Mizuno | F16H 63/18 340/456 |
| 7,752,936 | B2 | * | 7/2010 | Kobayashi | B60W 10/02 74/337.5 |
| 8,387,477 | B2 | * | 3/2013 | Ieda | F16H 63/14 74/335 |
| 2009/0205455 | A1 | * | 8/2009 | Kosugi | F16H 63/18 74/473.21 |
| 2013/0247703 | A1 | * | 9/2013 | Ogasawara | F16H 59/04 74/473.21 |

FOREIGN PATENT DOCUMENTS

JP 06-123355 A 5/1994

* cited by examiner

*Primary Examiner* — Ha D Ho
*Assistant Examiner* — Jude Agendia
(74) *Attorney, Agent, or Firm* — Keating and Bennett, LLP

(57) ABSTRACT

A transmission apparatus includes a plurality of cam grooves on a peripheral surface to move shift forks, a shift cam configured to change a rotation position from a neutral position to a maximum speed position through a first speed position, and a shift mechanism configured to intermittently rotate the shift cam in response to a transmission operation and to hold the shift cam at each position from the neutral position and the first speed position to the maximum speed position. The shift mechanism holds the shift cam at a rotation position in which a rotation angle between the neutral position and the first speed position is the same as a rotation angle between the first speed position and a second speed position, wherein a rotation angle between the maximum speed position and the neutral position is smaller than the rotation angle between the neutral position and the first speed position.

5 Claims, 38 Drawing Sheets

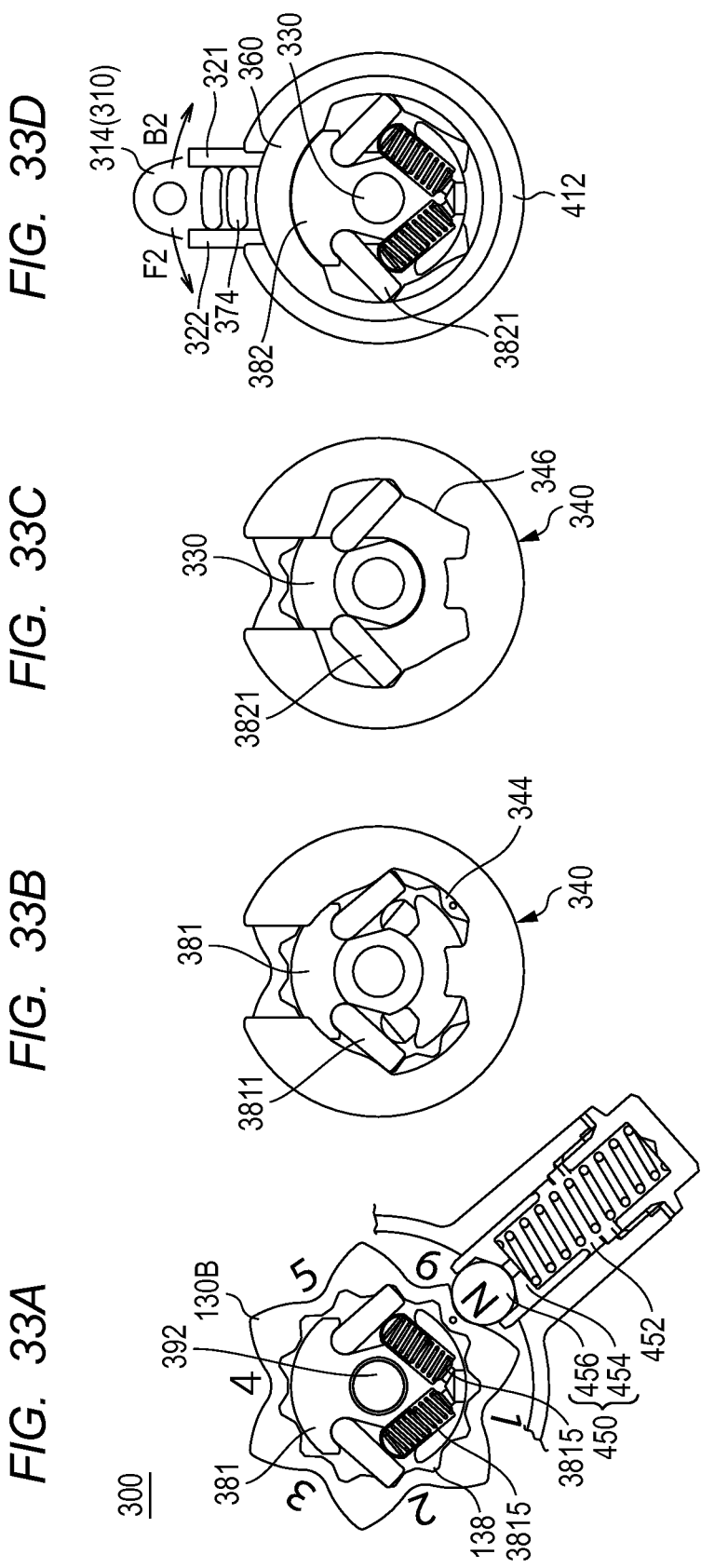

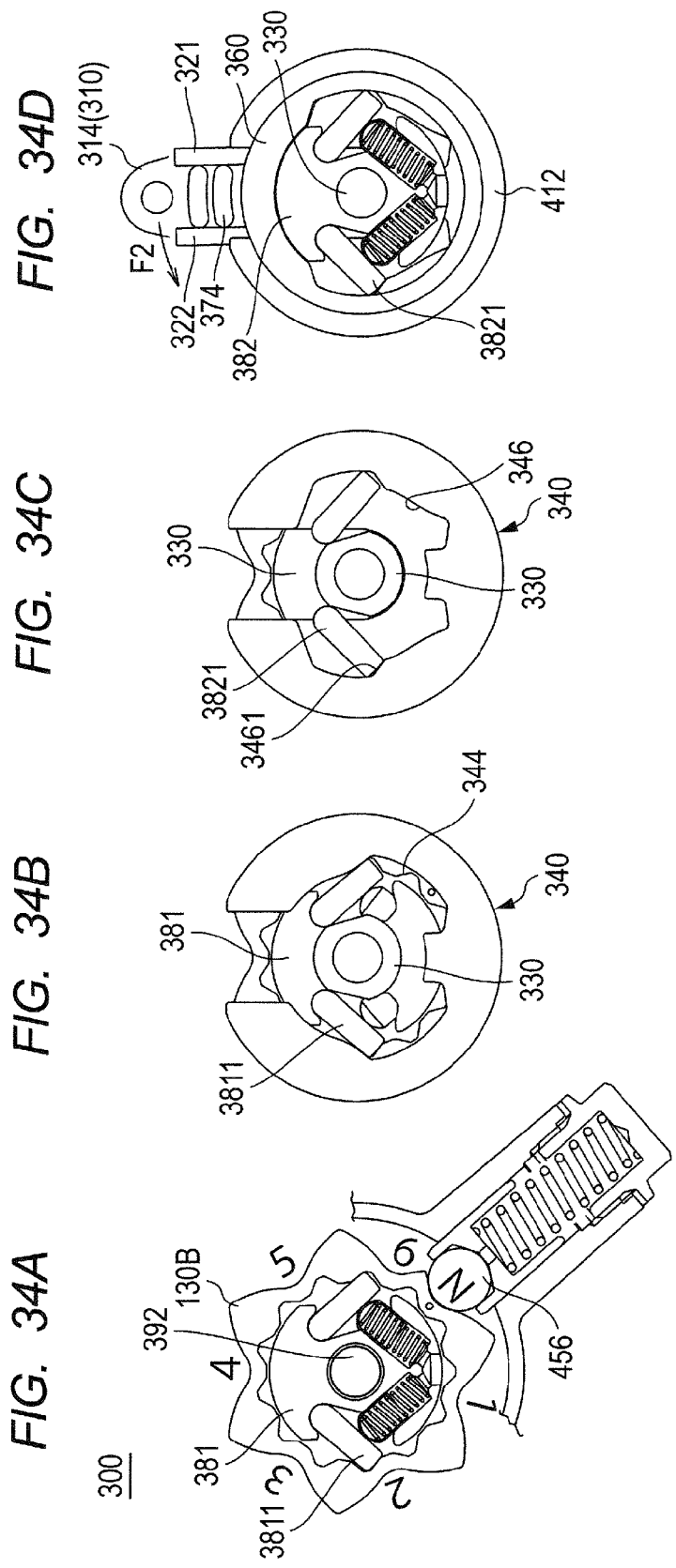

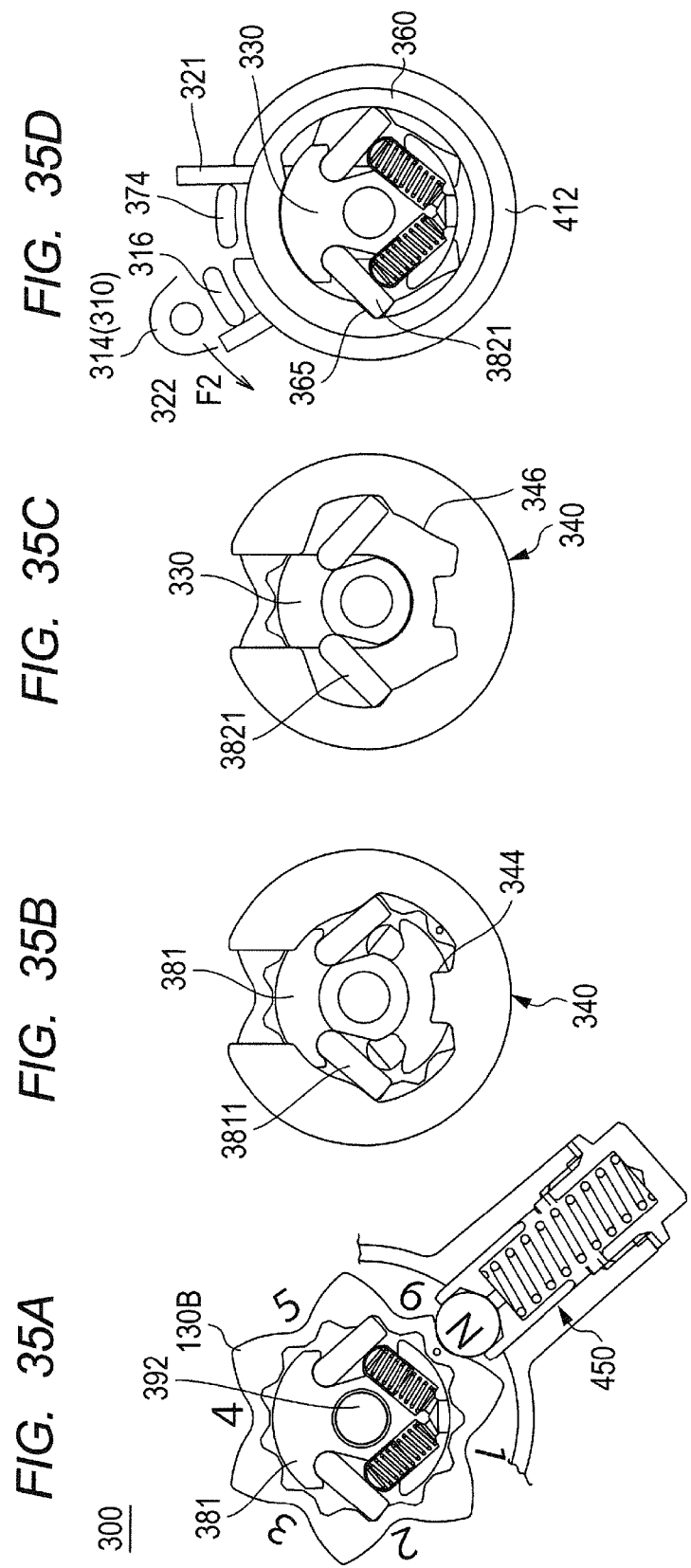

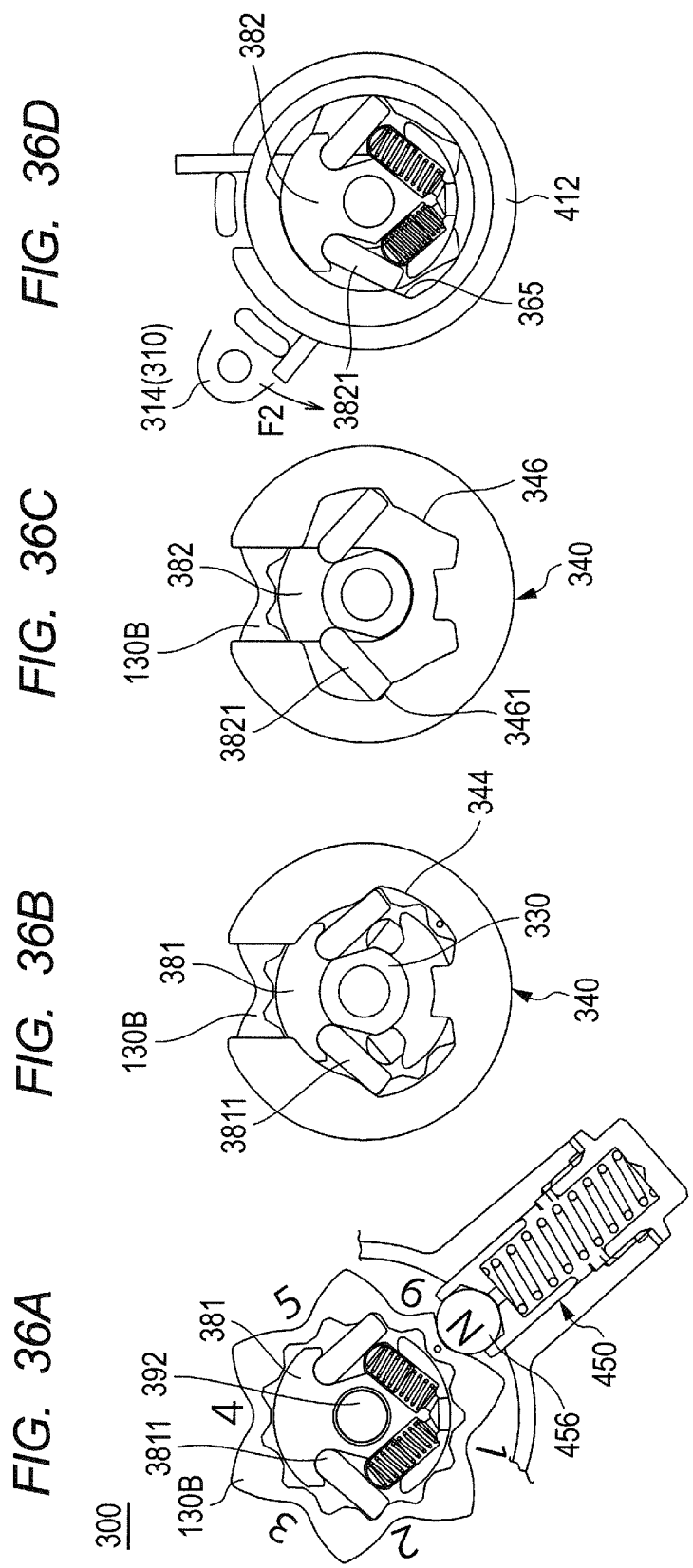

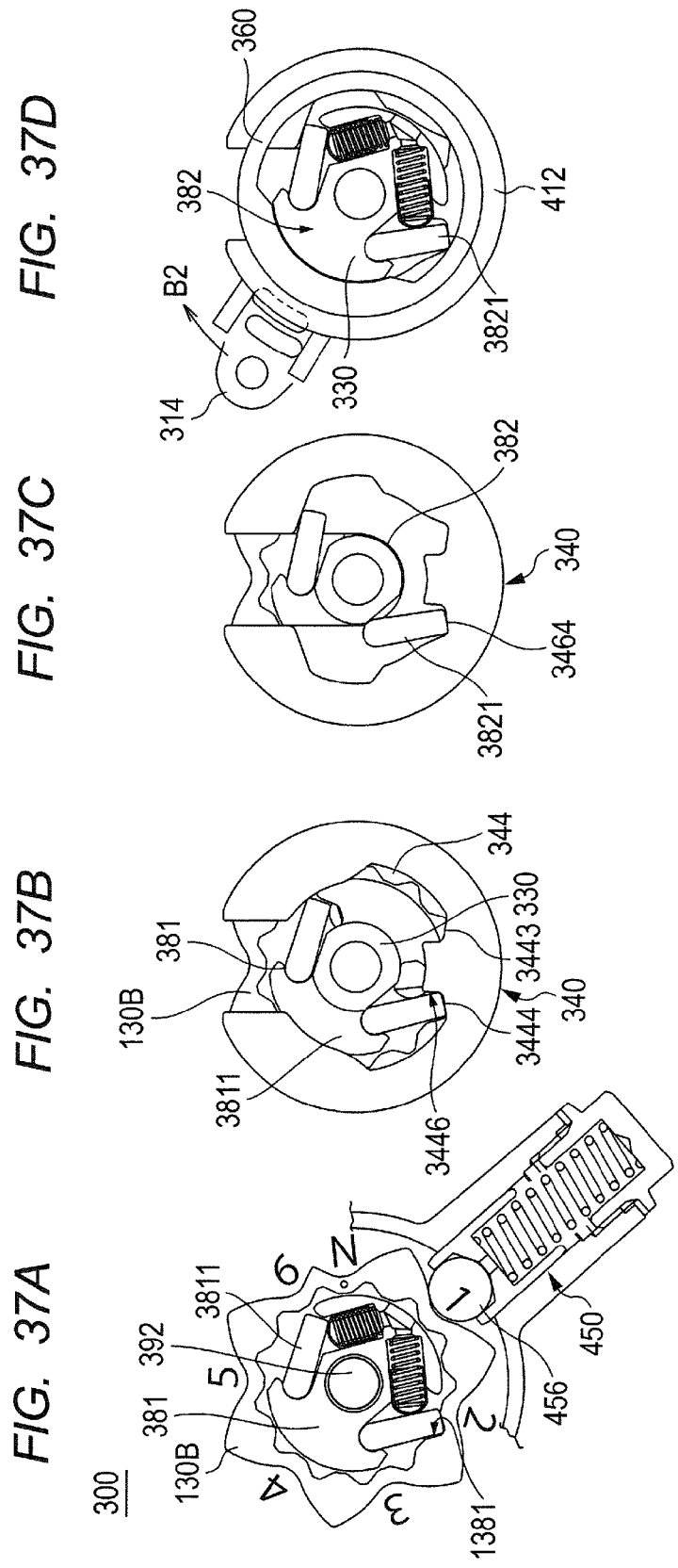

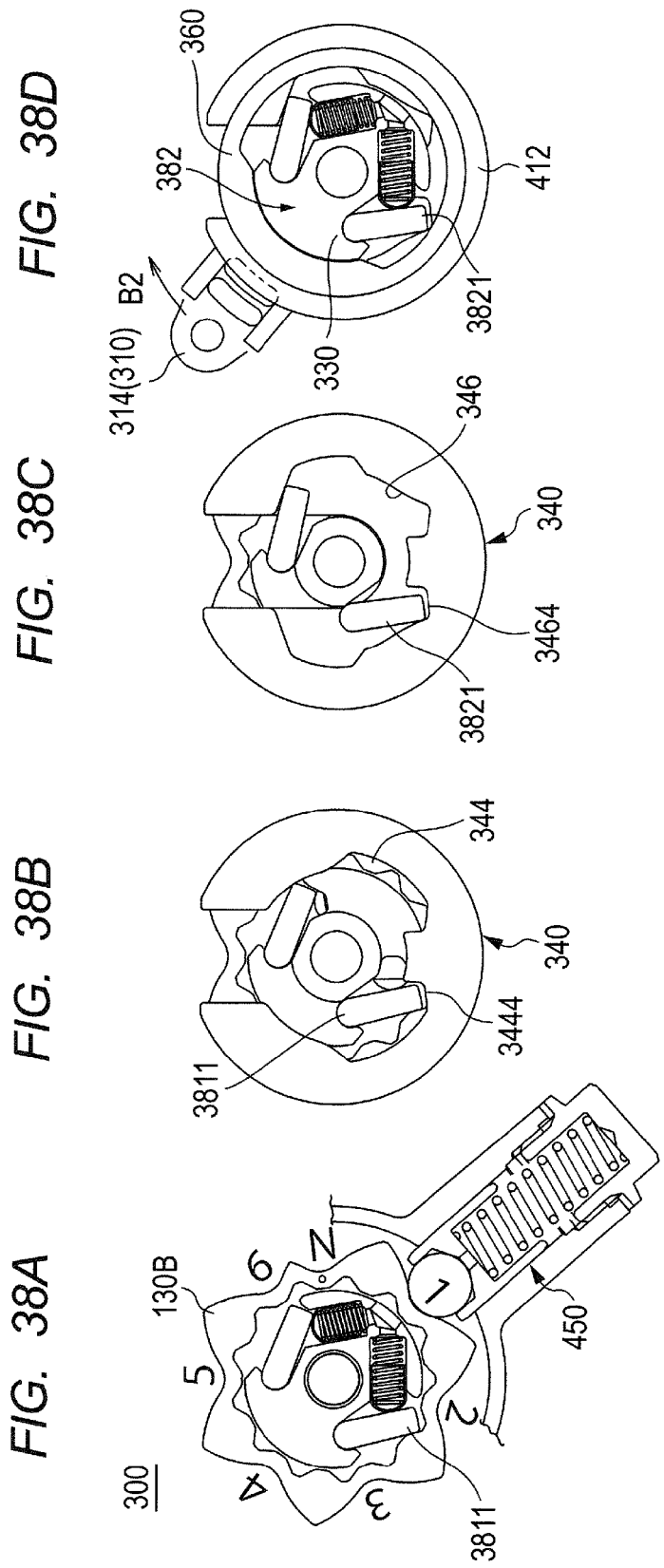

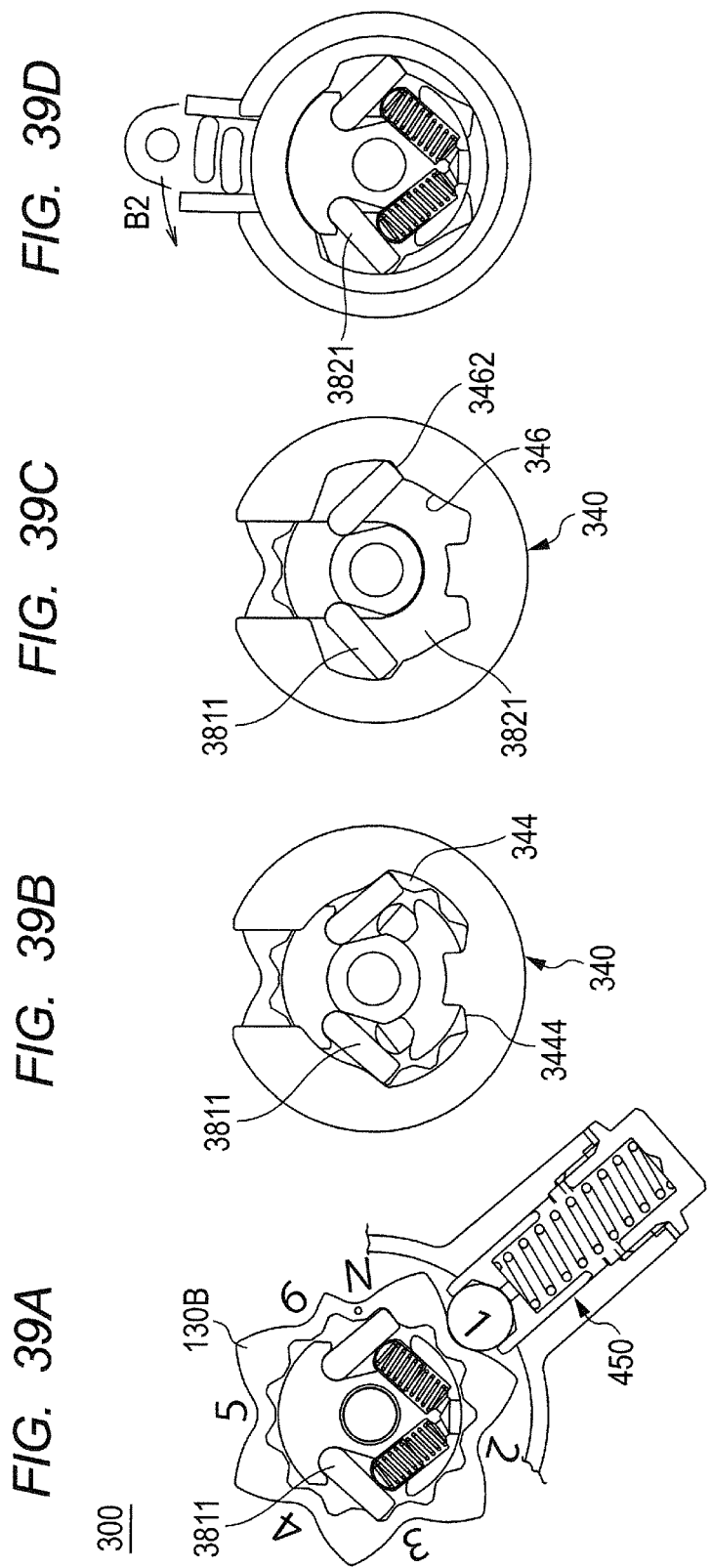

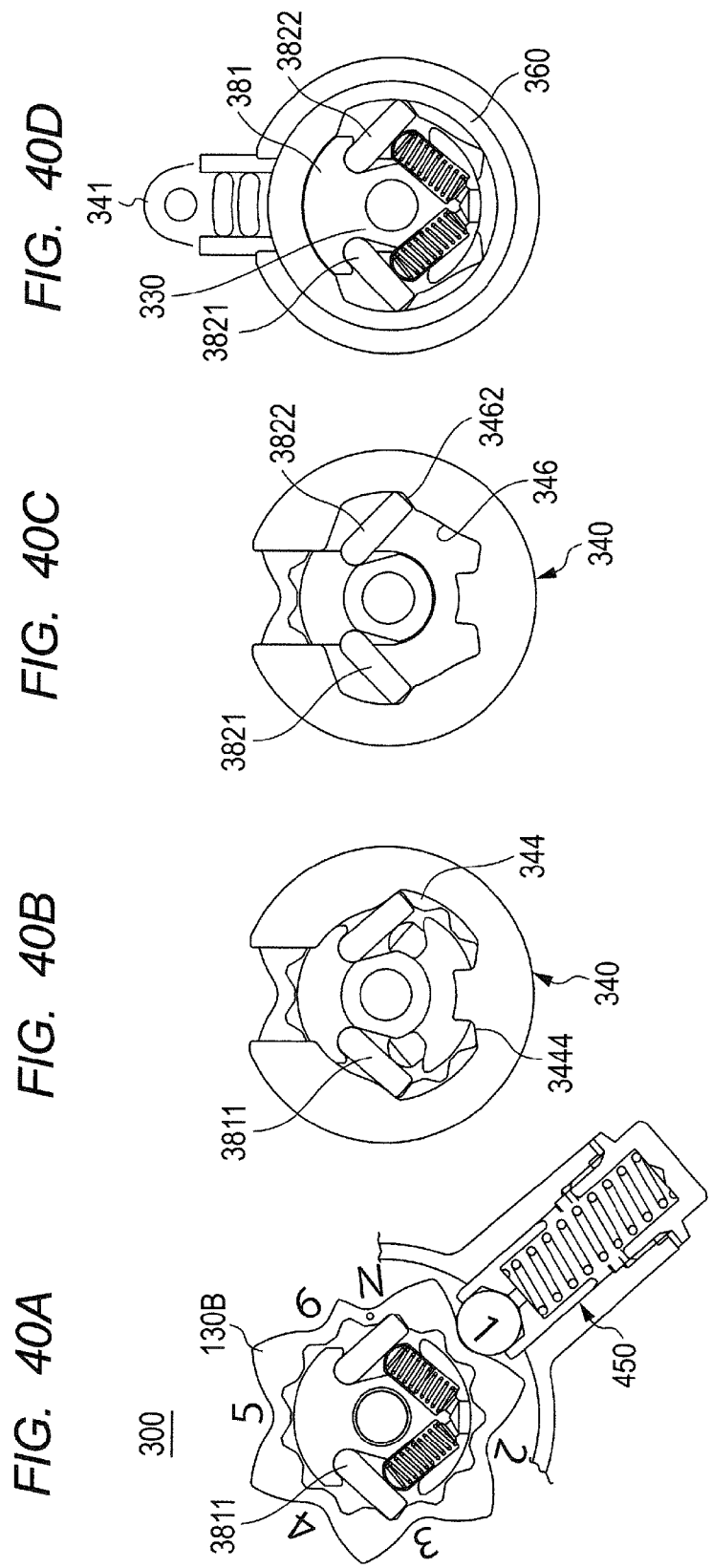

TRANSMISSION APPARATUS, SHIFT MECHANISM, AND VEHICLE

CROSS REFERENCE TO RELATED APPLICATIONS

This application is entitled and claims the benefit of Japanese Patent Application No. 2013-262653, filed on Dec. 19, 2013, the disclosure of which including the specification, drawings and abstract is incorporated herein by reference in its entirety.

BACKGROUND OF THE INVENTION

1. Field of the Invention

The present invention relates to a shift mechanism as well as a vehicle and a motorcycle including the shift mechanism, and particularly, to a transmission apparatus, a shift mechanism, and a vehicle including the shift mechanism used in an Automated Manual Transmission (AMT) apparatus.

2. Description of the Related Art

An example of a known transmission mechanism of a motorcycle includes an electronic control transmission, or so-called AMT, with automated clutch operation and automatic control of shift operation based on Manual Transmission (MT). In the AMT, manipulation of a shift switch by hand indicates a shift-up or a shift-down of multistage transmission gears and an actuator of a transmission is driven according to the indication to automatically perform the shift change operation (changing a gear stage in a transmission apparatus).

To change the gear stage in the AMT, the actuator drives a shift mechanism in the MT to intermittently turn a shift cam through the shift mechanism. The intermittent turning of the shift cam moves a shift fork in a gear shaft direction of the transmission along a groove provided on the periphery of the shift cam to rearrange the gear dog by a tip of the shift fork to change the gear to a predetermined gear stage.

Particularly, in the shift operation in the MT of a motorcycle, the rider operates a shift pedal (also called a change pedal) by foot to vertically move the shift pedal to input an operation to the shift mechanism. In this type of shift mechanism, a first speed gear stage is set as a gear stage corresponding to an end of the operation in the shift-down direction. This is to prevent the traveling posture of the vehicle from becoming unstable after involuntary loss of driving force as the gear stage of the transmission apparatus is switched to neutral when an excessive operation in the shift-down direction is accidentally performed. Specifically, a neutral position is set between a first speed gear position and a second speed gear position in the turning angle of the shift cam, and the first speed gear position is set at the end on the lower gear side. In this manner, the gear positions in the turning angle of the shift cam are set in the order of first speed, neutral, second speed, third speed, . . . , and sixth speed (top gear), from the end on the lowest gear side in the shift mechanism. This will be called a bottom-low shift pattern.

In a motorcycle of the MT including the shift mechanism of the bottom-low shift pattern, the rider performs the shift change by substantially the same operation in the operations of the shift-up from first speed to second speed, from second speed to third speed, and in other shift-up operations. Similarly, the rider performs the shift change by substantially the same operation in the shift-down from second speed to first speed, third speed to second speed, and in other shift-down operations.

Therefore, in a shift cam used for the bottom-low shift mechanism, the phase angle between the first speed gear position and the second speed gear position is set substantially at the same angle as the phase angle between the second speed gear position and the third speed gear position or the phase angle between other adjacent gear positions. In this manner, the rider performs the operation without particularly recognizing the gear change between the first speed and the second speed from the gear change between other gear positions.

In the shift mechanism including the bottom-low shift pattern, the neutral position in the shift cam is provided in the phase substantially at the center between the first speed gear position and the second speed gear position. As a result, the turning angle of the shift cam from the first speed gear position to the neutral position or from the second speed gear position to the neutral position is substantially one-half (½) of the turning angle of the shift cam between the second speed gear position and the third speed gear position or in other shift changes.

In other words, when the motorcycle of the MT including the bottom-low shift mechanism is driven, the amount of operation (turning angle of the shift cam) in the operation of switching the gear to neutral (shift change from the first speed gear position to the neutral position or from the second speed gear position to the neutral position) is substantially one-half of the shift change between other gear stages, and the position easily moves to the second speed or first speed gear position beyond the neutral position. Therefore, the rider needs to cautiously and slowly operate the shift pedal (input section of the operation drive in the transmission mechanism of MT) and be careful not to turn the shift cam too much.

Meanwhile, it is desirable in the AMT to set constant feed angles of the shift cam for each stage transmission, i.e., angles defined by cam phase holding portions of the index cam between any gear stages including the neutral position. This is because the AMT is configured to perform shift change operations by driving the shift mechanism by the actuator and intermittently turning the shift cam through an intermittent turn mechanism, and the drive and control of the actuator, the rotation and braking of the shift cam, and holding of the phase are simplified. Furthermore, this sets a constant time and stabilizes the time required by the AMT for the shift change in order to provide a transmission operation that the rider can rely on.

In the AMT, the gear stage currently set in the shift mechanism and used for the drive in the transmission mechanism is determined from information of a sensor or the like used in the vehicle, and traveling of the vehicle is further determined to perform an interlock control in which the gear stage of the transmission mechanism is not switched to neutral during traveling or the like. The interlock control prevents the traveling posture of the vehicle from becoming unstable after an involuntary loss of the driving force as the gear stage is switched to neutral when the rider accidentally performs an excessive operation in the shift-down direction without using the mechanical bottom-low system in the shift mechanism.

Therefore, in the AMT, the neutral position is mechanically set at the end on the lowest gear side in the shift mechanism, and first speed, second speed, . . . , and sixth speed (top gear) are sequentially set from there to the neutral position at the end of the low gear side. This will be called a bottom-neutral shift pattern. Therefore, in the shift cam used for the shift mechanism including the bottom-neutral shift pattern, the rotation angle set between the neutral position and the first speed gear position is substantially the same angle as the rotation angle between the first speed gear position and the second speed gear position or between other adjacent gear positions.

An example of a structure that holds the shift cam at a predetermined phase includes a transmission apparatus disclosed in Japanese Patent Application Laid-Open No. 6-123355. In Japanese Patent Application Laid-Open No. 6-123355, concave portions corresponding to gear stages are provided on a peripheral cam surface of an index cam at predetermined intervals in the circumferential direction, and a follower (positioning roller) abuts and presses against the cam surface including the concave portions. Through the operation in Japanese Patent Application Laid-Open No. 6-123355, the phase of the index cam and the shift cam linked together is converged to and engaged with the concave portions of the cam surface. In Japanese Patent Application Laid-Open No. 6-123355, the shift cam is rotated by input of an operation, and the follower is engaged with the concave portions provided at predetermined intervals (phase angles). This achieves one gear stage change (shift cam feed), in which the feed angle (angle defined by cam phase holding portions of index cam) in intermittent turns of the shift cam is a predetermined angle.

The shift mechanism of Japanese Patent Application Laid-Open No. 6-123355 is a shift mechanism including the bottom-low shift pattern described above. More specifically, among the concave portions provided on the periphery of the index cam at intervals in the circumferential direction in the shift mechanism, the concave portion corresponding to the neutral position (neutral concave portion) is provided at the center phase between predetermined concave portions (concave portion corresponding to the first speed gear position and concave portion corresponding to the second speed gear position).

In the AMT, there is a demand to control transmission gears with six or more stages in the shift mechanism including the bottom-neutral shift pattern, instead of the bottom-low shift mechanism.

As described above, the AMT is configured to rotate the shift cam by a predetermined angle to perform the gear shift. When the AMT includes a bottom-neutral shift mechanism corresponding to a six-stage transmission, the peripheral cam surface of the index cam includes seven concave portions (index positions) in total at equal intervals, including six concave portions corresponding to gear positions of six stages and one concave portion corresponding to neutral. In this case, seven portions are provided at equal intervals on the peripheral cam surface of the index cam to define the concave portions.

Meanwhile, the feed angle of one intermittent turn of the shift cam through the index cam is smaller than the feed angle (e.g., 60 degrees) of one intermittent turn in a six-speed MT including the bottom-low shift mechanism. Therefore, the following problem occurs if the outer diameter (diameter) of the shift cam and the distance of the movement of the shift fork in the gear shaft direction in the engagement of the dog of each transmission gear are the same as those of the six-speed MT including the bottom-low shift mechanism. More specifically, the lead angle of the groove to move the shift fork provided on the peripheral surface of the shift cam in the gear shaft direction in the AMT is an angle that is more acute than in the shift cam used in the bottom-low six-speed MT. Therefore, when the bottom-neutral shift mechanism corresponding to the six-stage transmission is applied to the AMT, the torque to be provided to the shift cam needs to be increased to quickly rotate the shift cam in the transmission.

SUMMARY OF THE INVENTION

Preferred embodiments of the present invention provide a transmission apparatus, a shift mechanism, and a vehicle including the shift mechanism that quickly and favorably perform transmission shifts by significantly reducing or preventing an increase in torque to turn a shift cam, even in a bottom-neutral system.

In one preferred embodiment of the present invention, the shift mechanism intermittently rotates a shift cam in response to a transmission operation to hold the shift cam in each phase from a neutral phase corresponding to a neutral position to a maximum speed gear phase corresponding to a maximum speed gear position through a first gear phase corresponding to a first speed gear position. The shift mechanism preferably includes an index cam fixed to one end of the shift cam and configured to rotate integrally with the shift cam to position the shift cam in each of the phases, a drive section configured to rotate the index cam, and a cam phase holding portion configured to hold the rotating shift cam in each of the phases, wherein the index cam includes concave portions on a peripheral portion thereof in order of neutral to a maximum speed gear, that is a top gear, through a first gear in a circumferential direction corresponding to each of the phases. The concave portions are engaged with the cam phase holding portion to converge and to hold the shift cam in a predetermined phase, wherein the concave portions are disposed on the peripheral portion of the index cam so that a rotation angle between the concave portions respectively corresponding to neutral and the first gear is the same as a rotation angle between the concave portions respectively corresponding to the first gear and a second gear, and an angle between the concave portions respectively corresponding to the maximum speed and neutral is smaller than the rotation angle between the concave portions respectively corresponding to neutral and the first gear.

In one preferred embodiment of the present invention, the transmission apparatus includes the shift mechanism described above, and a shift cam including one end to which the index cam of the shift mechanism is fixed, the shift cam including groove portions configured to move shift forks on a peripheral surface thereof, the shift cam configured to rotate integrally with the index cam and to be held by the cam phase holding portion in each of the phases to engage with a dog at a gear position corresponding to each of the phases through the shift forks. A vehicle according to a preferred embodiment of the present invention includes the shift mechanism described above.

In one preferred embodiment of the present invention, the transmission apparatus includes a shift cam including groove portions configured to move shift forks on a peripheral surface thereof and to rotate from a neutral phase corresponding to a neutral position to a maximum speed gear phase corresponding to a maximum speed gear position that is a top gear through a first gear phase corresponding to a first speed gear position to change engagement of a dog corresponding to each phase through the shift forks, and a shift mechanism configured to intermittently rotate the shift cam in response to a transmission operation to hold the phase of the shift cam in each phase for a corresponding transmission stage from neutral and the first speed to the maximum speed, wherein the shift mechanism holds the shift cam in each phase angle, in which a rotation angle between the neutral phase and the first gear phase is the same as a rotation angle between the first gear phase and a second gear phase, and an angle defined by an acute angle between the maximum speed gear phase and the neutral phase is smaller than the rotation angle between the neutral phase and the first gear phase.

According to a preferred embodiment of the present invention, transmission shifts are performed by significantly reducing or preventing an increase in torque to turn a shift cam, even in a bottom-neutral system.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 33A to 33D are diagrams for explaining an operation of a shift mechanism.

FIGS. 34A to 34D are diagrams for explaining an operation of the shift mechanism.

FIGS. 35A to 35D are diagrams for explaining an operation of the shift mechanism.

FIGS. 36A to 36D are diagrams for explaining an operation of the shift mechanism.

FIGS. 37A to 37D are diagrams for explaining an operation of the shift mechanism.

FIGS. 38A to 38D are diagrams for explaining an operation of the shift mechanism.

FIGS. 39A to 39D are diagrams for explaining an operation of the shift mechanism.

FIGS. 40A to 40D are diagrams for explaining an operation of the shift mechanism.

DETAILED DESCRIPTION OF THE PREFERRED EMBODIMENTS

Preferred embodiments of the present invention will now be described in detail with reference to the accompanying drawings.

First Preferred Embodiment

Figure 1:
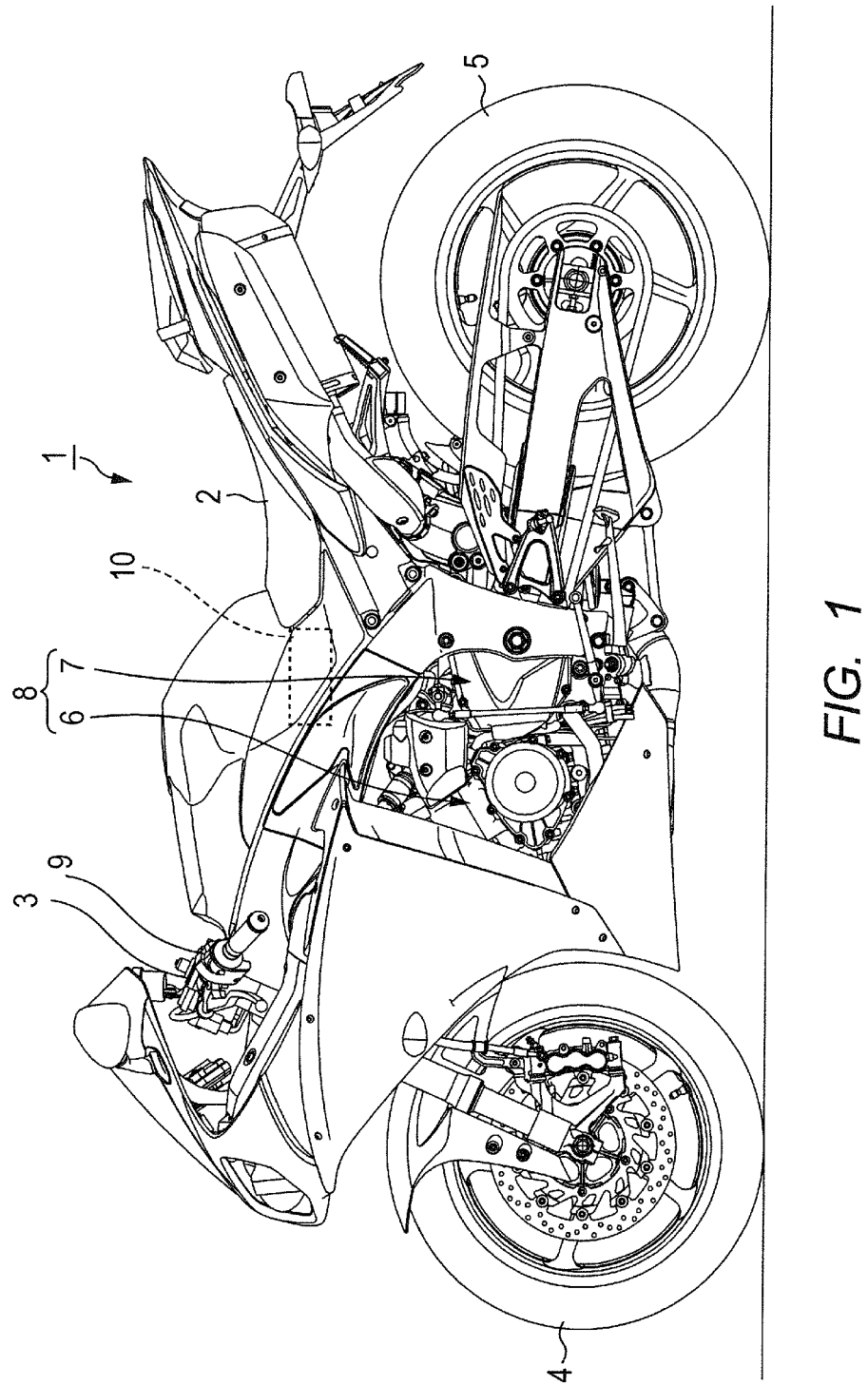
FIG. 1 illustrates a vehicle including a transmission apparatus applying a shift mechanism of a first preferred embodiment of the present invention.
Figure 2:
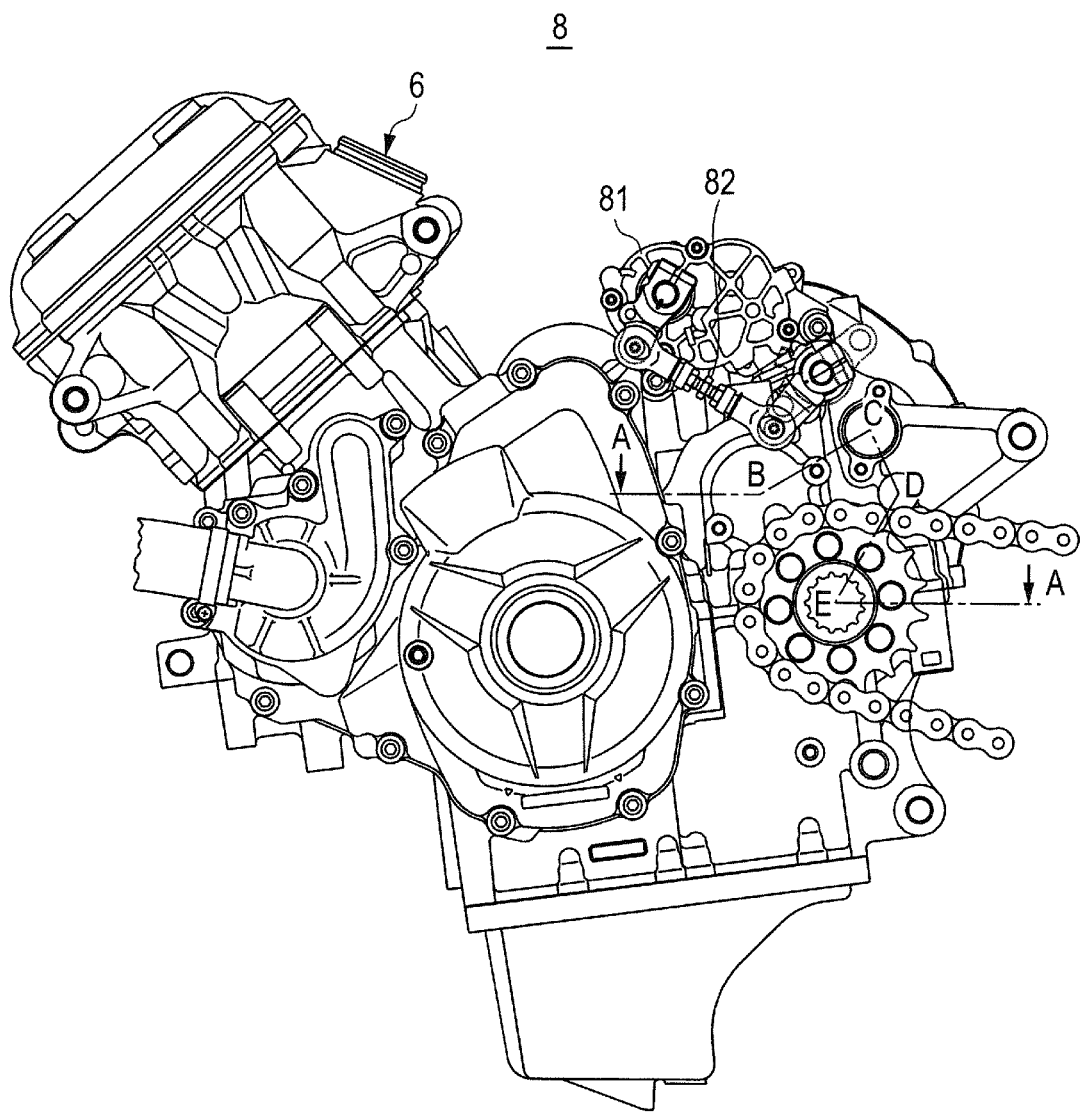
FIG. 2 illustrates a left side and a partially exploded view of an engine unit for explaining the transmission apparatus including the shift mechanism of the first preferred embodiment of the present invention.
Figure 3:
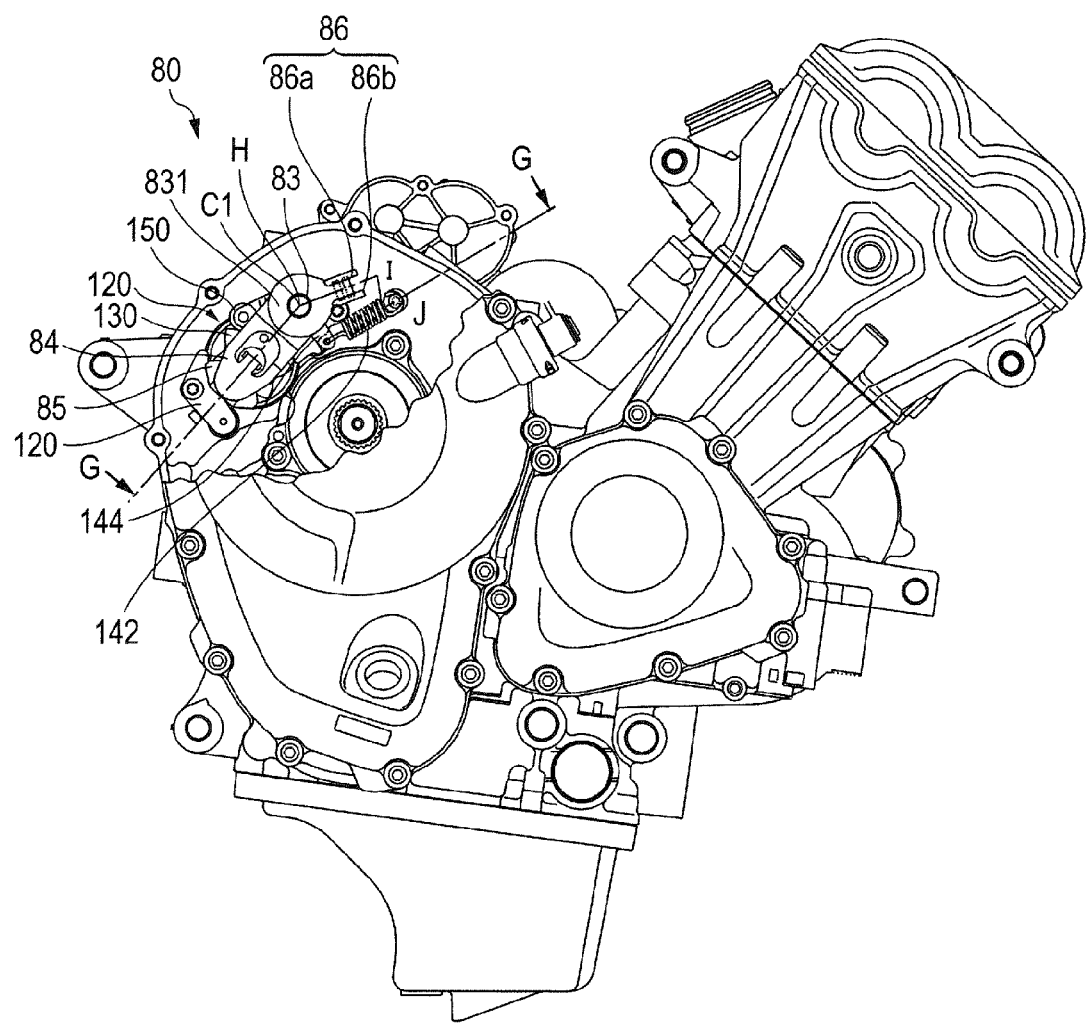
FIG. 3 illustrates a right side surface and a partially exploded view of the engine unit for explaining the transmission apparatus including the shift mechanism of the first preferred embodiment of the present invention.
Figure 4:
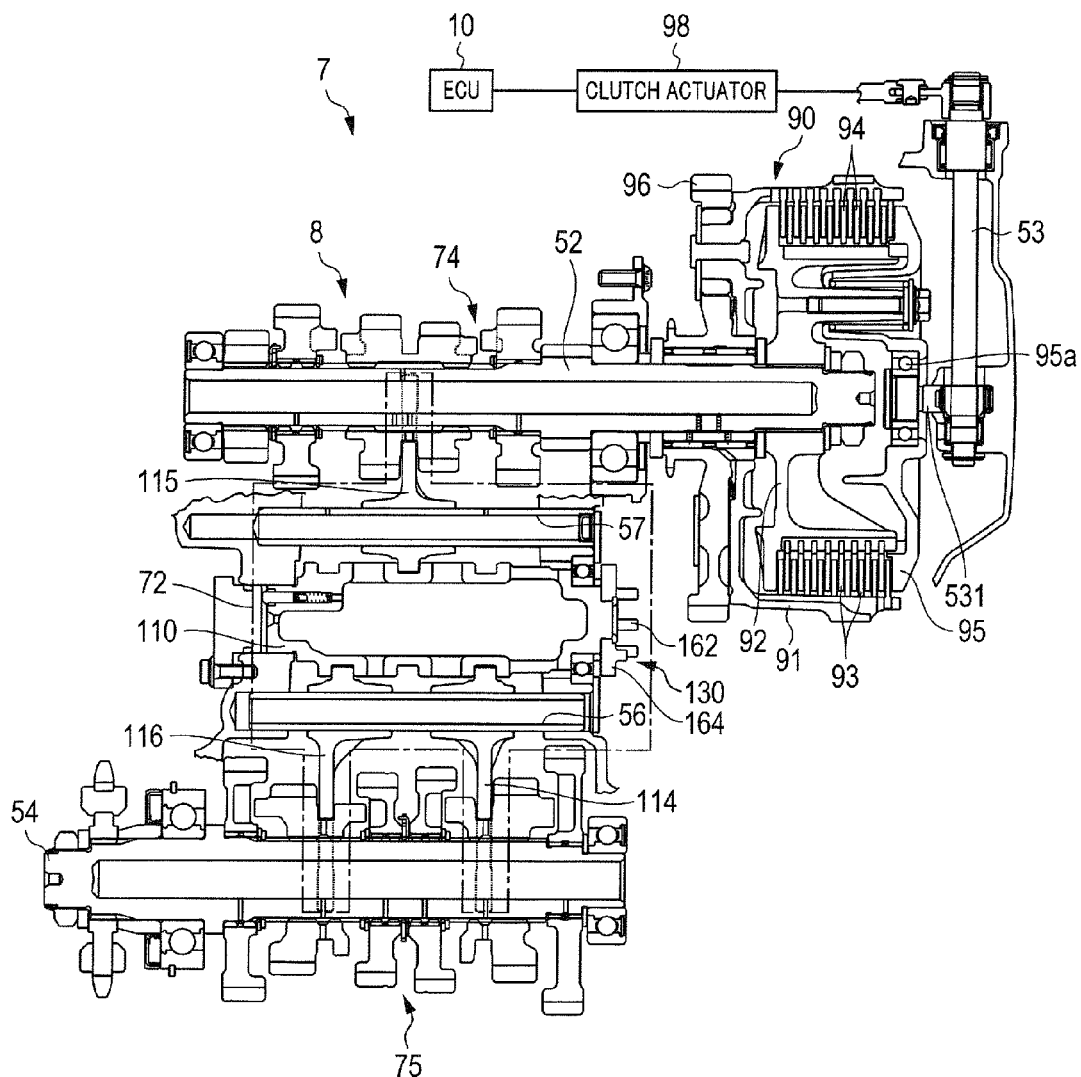
FIG. 4 is a cross-sectional developed view taken along line A-B-C-D-E-A in FIG. 2.
Figure 5:
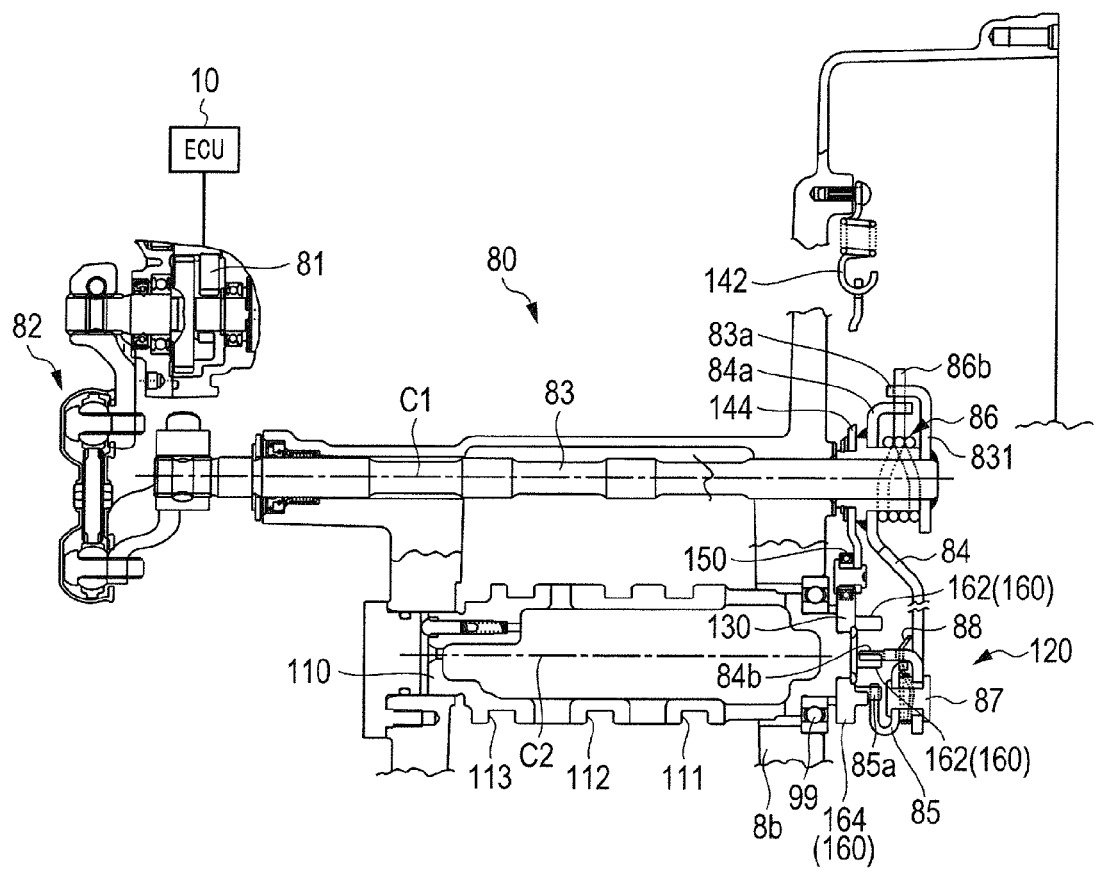
FIG. 5 is a cross-sectional developed view taken along line G-H-I-J-G in FIG. 3.

FIG. 1 illustrates a vehicle provided with a transmission apparatus including a shift mechanism of the first preferred embodiment of the present invention. Vehicle 1 shown in FIG. 1 is preferably a saddle-riding type vehicle on which a rider sits astride seat 2, and is, for example, a motorcycle. FIG. 2 is a left side diagram of an engine unit for explaining the transmission apparatus including the shift mechanism of the first preferred embodiment of the present invention, partially illustrating a state in which a cover lid and the like are removed. FIG. 3 is a right side diagram of the engine unit, partially illustrating the state in which the cover lid and the like are removed. FIG. 4 is a developed view of a cross-section taken along line A-B-C-D-E-A in FIG. 2. FIG. 5 is a developed view of a cross-section taken along line G-H-I-J-G in FIG. 3.

Vehicle 1 shown in FIG. 1 includes handle bar 3; front wheel 4; rear wheel 5; engine unit 8 including engine 6, clutch 90, and transmission mechanism 7; shift switch (transmission operator) 9; ECU (Engine Control Unit) 10; and the like.

Engine unit 8 is connected to rear wheel 5 through a chain or a belt, and a driving force of engine 6 is transmitted from an output shaft of transmission mechanism 7 to rear wheel 5 through the chain or the belt. Transmission mechanism 7 is included in a housing (unit case) of engine unit 8, and one end portion of the output shaft is exposed to the outside from the unit case. Details of transmission mechanism 7 will be described below.

Shift switch 9 is provided on handle bar 3, which is operated by the driver so that engine unit 8 performs a transmission operation. Shift switch 9 includes a shift-up button and a shift-down button (not shown). When the rider presses the shift-up button, shift-up operation information is output to ECU 10. When the rider presses the shift-down button, shift-down operation information is output to ECU 10.

ECU 10 primarily controls operations of each section of vehicle 1, particularly, the drive of engine unit 8. ECU 10 particularly receives operation information of transmission operations from shift switch 9 to control transmission mechanism 7 (see FIGS. 1 and 4) and shift mechanism 80 (see FIGS. 3 and 5) of engine unit 8 to change a transmission gear stage to transmit a driving force. ECU 10, transmission mechanism 7, shift mechanism 80, shift actuator 81, clutch 90, and clutch actuator 98 define a transmission apparatus.

When the rider inputs a shift change request through shift switch 9, ECU 10 starts a transmission control (shift change control). ECU 10 first drives clutch actuator 98 (see FIG. 4) and reduces the torque capacity of clutch 90 (see FIG. 4) to cut off transmission of the driving force to disconnect the clutch. ECU 10 then drives shift actuator 81 (see FIG. 5) to operate transmission mechanism 7, particularly, sequential shift mechanism 72 (see FIG. 4) through shift mechanism 80 and causes transmission mechanism 7 to select a set of transmission gears 74 and 75 (see FIG. 4) corresponding to the request of the rider. ECU 10 then drives clutch actuator 98 again to increase the torque capacity of clutch 90 and restarts transmission of the driving force (connect the clutch).

Transmission mechanism 7 is connected to a crank shaft (not shown) of the engine and changes the torque transmitted from the crank shaft to transmit the torque toward rear wheel 5 (see FIG. 1). Shift mechanism 80 (see FIG. 3) performs variable operations (operations to change the reduction gear ratio) in transmission mechanism 7 through sequential shift mechanism 72 and operates to hold the selected gear stage (reduction gear ratio) until the next variable operation.

In the transmission apparatus, the driving force from engine 6 (see FIG. 1) is transmitted through clutch 90.

Clutch 90 is preferably a multiple disk friction clutch and includes cylindrical clutch housing 91, cylindrical clutch boss 92, a plurality of friction plates 93 and clutch plates 94 that are friction plates, and pressure plate 95.

Clutch 90 includes input gear 96 engaged with the gear of the crank shaft of engine 6. Clutch 90 is not limited to a multiple disk clutch, and for example, clutch 90 may be an automatic centrifugal clutch using a centrifugal weight.

Clutch housing 91 is attached to main shaft 52 and rotates relative to main shaft 52. Friction plates 93 provided in a ring-shaped thin plate configuration are disposed inside of clutch housing 91. A plurality of external teeth are provided on the periphery of friction plates 93, and the external teeth are engaged with a plurality of internal teeth (grooves) extending in the axial direction of main shaft 52 on the inner circumference surface of clutch housing 91. According to this configuration, each friction plate 93 cannot rotate relative to clutch housing 91 and is attached to clutch housing 91 so as to be dislocated in the axial direction of main shaft 52.

An end portion of main shaft 52 is inserted to a base portion of clutch housing 91. A base portion of clutch boss 92 is fixed to the end portion of main shaft 52.

Clutch plates 94 provided in a ring-shaped thin plate configuration are disposed on the periphery of clutch boss 92. A plurality of internal teeth are provided in an internal diameter portion of ring-shaped clutch plates 94 and are engaged with a plurality of external teeth (grooves) extending in the axial direction of main shaft 52 on the peripheral surface of clutch boss 92. As a result, each clutch plate 94 cannot rotate relative to clutch boss 92 and is attached to clutch boss 92 so as to be dislocated in the axial direction of main shaft 52.

Friction plates 93 and clutch plates 94 are alternately disposed in the axial direction of main shaft 52 and pressed against each other to transmit power from clutch housing 91 to clutch boss 92, i.e., from input gear 96 to main shaft 52.

Pressure plate 95 has a substantially disk shape and is configured so as to be dislocated in the axial direction of main shaft 52 relative to clutch boss 92. Rod 531 is configured to turn and is connected to pressure plate 95 through bearing 95a. Clutch actuator 98 moves pressure plate 95 in the axial direction of main shaft 52 through rod 531 of release link 53. Pressure plate 95 moves in the axial direction toward the base end (left side in FIG. 4) of clutch boss 92, and friction plates 93 and clutch plates 94 press against each other. The frictional force generated by pressing connects clutch housing 91 and clutch boss 92 to transmit the driving force (fastening of clutches) from engine 6 to clutch boss 92, i.e., main shaft 52, or to disconnect the driving force (disconnection of clutches).

Clutch actuator 98 is connected to ECU 10, and ECU 10 is programmed or configured to control the drive.

Transmission mechanism 7 is a staged transmission mechanism and includes main shaft 52, output shaft 54 disposed parallel or substantially parallel to main shaft 52, and sequential shift mechanism 72. Sequential shift mechanism 72 includes shift cam 110, shift forks 114, 115, and 116, and guide shafts 56 and 57 that guide the movement of shift forks 114, 115, and 116.

A plurality of transmission gears 74 are mounted on main shaft 52. Meanwhile, a plurality of transmission gears 75 corresponding to transmission gears 74 are mounted on output shaft 54. Transmission mechanism 7 is a so-called always-engaged transmission mechanism that is a mechanism in which a pair of gears in a determined combination are engaged all the time in transmission gears 74 and transmission gears 75.

In transmission mechanism 7, the gear set (transmission gears 74 and 75) that transmits the driving force is selected by the turn of shift cam 110 included in sequential shift mechanism 72. Cam grooves 111, 112, and 113 are provided on the peripheral surface of shift cam 110, and shift forks 114 to 116 are mounted on cam grooves 111 to 113, respectively. Shift forks 114 to 116 are disposed so as to be moved in the axial direction on guide shafts 56 and 57 fixed to the unit case parallel or substantially parallel to the rotation axis of shift cam 110 and are linked to predetermined transmission gears of predetermined transmission gears 74 and 75 of main shaft 52 and output shaft 54.

The predetermined transmission gears of transmission gears 74 and 75 are fixed to main shaft 52 or output shaft 54 in the rotation direction and are moved in the axial direction of main shaft 52 and output shaft 54. The positions of the transmission gears (predetermined transmission gears) in the axial direction are moved through shift forks 114 to 116 by cam grooves 111 to 113 on the peripheral surface of shift cam 110. Therefore, shift forks 114 to 116 move the positions in the axial direction of the predetermined transmission gears linked with shift forks 114 to 116. The gear set to transmit the driving force is selected by engaging the dog of the moved predetermined transmission gear with the dog of a predetermined transmission gear adjacent to the moved predetermined transmission gear, in which the movement in the axial direction is fixed relative to main shaft 52 or output shaft 54, and rotation is possible relative to main shaft 52 or output shaft 54.

In transmission mechanism 7, shift cam 110 rotates to a predetermined phase associated with the shapes of cam grooves 111 to 113 to move predetermined transmission gears 74 and 75 linked with shift forks 114 to 116 in the axial direction of main shaft 52 and output shaft 54. A predetermined gear set to transmit the driving force is selected by the movement of the predetermined transmission gears in the axial direction of main shaft 52 and output shaft 54. In this case, only one predetermined gear set is selected by the shapes of cam grooves 111 to 113. The configuration in which only one gear set is mechanically selected (in any case, a driving force cannot be transmitted to a plurality of gear sets at the same time) will be called sequential shift.

In this manner, a pair of transmission gears (74 and 75) of transmission gears 74 and transmission gears 75 is selected. Specifically, of transmission gears 74 and 75, only a pair of transmission gears 74 and 75 in the gear stages (first speed to sixth speed) corresponding to the phases of shift cam 110 is fixed to main shaft 52 and output shaft 54 by splines through dogs. None of transmission gears 74 and 75 is fixed to main shaft 52 and output shaft 54 in neutral. In this manner, the transmission gear stages (here, neutral and first speed to sixth speed) are determined, and the driving force is transmitted between main shaft 52 and output shaft 54 at a predetermined transmission gear ratio through transmission gears 74 and 75.

As shown in FIG. 5, shift mechanism 80 drives shift cam 110.

Figure 6A:
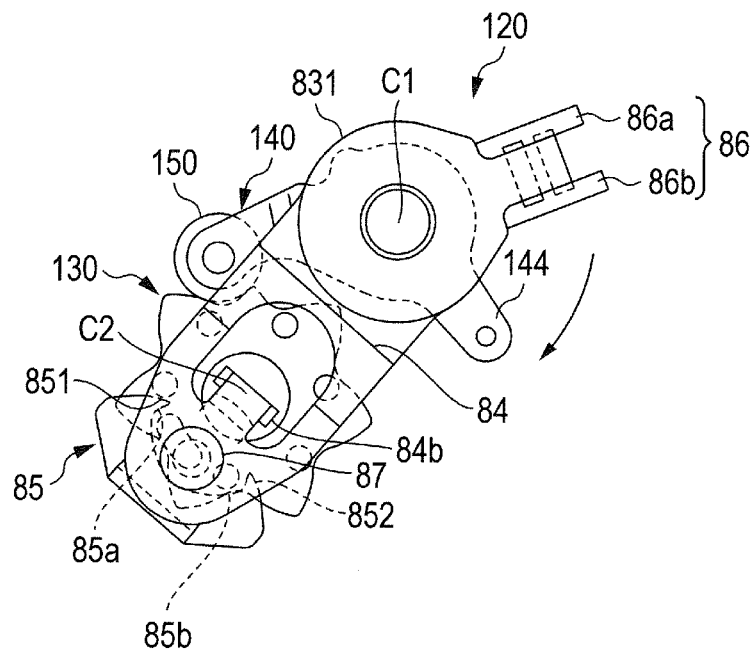
FIGS. 6A and 6B are diagrams for explaining an intermittent feed section of the shift mechanism shown in FIG. 3.
Figure 6B:
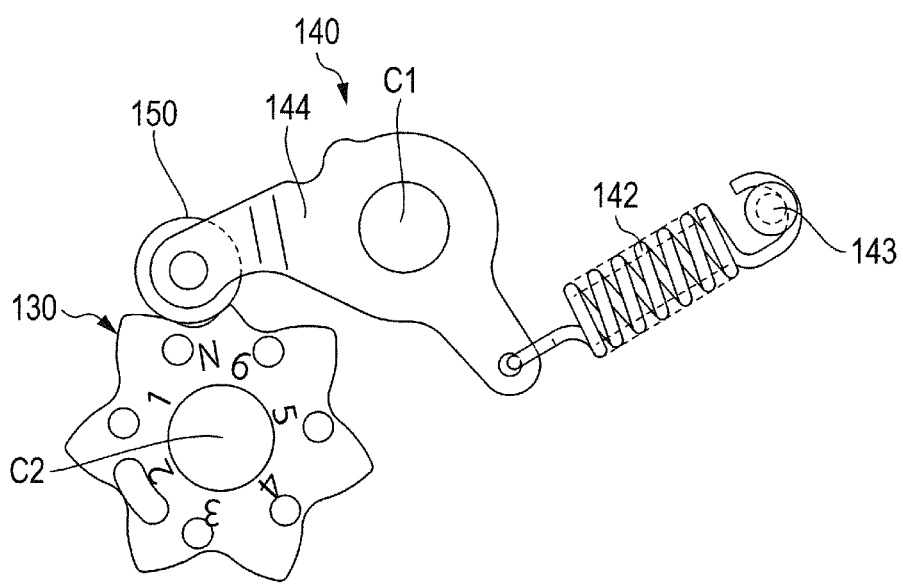

Shift mechanism 80 includes shift rod 82 to transmit the drive of shift actuator 81, shift shaft 83, intermittent feed section 120, and cam phase holding portion 140 (see FIG. 6B).

Shift actuator 81 is driven in shift mechanism 80, and the driving force is transmitted to shift shaft 83 as a rotational force (torque) through shift rod 82.

Shift actuator 81 is connected to ECU 10, and ECU 10 is programmed or configured to control the drive.

Based on a shift change request input to ECU 10 by a rider through the operation of shift switch 9, shift actuator 81 drives a shift change operation corresponding to the shift change request. Specifically, shift actuator 81 rotates, in a predetermined direction, shift shaft 83 that turns and that is attached to the unit case. The predetermined direction during the shift-up of the shift change and the predetermined direction during the shift-down are opposite rotation directions. Shift actuator 81 turns shift shaft 83 by a predetermined turning range.

One end of shift shaft 83 is connected to shift rod 82 through a link, and the other end is connected to shift cam 110 through intermittent feed section 120. Shift shaft 83 rotates to provide a rotational force around the shaft center to shift cam 110 through intermittent feed section 120. Shift shaft 83 turns by a predetermined turning range to drive intermittent feed section 120.

Intermittent feed section 120 transmits the rotational force of shift shaft 83 rotated by the drive of shift actuator 81 to shift cam 110 to intermittently rotate shift cam 110 (rotation by a predetermined angle). The intermittent rotation (rotation by a predetermined angle) will also be called shift cam feed and intermittent feed. Intermittent feed section 120 supports shift cam 110 in the unit case and is disposed outside of wall portion 8b that regulates the position of shift cam 110 in the axial direction (see FIG. 5). Shift cam 110 is inserted to bearing 99 attached to wall portion 8b of the unit case. This enables stable rotation of shift cam 110 around shaft center C2. Cam grooves 111 to 113 set the positions of shift forks 114 to 116 in the axial direction relative to shift cam 110. More specifically, the positions of shift forks 114 to 116 in the axial direction relative to main shaft 52 and output shaft 54 are set through shift cam 110, bearing 99, and wall portion 8b of the unit case.

Figure 7A:
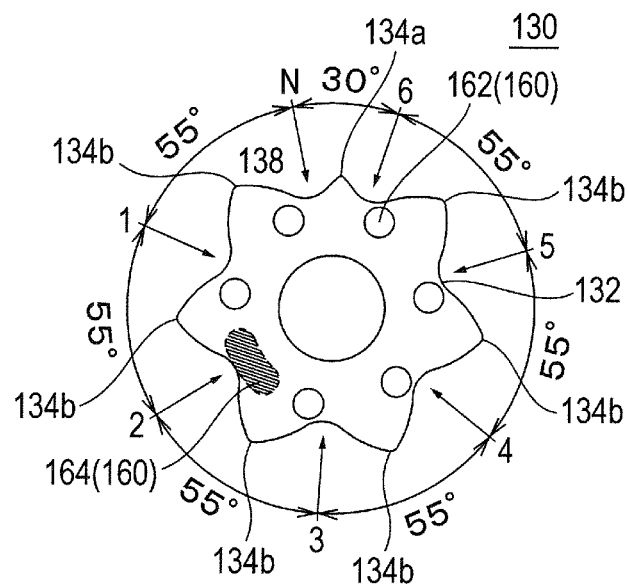
FIGS. 7A and 7B are diagrams for explaining an index cam in FIG. 6A.
Figure 7B:
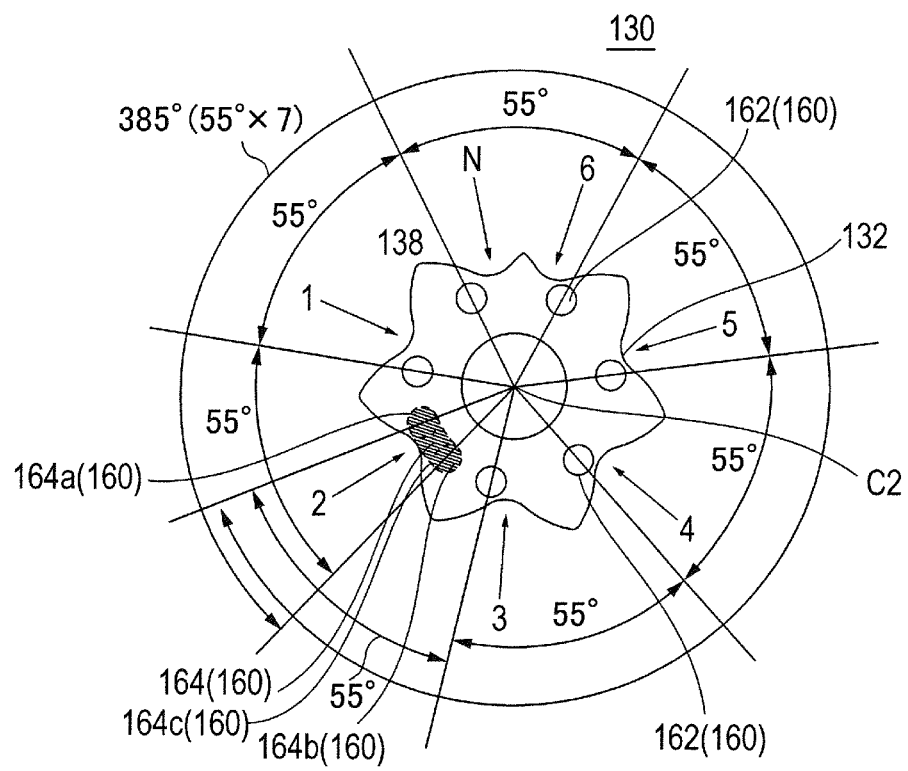

FIGS. 6A and 6B are diagrams for explaining main portions of the shift mechanism shown in FIG. 3. FIG. 6A is an enlarged view of main portions of intermittent feed section 120 shown in FIG. 3, and FIG. 6B is an enlarged view of main portions of a cam phase holding portion in intermittent feed section 120. A coil portion of biasing spring 86 and springs 88 and 142 are not illustrated in FIG. 6A. FIGS. 7A and 7B are diagrams for explaining index cam 130 and are equivalent to right side diagrams in the engine unit.

As shown in FIG. 6A, intermittent feed section 120 includes shift arm 84, feed nail portion 85, and index cam 130 integral with and fixed to shift cam 110.

As shown in FIGS. 3, 5, and 6A, shift arm 84 is attached to the other end portion of shift shaft 83. Shift arm 84 turns around shaft center C1 of shift shaft 83 and extends in a direction orthogonal or substantially orthogonal to shift shaft 83. The coil portion of biasing spring 86 that is a torsion spring is externally provided to the base portion of shift arm 84.

Flange 831 is fixed to the other end of shift shaft 83, and biasing spring 86 is located between shift arm 84 and flange 831. Biasing spring 86 includes left side portion 86a and right side portion 86b that are winding end portions derived from the wound coil portion. Locking portion 83a provided by bending one end portion of flange 831 toward shift arm 84 and locking portion 84a provided by bending one end portion in the base portion of shift arm 84 toward flange 831 are located between left side portion 86a and right side portion 86b of biasing spring 86. Therefore, locking portion 83a of flange 831 and locking portion 84a of shift arm 84 are separated in the radial direction of shaft center C1 to face each other and are located between left side portion 86a and right side portion 86b of biasing spring 86.

In this manner, biasing spring 86 elastically restricts shift arm 84 relative to locking portion 83a of flange 831 in locking portion 84a, and shift arm 84 is rotated by the rotation of shift shaft 83. For example, shift arm 84 first rotates clockwise in FIG. 3 in the shift operation of shift-up.

Biasing spring 86 has a preload in the state before shift shaft 83 starts turning in the shift change operation. More specifically, biasing spring 86 provides bias so that locking portion 84a of shift arm 84 always faces the same direction as locking portion 83a of flange 831 in the rotation direction of shift shaft 83.

Therefore, in the shift operation of shift-up, the rotational force of shift arm 84 rotated by the rotation of shift shaft 83 is transmitted through biasing spring 86.

Feed nail portion 85 is provided near the tip of shift arm 84 (see FIGS. 5 and 6A). Feed nail portion 85 is attached to the tip portion of shift arm 84 through mounting shaft 87 parallel or substantially parallel to shaft center C1 so as to be freely rotatable. Feed nail portion 85 includes left and right side nails 85a and 85b facing each other at a predetermined distance in the view of FIG. 6A. As for the direction of feed nail portion 85 relative to shift arm 84, spring 88 attached to mounting shaft 87 provides a bias so that the centers of opposing left and right side nails 85a and 85b always face shaft center C1. Spring 88 is a torsion coil spring to externally provide the coil portion to mounting shaft 87, and a portion bent and protruding toward shift arm 84 in feed nail portion 85 and locking portion 84b of shift arm 84 face each other and are located between left and right side portions derived from the coil portion.

Index cam 130 is fixed to the end portion of the side provided with shift arm 84 of shift cam 110, and includes shaft center C2 as the rotation center shared with shift cam 110. Index cam 130 includes a plurality of pins 160 (pin 162 and pin 164) on the surface of the side provided with intermittent feed section 120 (surface of the side opposite to the side connected to shift cam 110).

As shown in FIGS. 7A and 7B, pins 160 protrude from index cam 130 and are provided on a certain pitch circle around shaft center C2 of shift cam 110. Pins 160 include one pin 164 (elliptical convex portion 164) which is an arc-shaped curved ellipse as viewed from the surface (right side in FIG. 5). Pin 164 protrudes toward the surface (right side in FIG. 5) from near the bottom portion of a concave portion of the portion designated with reference numeral "2" in FIGS. 7A and 7B. Hereinafter, pin 164 will be called elliptical convex portion 164. There are preferably six pins 162, for example, which protrude toward the surface from near the bottom portions of concave portions of the elements provided with reference numerals "1", "N", "6", "5", "4", and "3" in the drawings.

As shown in FIG. 5, pins 162 have a height so that the ends of pins 162 protrude to the right of left and right side nails 85a and 85b and outer edge portions 851 and 852 of feed nail portion 85 in rotation shaft center C2 direction of shift cam 110 in FIG. 5. Meanwhile, the protrusion height of elliptical convex portion 164 is smaller than pins 162, and elliptical convex portion 164 is set at a height not overlapping left and right side nails 85a and 85b and outer edge portions 851 and 852 in shaft center C2 direction, but overlapping locking portion 84b of shift arm 84.

Details of the positional relationship between shift arm 84, feed nail portion 85, and pins 160 (pins 162 and elliptical convex portion 164) shown in FIG. 6A will be described below.

Outer edges of left and right side nails 85a and 85b of feed nail portion 85 are tapered outer edge portions 851 and 852. Tapers of outer edge portions 851 and 852 are provided at angles so that when outer edge portions 851 and 852 are abutted to pins 162 of index cam 130 after displacement of feed nail portion 85 along with the turn of shift arm 84, feed nail portion 85 oscillates at the tip portion of shift arm 84 to allow outer edge portions 851 and 852 to slide pins 162.

Locking portion 84b regulates the rotation range of rotating shift cam 110 based on the rotation drive of shift arm 84. Locking portion 84b is bent and protrudes toward shift cam 110 in shift arm 84. Before the shift change operation rotates shift arm 84, locking portion 84b is inside of a rotation trajectory (track circle) of pins 160 (pins 162 and elliptical convex portion 164) rotating about shaft center C2 along with index cam 130. Therefore, locking portion 84b does not interfere with the turn of index cam 130 in the state before the shift change operation rotates shift arm 84. When the shift change operation is started to turn shift arm 84, locking portion 84b enters the rotation trajectory (track circle) of rotating pins 160 (pins 162 and elliptical convex portion 164) along with index cam 130. When shift arm 84 brakes shift cam 110 at a predetermined rotation angle by rotating shift cam 110 through feed nail portion 85, locking portion 84b is at a position abutted to desired pin 160 (pin 162 or elliptical convex portion 164) to inhibit the turn of index cam 130. Therefore, locking portion 84b is provided at a position to regulate the rotation of shift cam 110 beyond a predetermined rotation angle in intermittent feed section 120.

Along with the rotation of shift arm 84, feed nail portion 85 rotates (revolves) with shaft center C1 of shift shaft 83 as the rotation center. Based on the rotation of shift arm 84, feed nail portion 85 hooks pins 162 of index cam 130 in left and right side nails 85a and 85b and rotates index cam 130 around shaft center C2 while rotating (auto-rotating) around mounting shaft 87. Therefore, the rotation of shift arm 84 rotates shift cam 110 by a predetermined angle through feed nail portion 85, pins 162, and index cam 130. When shift cam 110 rotates substantially by the predetermined angle, locking portion 84b is abutted to pin 160 (pin 162 or elliptical convex portion 164) to regulate the turn of index cam 130 to stop the rotation of shift cam 110.

Therefore, when shift arm 84 rotates, pins 162 are engaged with feed nail portion 85 to rotate index cam 130 around shaft center C2. On the other hand, elliptical convex portion 164 does not come into contact with feed nail portion 85 and does not transmit a rotational force to index cam 130. When index cam 130 (shift cam 110) rotates around shaft center C2 by a predetermined angle, pins 160 (pins 162 and elliptical convex portion 164) are abutted to locking portion 84b of shift arm 84 to brake the rotation of index cam 130.

Cam phase holding portion 140 converges and holds index cam 130 in a phase corresponding to a predetermined transmission stage. In this manner, shift cam 110 fixed to index cam 130 is converged and held in the phase corresponding to the transmission stage. Cam phase holding portion 140 includes follower spring 142, follower arm 144, and follower 150 (see FIG. 6B).

One end of follower spring 142 is locked to pin 143 provided on wall portion 8b, and the other end is connected to follower arm 144. Follower spring 142 is, for example, a tension coil spring. Follower spring 142 is connected to pin 143 and follower arm 144, with the spring in a tensed state.

Follower arm 144 is attached to one end (left side in FIG. 5) of the base portion of shift arm 84, and follower arm 144 rotates around shaft center C1 of shift shaft 83. Due to the biasing force in the contraction direction of the spring of follower spring 142, follower 150 is always abutted to index cam 130 (specifically, peripheral surface of index cam 130 including concave portions 132 and peak portions 134a to 134d shown in FIG. 7A) to press index cam 130 substantially toward shaft center C2.

Follower 150 that has received the biasing force of follower spring 142 is abutted to index cam 130, and a rotational force (torque) is provided to index cam 130. The torque driven and input by shift actuator 81 is transmitted from pins 162 to index cam 130 through shift shaft 83, biasing spring 86, shift arm 84, and feed nail portion 85. The action of the torque enables stable rotation of shift cam 110 around shaft center C2.

Follower spring 142, follower arm 144, and follower 150 define cam phase holding portion 140 that holds index cam 130 in a phase of a predetermined transmission stage.

Index cam 130 shown in FIGS. 7A and 7B is fixed to one end portion of shift cam 110, with the same shaft center as shift cam 110.

In index cam 130, the peripheral portion has a continuous concave-convex (peak-valley) shape in the circumferential direction, and the positions of concave portions 132 defining concave portions of the concave-convex shape are gear positions (stage entry positions) of the transmission gears in shift cam 110. More specifically, concave portions 132 that define the phases of shift cam 110 corresponding to the transmission stage during intermittent turns of shift cam 110 are provided along the periphery of the peripheral portion of index cam 130. Concave portion 132 is engaged with follower 150 to hold shift cam 110 in a phase of a predetermined gear position.

Concave portions 132 are provided on the peripheral portion of index cam 130 so that the rotation angle between a concave portion designated with reference numeral "N" corresponding to the neutral position (neutral) and a concave portion designated with reference numeral "1" corresponding to the first speed gear position (first gear) is the same as the rotation angle between the concave portion designated with "1" corresponding to the first speed gear position (first gear) and a concave portion designated with reference numeral "2" corresponding to the second speed gear position (second gear). In addition, concave portions 132 are provided so that the angle (setting angle) in the range that shift cam 110 does not turn, which is defined by an acute angle between the concave portion designated with reference numeral "6" corresponding to the sixth speed (maximum speed) gear position (sixth gear) that is the top gear and the concave portion of "N" corresponding to the neutral position, is smaller than the rotation angle between the concave portion of neutral position "N" and the concave portion of first speed "1."

In this preferred embodiment, the transmission apparatus preferably is a bottom-neutral transmission apparatus with a six-stage transmission, and the position of the neutral position in the shift pattern is below the position of the first speed gear position. Therefore, concave portions 132 of index cam 130 are provided in the peripheral portion, from the portion of "N" corresponding to the neutral position, through the first gear, and sequentially in the phases corresponding to the second gear, the third gear, . . . , and the sixth gear in the counterclockwise direction. Hereinafter, the concave portion in the phase corresponding to the neutral position and the concave portions in the phases corresponding to the gear positions of n (1 to 6 here) speed will be called, for the convenience, "neutral concave portion" and "n-th speed concave portions" or "concave portions of n" by quoting reference numerals in the drawings.

The height (radius from axial center C2 to the top) of peak portion 134a provided in an arc on one side defined by an acute angle between the concave portion of neutral "N" and the concave portion of sixth speed "6" in index cam 130 is smaller than the height of peak portion 134b provided in an arc on the other side with the concave portion of first speed "1", between the adjacent concave portions in the circumferential direction (see FIGS. 7A and 7B).

Therefore, the rotation angle between the concave portion of neutral "N" and the concave portion of first speed "1" is the same as the rotation angle between the concave portion of first speed "1" and the concave portion of second speed "2" in index cam 130. The rotation angle between the concave portion of first speed "1" and the concave portion of second speed "2" is the same as the rotation angle between the concave portion of second speed "2" and the concave portion of third speed "3", the rotation angle between the concave portion of third speed "3" and the concave portion of fourth speed "4", the rotation angle between the concave portion of fourth speed "4" and the concave portion of fifth speed "5", and the rotation angle between the concave portion of fifth speed "5" and the concave portion of sixth speed.

In concave portions 132, the angle that is an acute angle between the concave portion of sixth speed "6" and the concave portion of neutral "N" is smaller than the rotation angle between the concave portion of neutral "N" and the concave portion of first speed "1" (angle for rotating index cam 130 in the gear change between neutral "N" and first speed "1"). In engine unit 8 mounted on vehicle 1, shift cam 110 does not rotate in the range of the angle that is an acute angle between the concave portion of sixth speed "6" and the concave portion of neutral "N". More specifically, the turn of the shift cam for the gear change from sixth speed "6" to neutral "N" without passing through fifth speed "5" or from neutral "N" to sixth speed "6" without passing through first speed "1" is regulated by, for example, a structure other than intermittent feed section 120, such as by the groove shapes of cam grooves 111 to 113 provided on the peripheral surface of shift cam 110.

The angle of the range that the shift cam does not turn, the angle defined by the acute angle between the concave portion of sixth speed "6" that is the top gear and the concave portion of neutral "N", is 30°, and the angles between adjacent concave portions in the circumferential direction from the concave portion of "N" to the concave portion of "6" in the circumferential direction on the side including the concave portion of "1" are preferably about 55°, for example.

The positional relationship between shift arm 84, feed nail portion 85, and pins 160 (pins 162 and elliptical convex portion 164) shown in FIG. 6A will be described along with the positional relationship between follower 150 and the concave portions.

In index cam 130 shown in FIG. 6A, follower 150 is abutted to and pressed against, i.e., engaged with, the concave portion of neutral "N" (see FIG. 6B) to hold the phase of shift cam 110 at neutral "N". Shift shaft 83 and shift arm 84 are positioned at predetermined neutral positions before the start of the operation of the gear change. In this state, elliptical convex portion 164 and pin (pin protruding from near the bottom portion of the concave portion of "3" to the surface) 162 adjacent to elliptical convex portion 164 counterclockwise are positioned to be held by left and right side nails 85a and 85b of feed nail portion 85. In left and right side nails 85a and 85b, pin 162 is positioned closer to right side nail 85b, and elliptical convex portion 164 is positioned closer to left side nail 85a.

In the operation of shift-up, the clockwise rotation of shift arm 84 in the transmission apparatus engages (hooks) right side nail 85b with one pin 162 to rotate index cam 130 in the clockwise direction. The number of pins 162 hooked by feed nail portion 85 is one in the phase that the cam surface of neutral "N" concave portion of index cam 130 is abutted to follower 150. When the concave portion to which follower 150 is abutted is between first speed "1" and the gear position just before the top gear (here, "6"−1="5"), feed nail portion 85 is disposed to hold two pins 162 by left and right side nails 85a and 85b when the shift-up or shift-down is started (see FIGS. 9A and 11A).

It is assumed that in index cam 130, follower 150 is abutted to and pressed against the concave portion of sixth speed "6" to hold the phase of shift cam 110 at sixth speed "6", and shift shaft 83 and shift arm 84 are at predetermined neutral positions before the start of the operation of gear change. In this case, elliptical convex portion 164 and pin (pin protruding from near the bottom portion of the concave portion of "1" speed position" to the surface) 162 adjacent to elliptical convex portion 164 in the clockwise direction are positioned to be held by left and right side nails 85*a* and 85*b* of feed nail portion 85. In left and right side nails 85*a* and 85*b*, elliptical convex portion 164 is positioned closer to right side nail 85*b*, and pin 162 is positioned closer to left side nail 85*a* (see FIG. 11C).

More specifically, as shown in FIG. 7B, in pins 160 protruding from index cam 130, small circles 164*a* and 164*b*, which define both ends of the long arc around shaft center C2 in elliptical convex portion 164, and pins 162 are disposed at equal intervals (same angles) on the pitch circle around shaft center C2.

Pins 162 are disposed at intervals of angles to turn index cam 130 in changing each transmission gear stage counterclockwise based on small circle 164*a* of elliptical convex portion 164 in the state that shift cam 110 is in the neutral phase, and small circles 164*b* are disposed at positions of eighth pins including small circle 164*a*. Therefore, small circle 164*a* and small circle 164*b* in elliptical convex portion 164 are separated by an angle obtained by multiplying the angle to turn index cam 130 in changing one transmission gear stage around shaft center C2 by the number of phases to stop the turn of index cam 130 by establishing the transmission gear stage. Long arc portion 164*c* including an arc around shaft center C2 is integral with small circles 164*a* and 164*b* in the range of the acute angle between these two small circles 164*a* and 164*b*.

Specifically, as shown in FIG. 6A, pins 162 are disposed at intervals of angles (preferably about 55°, for example) to turn index cam 130 in changing each transmission gear stage counterclockwise based on small circle 164*a* at the arc end of elliptical convex portion 164 closer to left side nail 85*a* when intermittent feed section 120 is at the neutral position of neutral "N" (shift cam 110 is in the neutral phase). Small circle 164*a* is included, and small circle 164*b* is disposed at the position of an eighth pin. More specifically, when intermittent feed section 120 is at the neutral position of neutral "N" (shift cam 110 is in the neutral phase), small circle 164*a*, which is at the arc end of elliptical convex portion 164 closer to left side nail 85*a*, and small circle 164*b*, which is at the arc end of elliptical convex portion 164 closer to right side nail 85*b* when intermittent feed section 120 is in the neutral position of sixth speed "6" that is the top gear (shift cam 110 is in the sixth-speed phase) as shown in FIG. 11C, are separated by an angle (preferably about 55°×seven times=about 385°, for example) obtained by multiplying the angle (preferably about 55°, for example) to turn index cam 130 in changing one transmission gear stage by the number of phases to stop the turn of index cam 130 by establishing the transmission gear stage (here, seven times from first speed to sixth speed including neutral) as shown in FIG. 7B. The range of the acute angle between two small circles (preferably about 385°−about 360°=about 25°, for example) is connected by the arc portion of elliptical convex portion 164.

The transmission operation of intermittent feed section 120 in the transmission apparatus of the present preferred embodiment will be described next. The coil portion of biasing spring 86 and springs 88 and 142 are not illustrated in FIGS. 8A to 14C used to explain the operation of intermittent feed section 120. The concave portions to hold index cam 130 in the phases corresponding to the gear positions of each speed are designated with reference numerals (N and 1 to 6) corresponding to the gear positions of each speed in the periphery of index cam 130 of FIGS. 8A to 14C, for convenience.

Figure 8A:
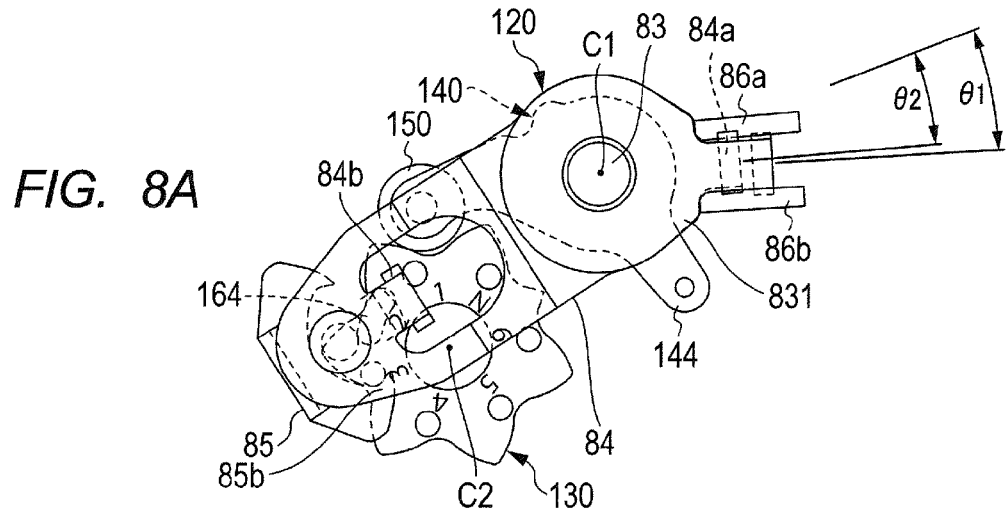
FIGS. 8A to 8C are diagrams for explaining an operation of the shift mechanism during transmission from neutral to first speed.
Figure 8B:
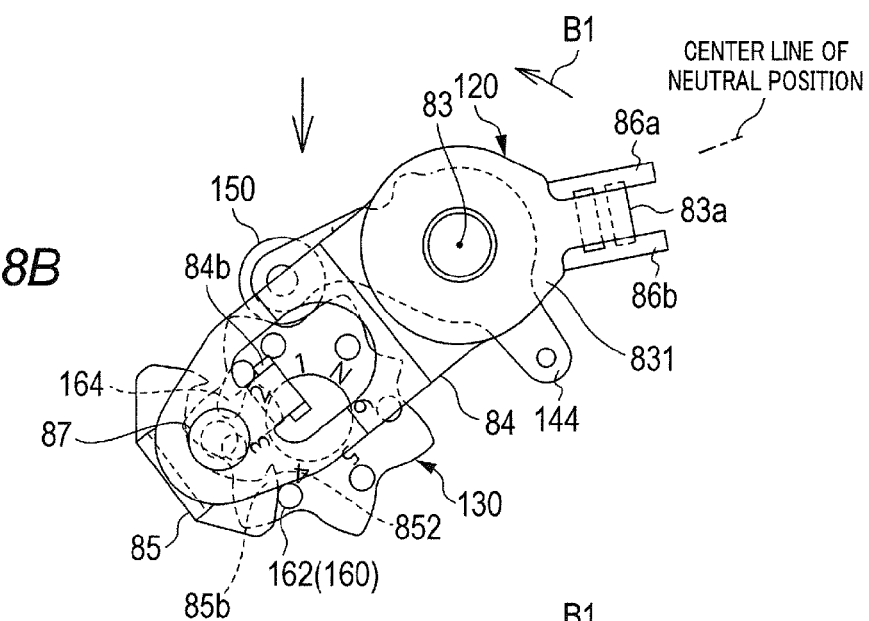
Figure 8C:
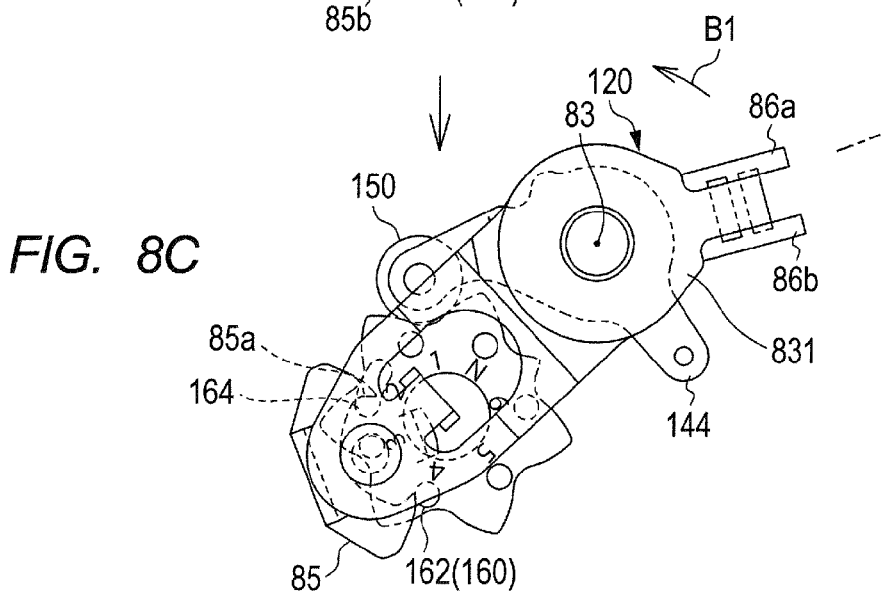

FIGS. 8A to 8C are diagrams for explaining operation of the shift mechanism in the transmission from neutral to first speed. Specifically, FIGS. 8A to 8C are diagrams for explaining a transmission operation of intermittent feed section 120 between the neutral position and the first speed neutral position. The neutral position denotes a state that index cam 130 is in an N reference phase in which the phase is held by the concave portion of neutral "N", and shift shaft 83 and shift arm 84 are at predetermined neutral positions before the start of the operation of the gear change. The first speed neutral position denotes a state that index cam 130 turns to a first gear reference phase in which the phase is held by the concave portion of first speed "1", and shift shaft 83 and shift arm 84 have returned to the predetermined neutral positions after the completion of the operation of the gear change. Hereinafter, FIG. 5 will be referenced for shift cam 110 in the explanation with reference to FIGS. 8A to 14C.

In intermittent feed section 120 at the neutral position (index cam 130 is in the N reference phase) shown in FIG. 6A, shift shaft 83 (flange 831 of shift shaft 83 in FIG. 6A) is rotated and moved clockwise (arrow F1 direction) through shift actuator 81.

Consequently, flange 831 oscillates shift arm 84 in association with biasing spring 86 and hooks (engages) feed nail portion 85 (specifically, right side nail 85*b*) provided at the tip of shift arm 84 to pin 160 (162) to turn index cam 130 to rotate shift cam 110 (see FIG. 5) clockwise.

In this manner, as shown in FIG. 8A, follower 150 of cam phase holding portion 140 is pressed against concave portion 132 corresponding to the first gear in index cam 130, and shift cam 110 is moved to converge to the first gear reference phase.

In this case, shift shaft 83 is rotated and driven up to the maximum rotation range set in shift actuator 81. Before shift actuator 81 reaches the maximum rotation angle, locking portion 84*b* of shift arm 84 is abutted to pin 160 (here, elliptical convex portion 164) to regulate the turn of index cam 130 clockwise at a position slightly exceeding the first gear reference phase to brake the rotation of shift cam 110. In this manner, the rotation (turn) of shift cam 110 is regulated to an angle slightly exceeding the first gear reference phase. Meanwhile, shift shaft 83 is configured to transmit the rotational force to shift arm 84 through biasing springs 86 (indicated by 86*a* and 86*b* in the drawings).

Therefore, right side nail 85*b* is abutted to pin 162, and elliptical convex portion 164 is abutted to locking portion 84*b* until the motor of shift actuator 81 stops around shaft center C1. Flange 831 fixed to shift shaft 83 turns in a turning range set in shift actuator 81 that is greater than the regulated turning range of shift arm 84 the counterclockwise turn of which is regulated. In FIG. 8A, θ1 denotes the turning angle range of shift shaft 83, and θ2 denotes the turning angle range of shift arm 84.

Cam phase holding portion 140 converges shift cam 110 to the first gear reference phase (first speed "1") (see FIG. 8B). Shift actuator 81 is then reversed to rotate shift shaft 83 counterclockwise (arrow B1 direction) to return intermittent feed section 120 to the neutral position.

Consequently, as shown in FIG. 8B, the rotation of shift arm 84 relative to flange 831 is regulated by biasing springs 86 (86*a* and 86*b*), and shift arm 84 rotates counterclockwise (arrow B1 direction) along with flange 831 to return to the neutral position. In this case, feed nail portion 85 (specifically, outer edge portion 852 of right side nail 85*b*) provided on shift arm 84 is abutted to pin 160 (162). In this case, cam phase holding portion 140 holds the phase of index cam 130, and feed nail portion 85 oscillates around mounting shaft 87. Therefore, tapered outer edge portion 852 slides along pin 162 while oscillating feed nail portion 85. As a result, feed nail portion 85 pushes pin 162 to exceed pin 160 (162) without returning the phase of index cam 130 to neutral (see FIG. 8C).

In this manner, in intermittent feed section 120 that has changed shift cam 110 to the first gear reference phase corresponding to the first speed, shift cam 110 is not rotated when intermittent feed section 120 returns to the neutral position in association with the rotation of shift shaft 83 counterclockwise. The protrusion height of elliptical convex portion 164 is low due to other pins 162, and a gap is provided in the height direction of elliptical convex portion 164 with respect to feed nail portion 85. Therefore, even if elliptical convex portion 164 is disposed in the middle of the movement of feed nail portion 85 in FIG. 8C, feed nail portion 85 does not interfere with elliptical convex portion 164.

Shift shaft 83 then moves counterclockwise to position shift arm 84 and feed nail portion 85 at the neutral positions, i.e., standby positions of the next gear change operation, in the state of the first gear reference phase in which follower 150 is positioned at concave portion 132 corresponding to first speed in index cam 130.

Figure 9A:
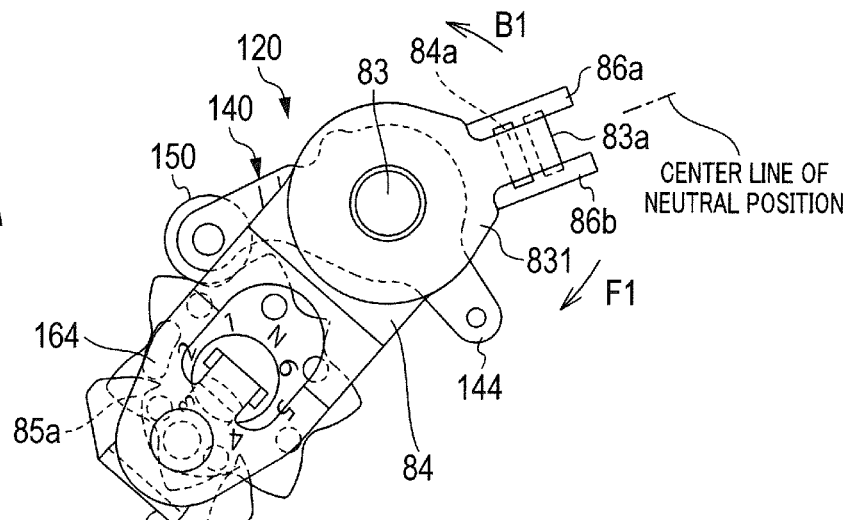
FIGS. 9A to 9C are diagrams for explaining an operation of the shift mechanism during transmission from the first speed to the second speed.

In this manner, shift cam 110 is positioned at the first speed gear (first gear) position, i.e., first gear reference phase (see FIG. 9A).

FIGS. 9A to 10B are diagrams for explaining a transmission operation of intermittent feed section 120 from the first speed neutral position (first gear reference phase in shift cam 110) to a second speed neutral position (second gear reference phase).

FIG. 9A illustrates intermittent feed section 120 at the first speed neutral position, and in this state, shift shaft 83 is rotated clockwise (arrow F1 direction). Consequently, shift arm 84 oscillates to hook (engage) feed nail portion 85 (specifically, right side nail 85b) provided at the tip of shift arm 84 to pin 160 (162) to turn index cam 130. Accordingly, shift cam 110 rotates clockwise.

Figure 9B:
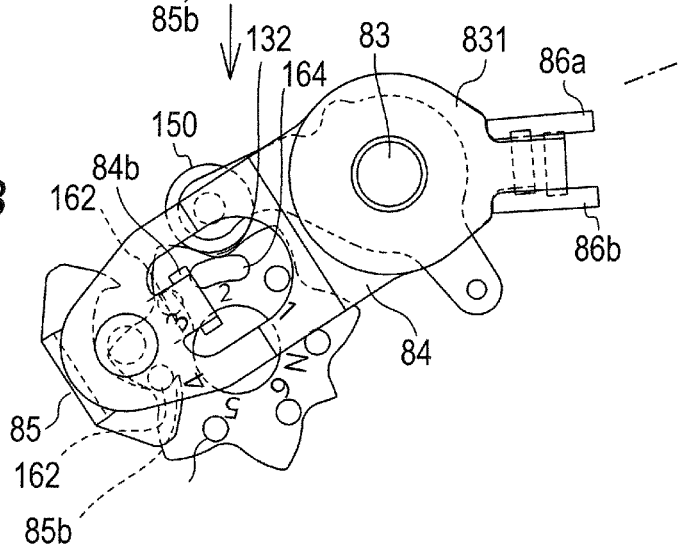

As a result, in index cam 130, follower 150 of cam phase holding portion 140 is positioned at concave portion (concave portion of second speed) 132 of "2" corresponding to the second gear, and shift cam 110 enters a second gear reference phase state (see FIG. 9B).

In this case, shift shaft 83 is rotated and driven up to the maximum rotation range set in shift actuator 81. In shift cam 110, locking portion 84b of shift arm 84 is abutted to pin 160 (here, pin 162 adjacent to elliptical convex portion 164 in the counterclockwise direction) of index cam 130 at a position slightly exceeding the second gear reference phase before shift actuator 81 reaches the maximum rotation angle. In this manner, the rotation of shift cam 110 is regulated to an angle slightly exceeding the second gear reference phase. Meanwhile, shift shaft 83 is configured to transmit the rotational force to shift arm 84 through biasing spring 86.

Therefore, until shift actuator (motor) 81 stops, flange 831 turns in the turning range set in shift actuator 81 around shaft center C1 that is greater than the regulated turning range of shift arm 84, the clockwise turn of which is regulated. Right side nail 85b is abutted to pin (pin near the concave portion of the third speed) 162, and pin (pin near the concave portion of the fifth speed) 162 is abutted to locking portion 84b to regulate the turning range of shift arm 84 clockwise. In the state that cam phase holding portion 140 holds shift cam 110 at the second gear reference phase, shift actuator 81 is reversed to turn shift arm 84 counterclockwise (arrow B1 direction) along with shift shaft 83. In this manner, shift actuator 81 returns intermittent feed section 120 to the original position (neutral position, standby position) (see FIG. 9C).

Figure 9C:
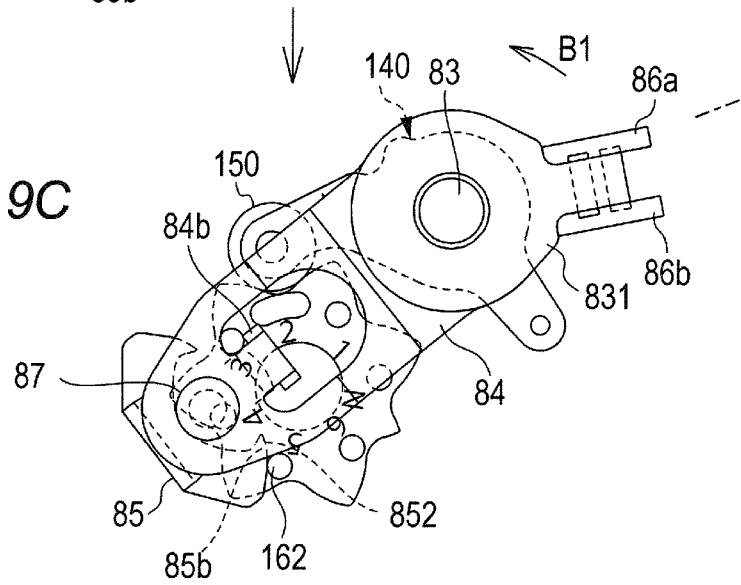

As shown in FIG. 9C, feed nail portion 85 (specifically, outer edge portion 852 of right side nail 85b) provided on shift arm 84 is abutted to pin 162 (pin near the concave portion of fifth speed). Shift cam 110 maintains the state of the second gear reference phase held by cam phase holding portion 140, and feed nail portion 85 oscillates around mounting shaft 87. Tapered outer edge portion 852 slides along pin (pin near the concave portion of fifth speed) 162 with the oscillation of feed nail portion 85. Feed nail portion 85 pushes pin (pin near the concave portion of fifth speed) 162 and exceeds pin (pin near the concave portion of fifth speed) 162 (160) without returning the phase of index cam 130 to first speed "1" (see FIG. 10A).

In this manner, intermittent feed section 120 that has changed shift cam 110 to the second gear reference phase corresponding to the second gear does not rotate shift cam 110 when intermittent feed section 120 returns to the neutral position as shift shaft 83 rotates counterclockwise.

Figure 10A:
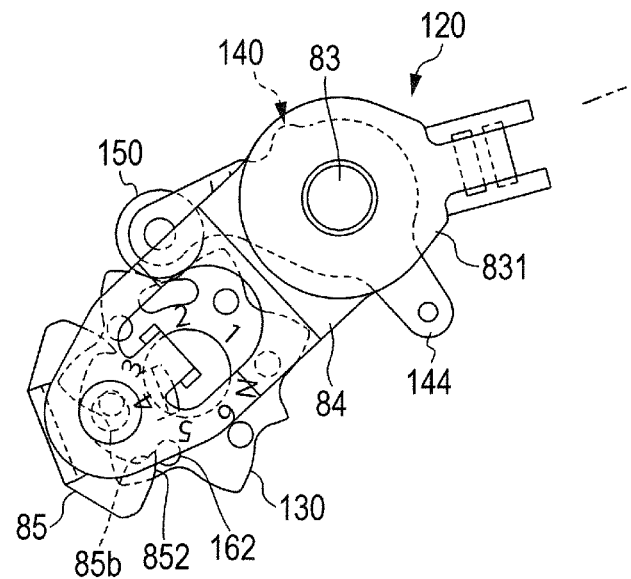
FIGS. 10A and 10B are diagrams for explaining an operation of the shift mechanism during transmission from the first speed to the second speed.
Figure 10B:
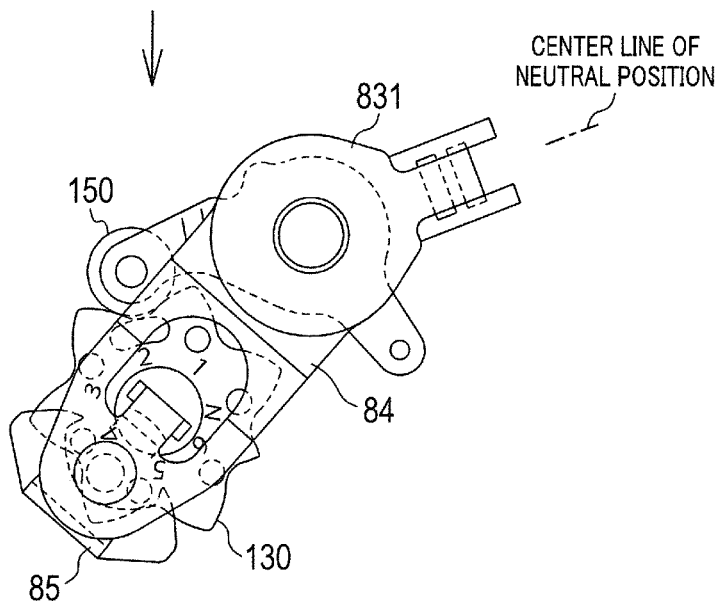

As shown in FIG. 10B, intermittent feed section 120 is then disposed at the second speed neutral position (shift cam 110 is in the second gear reference phase).

Although the transmission from the first speed neutral position (first gear reference phase in shift cam 110) to the second speed neutral position (second gear reference phase) is described here, the same operation applies to the transmission operation of second speed neutral position→third speed neutral position→fourth speed neutral position→fifth speed neutral position, except that the concave portion of transmission source and the concave portion of transmission destination are different.

Figure 11A:
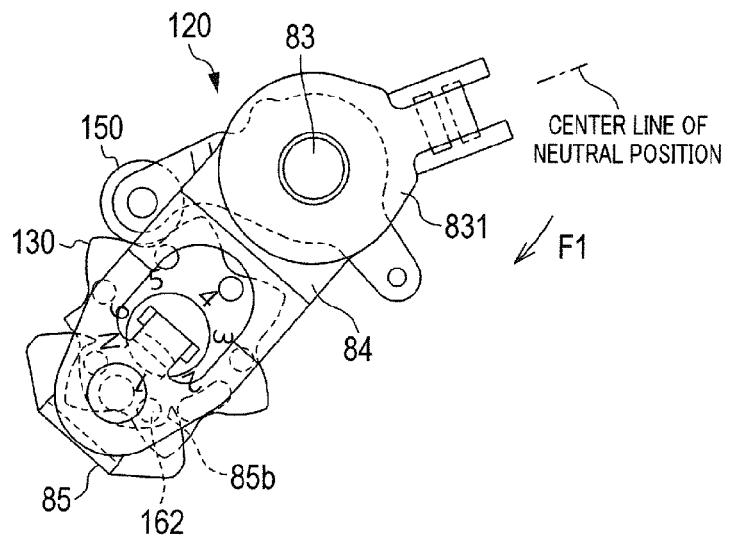
FIGS. 11A to 11C are diagrams for explaining an operation of the shift mechanism during transmission from fifth speed to sixth speed.
Figure 11B:
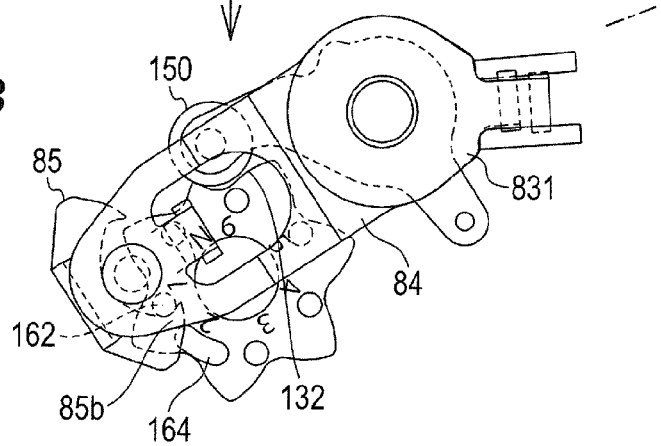
Figure 11C:
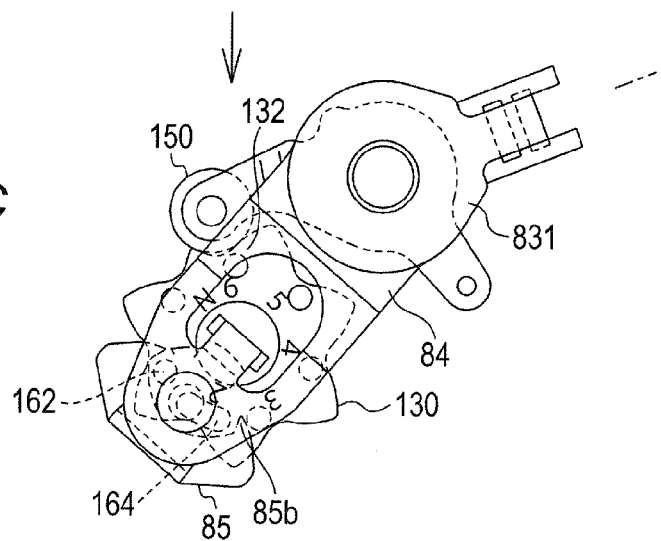

FIGS. 11A to 11C are diagrams for explaining a transmission operation of intermittent feed section 120 from the fifth speed neutral position (fifth gear reference phase in shift cam 110) to a sixth speed neutral position (sixth gear reference phase).

Intermittent feed section 120 in a fifth speed neutral position state shown in FIG. 11A turns shift shaft 83 clockwise (arrow F1 direction). Accordingly, shift arm 84 also turns clockwise (arrow F1 direction). Right side nail 85b of feed nail portion 85 that moves along with the turn of shift arm 84 hooks pin (pin near the concave portion of first speed) 162 positioned in the middle of the movement and turns index cam 130, i.e., shift cam 110, to the sixth gear reference phase (see FIG. 11B). In this case, although feed nail portion 85 is dislocated to overlap elliptical convex portion 164 as shown in FIG. 11B, feed nail portion 85 moves without interfering with elliptical convex portion 164. This is because the protrusion height of elliptical convex portion 164 is low due to other pins 162 as described above, and a gap is provided in the height direction of elliptical convex portion 164 relative to feed nail portion 85. When intermittent feed section 120 is returned to the neutral position, feed nail portion 85 is dislocated to overlap elliptical convex portion 164 along with the rotation of shift arm 84 in the counterclockwise direction (see FIG. 11B). In this case, feed nail portion 85 moves without interfering with elliptical convex portion 164 for the reason described above. As a result, shift arm 84 and feed nail portion 85 are positioned at neutral positions, i.e., standby positions, in the state that follower 150 is positioned at concave portion 132 of "6" corresponding to the sixth gear. In this manner, shift cam 110 is positioned by changing the phase from the fifth gear reference phase to the sixth gear reference phase (see FIG. 11C).

Figure 12A:
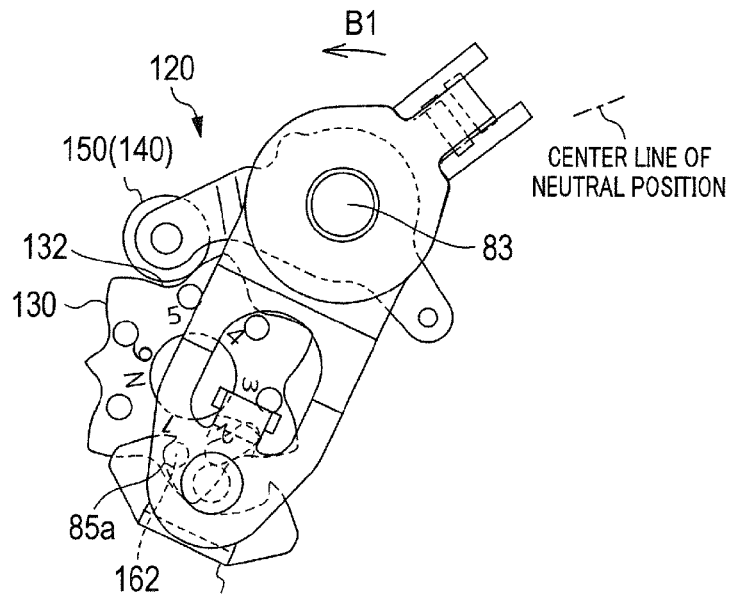
FIGS. 12A to 12C are diagrams for explaining an operation of the shift mechanism during transmission from the sixth speed to the fifth speed.
Figure 12B:
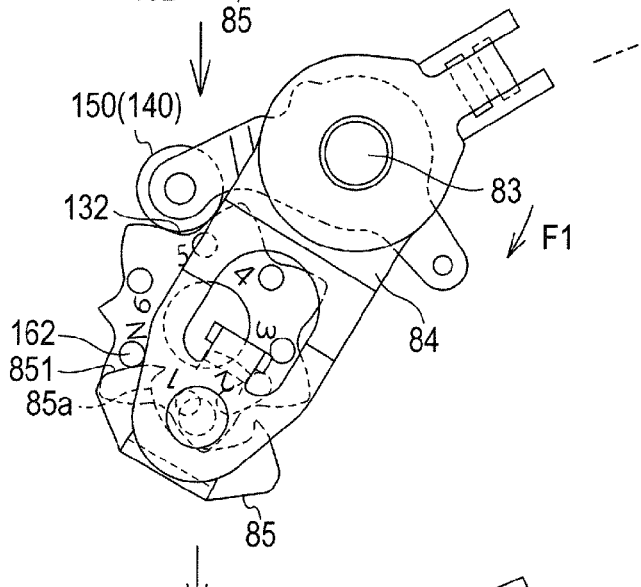
Figure 12C:
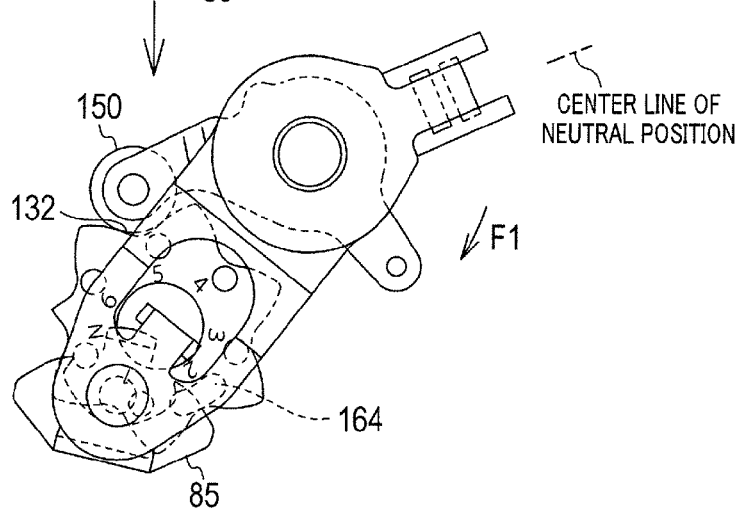

FIGS. 12A to 12C are diagrams for explaining a transmission operation of intermittent feed section 120 from the sixth speed neutral position (sixth gear reference phase in shift cam 110) to the fifth speed neutral position (fifth gear reference phase).

In the transmission from the sixth speed (sixth gear reference phase in shift cam 110) to the fifth speed (fifth gear reference phase) in the gear position, intermittent feed section 120 at the sixth speed neutral position (sixth gear reference phase) shown in FIG. 11C first rotates and drives shift shaft 83 counterclockwise (direction B1 of FIG. 12A).

As a result, left side nail 85*a* of feed nail portion 85 hooks and moves pin (pin near the concave portion of first speed) 162 positioned in the middle of the movement (adjacent pin 162 in the clockwise direction from elliptical convex portion 164). In this manner, left side nail portion 85*a* turns index cam 130, i.e., shift cam 110, to the phase corresponding to the fifth speed (see FIG. 12A).

Follower 150 of cam phase holding portion 140 is engaged with concave portion 132 of "5" corresponding to the fifth gear as shown in FIG. 12B, and the phase of shift cam 110 converges to the fifth gear reference phase. Shift actuator 81 (see FIG. 5) turns shift shaft 83 clockwise (arrow F1 direction) to rotate shift arm 84 clockwise (arrow F1 direction) in order to return intermittent feed section 120 to the reference position. Even if outer edge portion 851 of left side nail 85*a* of feed nail portion 85 is abutted to pin 162 as shift arm 84 rotates clockwise (see FIG. 12B), feed nail portion 85 slides pin 162 by outer edge portion 851 due to the oscillation of feed nail portion 85 relative to shift arm 84 and exceeds pin 162 (see FIG. 12C). As shown in FIG. 12C, although feed nail portion 85 is dislocated to overlap elliptical convex portion 164, feed nail portion 85 moves without interfering with elliptical convex portion 164.

As a result, shift arm 84 and feed nail portion 85 are positioned at the neutral positions, i.e., standby positions, in the state that follower 150 is positioned at concave portion 132 of "5" corresponding to the fifth gear. In this manner, shift cam 110 is positioned by changing the phase from the sixth gear reference phase to the fifth gear reference phase (see FIG. 11A).

Figure 13A:
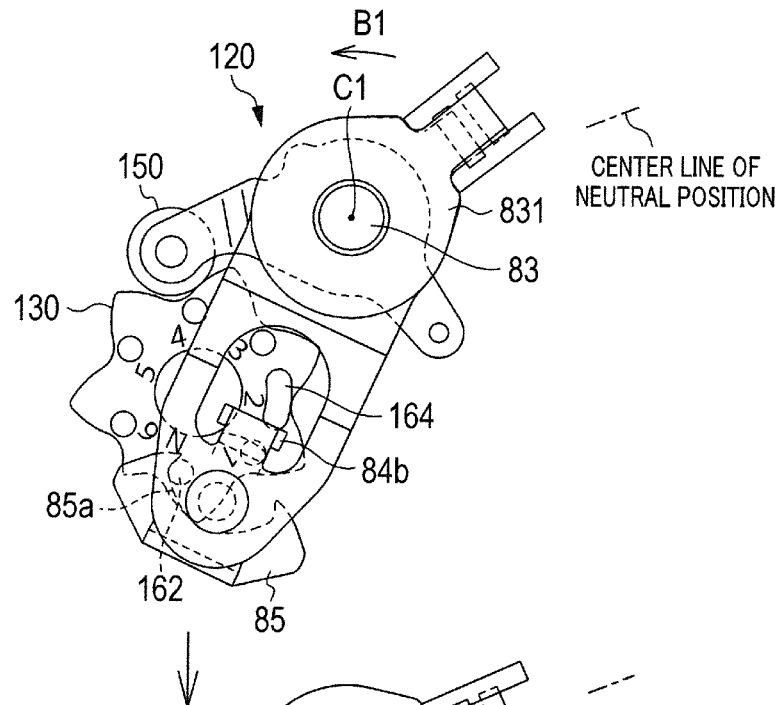
FIGS. 13A to 13C are diagrams for explaining an operation of the shift mechanism during transmission from the fifth speed to the fourth speed.
Figure 13B:
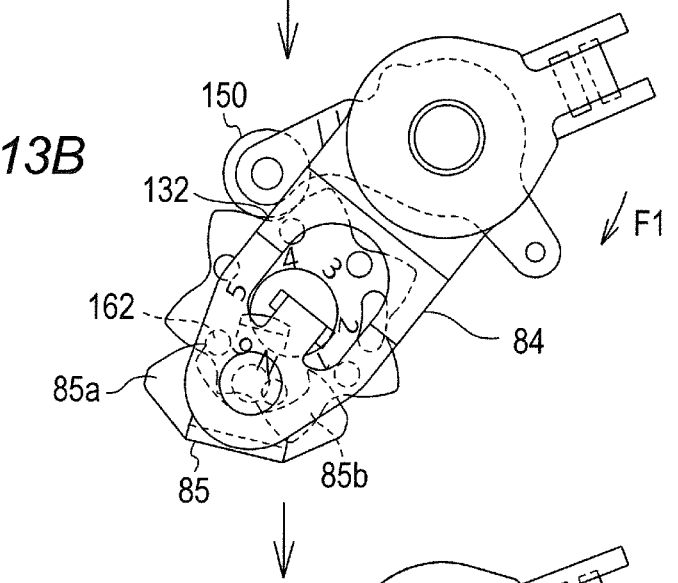
Figure 13C:
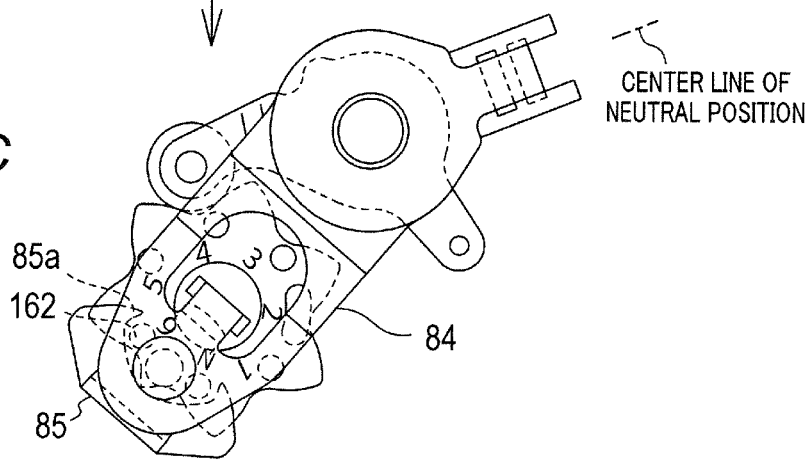

FIGS. 13A to 13C illustrate a transmission operation of intermittent feed section 120 from the fifth speed neutral position (fifth gear reference phase in shift cam 110) to the fourth speed neutral position (fourth gear reference phase).

In the transmission from the fifth speed (fifth gear reference phase in shift cam 110) to the fourth speed (fourth gear reference phase) in the gear position, intermittent feed section 120 at the fifth speed neutral position shown in FIG. 11A rotates and drives shift shaft 83 counterclockwise (see arrow B1 of FIG. 13A).

In this manner, left side nail 85*a* of feed nail portion 85 hooks pin 162 positioned in the middle of the movement to turn index cam 130, i.e., shift cam 110, to the phase corresponding to the fourth gear (see FIG. 13A).

In this case, shift shaft 83 is rotated and driven up to the maximum rotation range (see FIG. 8A) set in shift actuator 81 (see FIG. 5). Before shift actuator 81 reaches the maximum rotation angle, locking portion 84*b* of shift arm 84 is abutted to pin 160 of index cam 130 (pin 162 near the concave portion of the first speed adjacent to elliptical convex portion 164 in the clockwise direction) at a position where the phase of index cam 130 slightly exceeds the fourth gear reference phase toward the third gear phase as shown in FIG. 13A.

As a result, the rotation of shift cam 110 is regulated to an angle slightly exceeding the fourth gear reference phase through index cam 130. Flange 831 of shift shaft 83 turns around shaft center Cl until the motor that is shift actuator 81 (see FIG. 5) stops. Left side nail 85*a* is abutted to pin 162, and pin 162 is abutted to locking portion 84*b*. As a result, flange 831 turns up to the maximum turning range set in shift actuator 81, which is greater than the turning range of shift arm 84, the counterclockwise turn of which is regulated.

In the state that shift cam 110 is held in the fourth gear reference phase by cam phase holding portion 140, shift actuator 81 is reversed to turn shift arm 84 clockwise (arrow F1 direction) along with shift shaft 83. This turn returns intermittent feed section 120 to the original position (neutral position, standby position). In this case, follower 150 of cam phase holding portion 140 is engaged with concave portion 132 of "4" corresponding to the fourth gear as shown in FIG. 13B, and the phase of shift cam 110 converges to the fourth gear reference phase. Although left side nail 85*a* of feed nail portion 85 is abutted to pin (pin near the concave portion of sixth speed) 162 as shift arm 84 rotates clockwise, feed nail portion 85 moves and exceeds pin (pin near the concave portion of sixth speed) 162 due to the oscillation of feed nail portion 85 relative to shift arm 84.

As a result, shift arm 84 and feed nail portion 85 are positioned at the neutral positions, i.e., standby positions, in the state that follower 150 is positioned at concave portion 132 of "4" corresponding to the fourth gear. In this manner, shift cam 110 is positioned by changing the phase from the fifth gear reference phase to the fourth gear reference phase (see FIG. 13C).

Although the transmission from the fifth speed neutral position (fifth gear reference phase in shift cam 110) to the fourth speed neutral position (fourth gear reference phase) is described here, the same operation is applied to the transmission operation of fourth speed neutral position→third speed neutral position→second speed neutral position→first speed neutral position, except that concave portion 132 of the transmission source and the concave portion of the transmission destination are different.

Figure 14A:
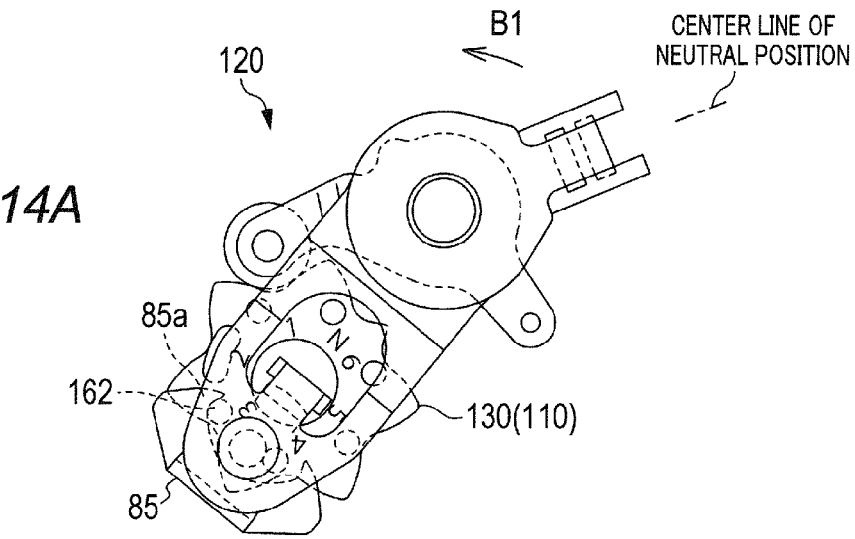
FIGS. 14A to 14C are diagrams for explaining an operation of the shift mechanism during transmission from the first speed to neutral.
Figure 14B:
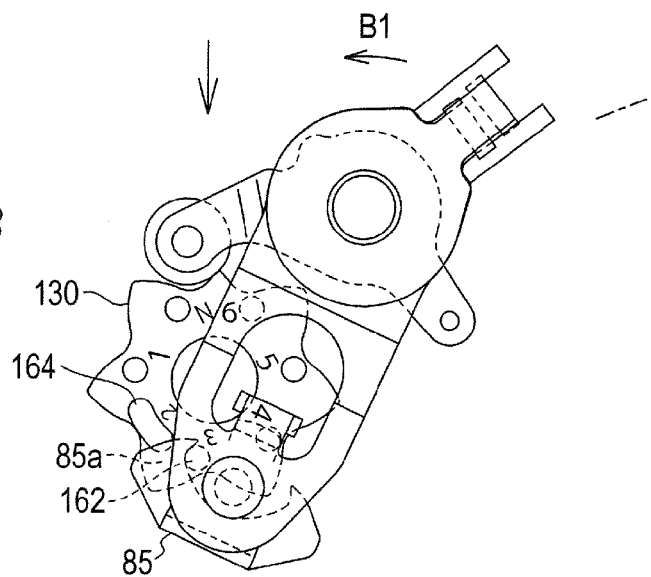
Figure 14C:
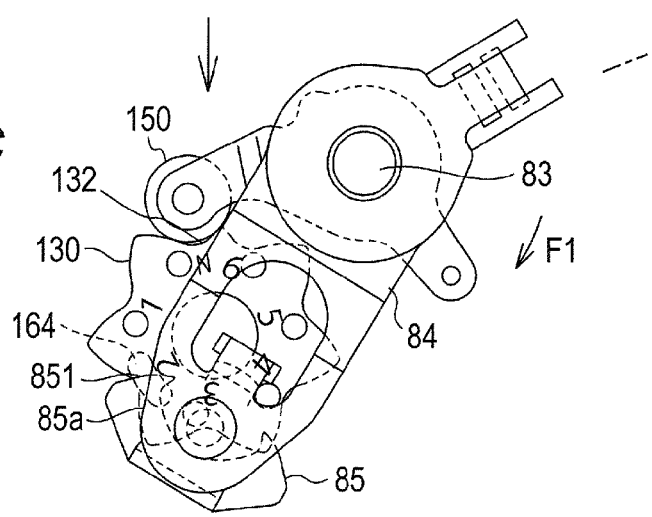

FIGS. 14A to 14C are diagrams for explaining a transmission operation of intermittent feed section 120 from the first speed neutral position (first gear reference phase in shift cam 110) to the neutral position (N reference phase).

In the transmission from the first speed neutral position (first gear reference phase in shift cam 110) to the neutral position (N reference phase), intermittent feed section 120 at the first speed neutral position (first gear reference phase) shown in FIG. 9A rotates and drives shift shaft 83 counterclockwise (see arrow B1 of FIG. 9A).

In this manner, left side nail 85*a* of feed nail portion 85 hooks pin (pin near the concave portion of third speed) 162 positioned in the middle of the movement as shown in FIG. 14A to turn index cam 130, i.e., shift cam 110, to the neutral reference phase (see FIG. 14B). In this case, feed nail portion 85 is dislocated to overlap with elliptical convex portion 164 (same in FIG. 14C). The protrusion height of elliptical convex portion 164 is short due to other pins 162, and a gap is provided in the height direction of elliptical convex portion 164 with respect to feed nail portion 85. Therefore, feed nail portion 85 moves without interfering with elliptical convex portion 164.

Subsequently, shift shaft 83 and shift arm 84 are turned clockwise (arrow F1 direction) as shown in FIG. 14C to return shift arm 84 and feed nail portion 85 to the original positions (neutral positions, standby positions).

In this case, follower 150 of cam phase holding portion 140 is engaged with concave portion 132 of "N" corresponding to neutral.

As a result, shift arm 84 and feed nail portion 85 are positioned at the neutral positions, i.e., standby positions, in the state that follower 150 is positioned at concave portion 132 of "N" corresponding to neutral. In this manner, shift cam 110 is positioned by changing the phase from the first gear reference phase to the neutral reference phase (see FIGS. 14C and 6A).

According to the first preferred embodiment, shift cam 110 includes cam grooves 111, 112, and 113 to move shift forks 114 to 116 on the peripheral surface. Shift cam 110 rotates from the neutral phase corresponding to the neutral position in the shift pattern to the sixth gear phase corresponding to the sixth speed gear position that is the top gear, through the first gear phase corresponding to the first speed gear position, and the phase is freely changed. Shift mechanism 80 intermittently rotates shift cam 110 according to the transmission operation and holds shift cam 110 in each phase corresponding to each transmission stage from the neutral and the first speed to the sixth speed equivalent to the top gear. Shift mechanism 80 holds shift cam 110 in each phase, in which the rotation angle between the neutral phase and the first gear phase is the same as the rotation angle between the first gear phase and the second gear phase, and the angle (complementary angle) in the range without the turn of shift cam 110 that is an acute angle between the sixth gear phase, which is the top gear, and the neutral phase is smaller than the rotation angle between the neutral phase and the first gear phase. As a result, in bottom-neutral shift cam 110 configured to rotate according to the six gears, the phases to hold shift cam 110 according to the gear positions is set at constant intervals in the circumferential direction without significantly narrowing the angles to turn the shift cam between the transmission stages. Therefore, the increase in the torque necessary to rotate the shift cam is significantly reduced or prevented, and the transmission is favorably performed.

Second Preferred Embodiment

Figure 15:
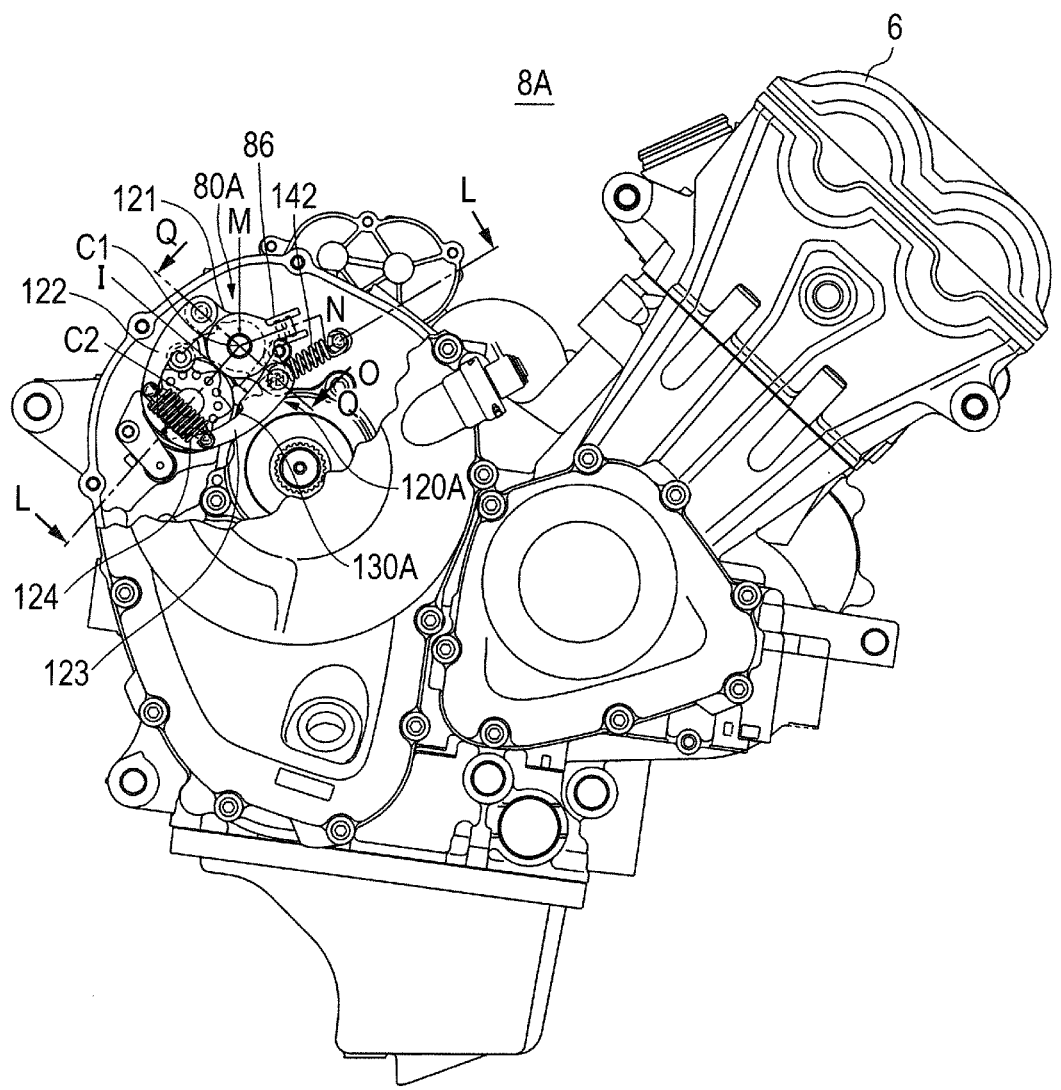
FIG. 15 illustrates a right side surface and a partially exploded view of an engine unit for explaining a transmission apparatus including a shift mechanism according to a second preferred embodiment of the present invention.
Figure 16:
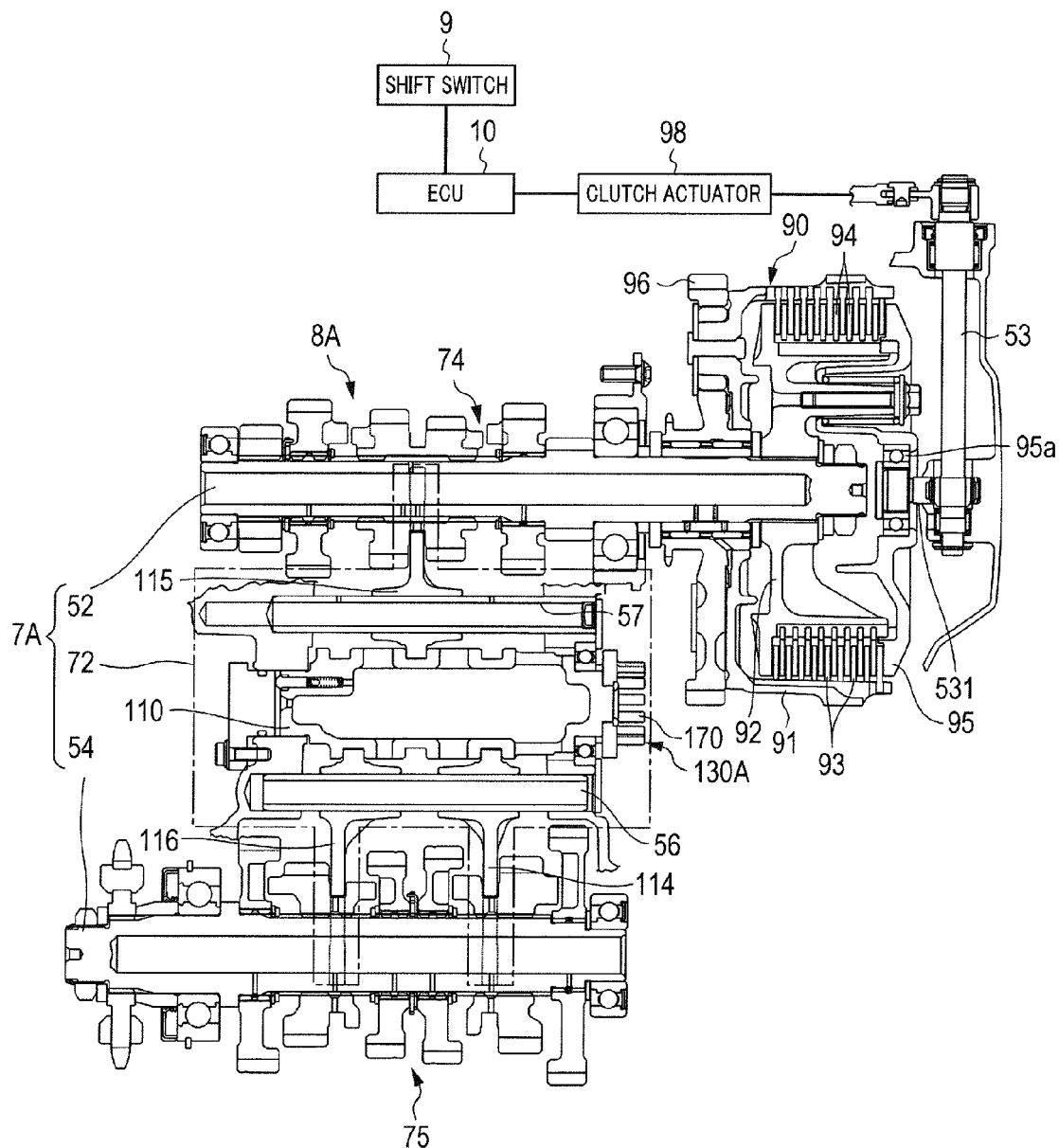
FIG. 16 is an axial plane developed view showing a configuration of main portions of the transmission apparatus including the shift mechanism of the second preferred embodiment of the present invention.
Figure 17:
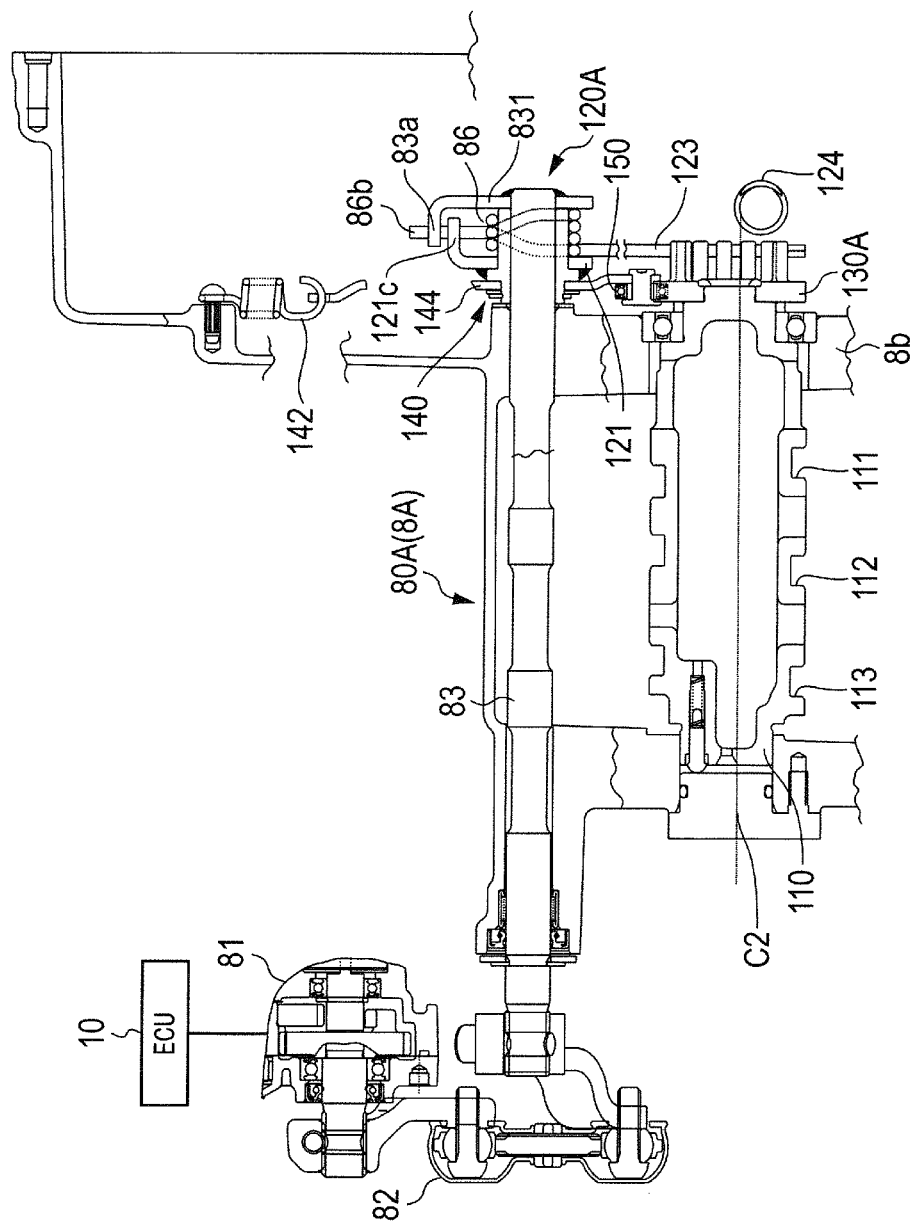
FIG. 17 is a cross-sectional developed view taken along line L-M-N-O-L in FIG. 15.
Figure 18:
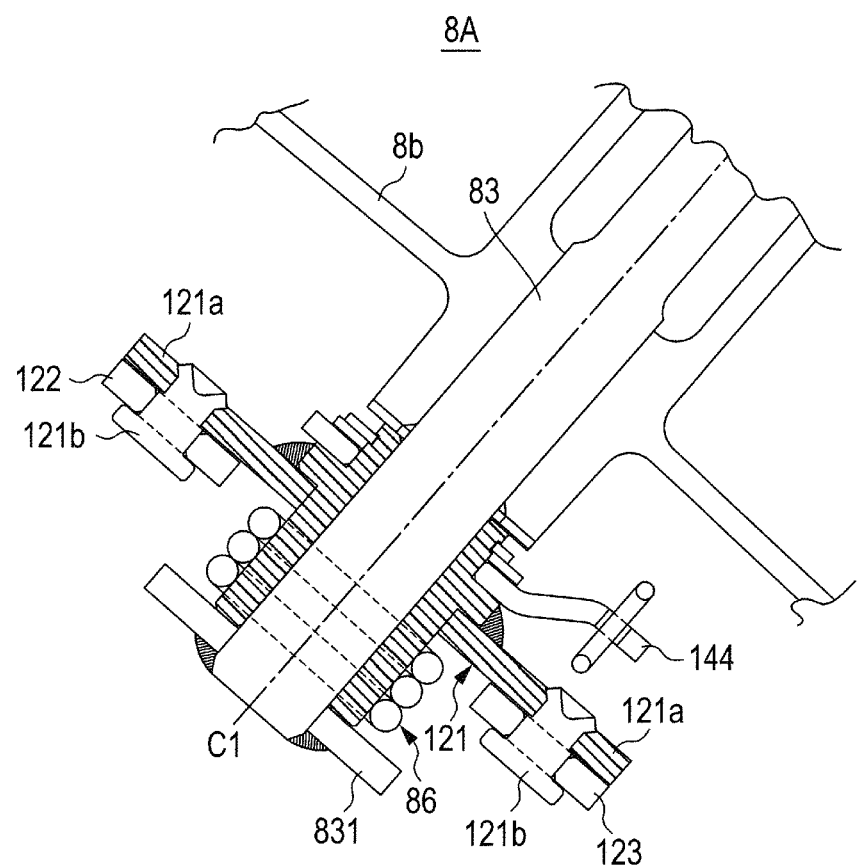
FIG. 18 is a cross-sectional view taken along line Q-Q in FIG. 15.

FIG. 15 is a right side diagram of an engine unit for explaining a transmission apparatus including a shift mechanism of the second preferred embodiment, partially illustrating a state that a cover lid and the like are removed. The configuration of the left side portion of the engine unit including the shift mechanism of the second preferred embodiment is preferably the same as the left side portion of the first preferred embodiment, and FIG. 2 will be referenced in the following description. FIG. 16 illustrates a configuration of main portions of the transmission apparatus of the second preferred embodiment, mainly developing and illustrating a cross-section of the portion equivalent to the cross-section of the section indicated by line A-B-C-D-E-A of FIG. 2 in the engine unit shown in FIG. 15. FIG. 17 is a developed view of a cross-section taken along line L-M-N-O-L in FIG. 15. FIG. 18 is a cross-sectional view taken along line Q-Q in FIG. 15.

Engine unit 8A shown in FIGS. 15 to 18 is mounted in place of engine unit 8 in vehicle 1 of the first preferred embodiment.

The configuration of intermittent feed section 120A in engine unit 8A provided for explaining the transmission apparatus of the second preferred embodiment is different from engine unit 8 corresponding to the first preferred embodiment shown in FIG. 2, and other basic configurations are the same. Therefore, different constituent elements will be described below, and the other same constituent elements are designated with the same reference numerals and will not be described.

As shown in FIGS. 15 to 17, engine unit 8A includes engine 6, ECU 10, shift actuator 81, clutch 90, clutch actuator 98, transmission mechanism 7A, and shift mechanism 80A. Transmission mechanism 7A is a staged transmission mechanism having substantially the same configuration and function as transmission mechanism 7 and includes main shaft 52, output shaft 54 disposed parallel or substantially parallel to main shaft 52, and sequential shift mechanism 72. Shift mechanism 80A includes shift rod 82 to transmit the drive of shift actuator 81, shift shaft 83, intermittent feed section 120A, and cam phase holding portion 140. ECU 10, transmission mechanism 7A, shift mechanism 80A, shift actuator 81, clutch 90, and clutch actuator 98 define the transmission apparatus.

In engine unit 8A, when a shift change command is input through operation of shift switch 9 by the passenger, ECU 10 starts transmission control. ECU 10 drives clutch actuator 98 and disconnects clutch 90 to disconnect the transmission of the rotational force in clutch 90. ECU 10 then drives shift mechanism 80A through shift actuator 81 and rotates shift cam 110 at a predetermined angle (shift cam feed). In this manner, desired transmission gears 74 and 75 are selected through shift forks 114 to 116. ECU 10 then drives clutch actuator 98 again and connects clutch 90 to restart the transmission of the rotational force in clutch 90.

In shift mechanism 80A shown in FIGS. 15 and 17, intermittent feed section 120A transmits the rotational force of shift shaft 83 rotated by the drive of shift actuator 81 to shift cam 110.

Figure 19:
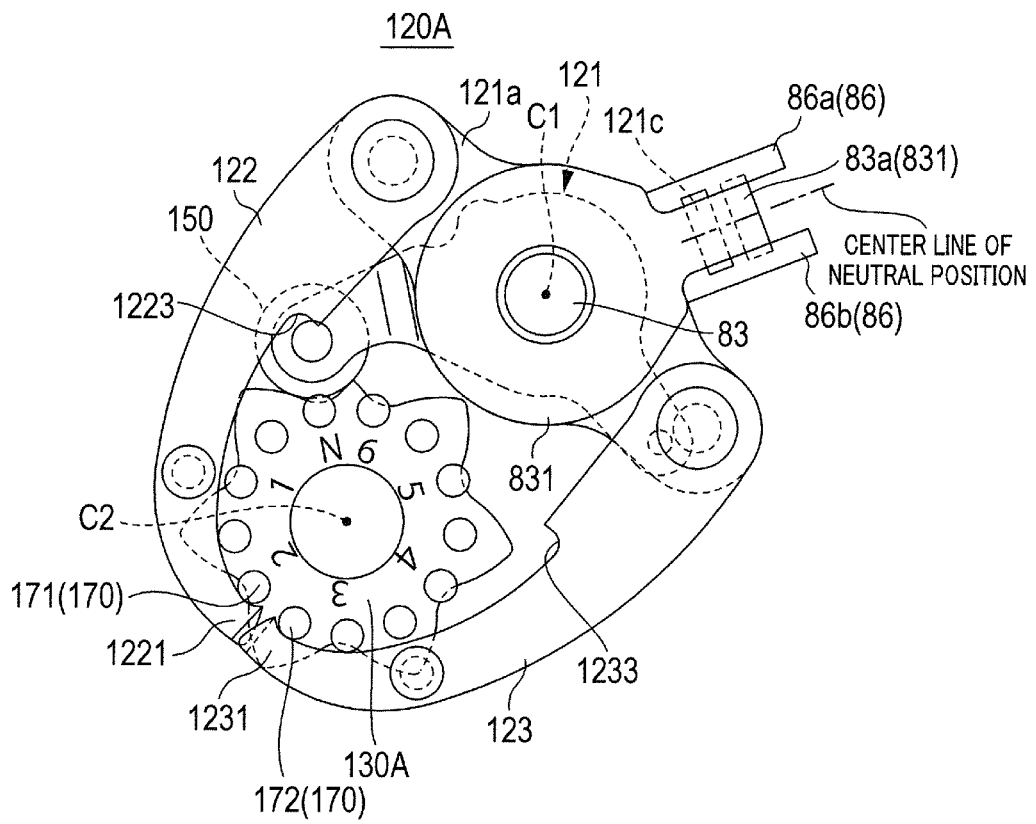
FIG. 19 is an enlarged view of main portions of an intermittent turn mechanism in the shift mechanism in the transmission apparatus shown in FIG. 15.

Intermittent feed section 120A includes biasing spring 86; arm base portion 121, first feed arm portion 122, second feed arm portion 123, biasing member 124, and index cam 130A integral with and fixed to one end portion of shift cam 110 in the axial direction (see FIGS. 17, 18, and 19).

FIG. 19 is an enlarged view of main portions of intermittent feed section 120A of the transmission apparatus shown in FIG. 15. Biasing member 124 and follower spring 142 are not illustrated in FIG. 19. In FIG. 19 as well as FIGS. 20 to 24B, reference numerals (N and 1 to 6) of gear positions corresponding to concave portions provided on the peripheral portion are provided near the concave portions in index cam 130A for convenience.

Arm base portion 121 shown in FIGS. 15, 18, and 19 is attached to the other end portion of shift shaft 83, and arm base portion 121 turns around shaft center C1 of shift shaft 83. As shown in FIGS. 18 and 19, arm base portion 121 includes extension portion 121a in the direction orthogonal or substantially orthogonal to shift shaft 83, extension portion 121a extending in the opposite direction of arm base portion 121. Therefore, extension portion 121a is dislocated in the circumferential direction around shaft center C1 of shift shaft 83.

First feed arm portion 122 and second feed arm portion 123 that turn around an axis parallel or substantially parallel to shift shaft 83 are attached to extension portion 121a. First feed arm portion 122 and second feed arm portion 123 that turn are caulked to extension portion 121a of arm base portion 121 by caulking member 121b as shown in FIG. 18.

Arm base portion 121 is biased by biasing spring 86 externally provided to a base portion inserted to shift shaft 83, to return to a predetermined position relative to shift shaft 83. Specifically, arm base portion 121 includes locking portion 121c provided by bending a tip portion protruding in the direction orthogonal or substantially orthogonal to shift shaft 83. Locking portion 121c is separated from and faces locking portion 83a of flange 831 fixed to the other end portion of shift shaft 83, in the radial direction relative to shaft center C1 (see FIG. 17).

As shown in FIG. 19, locking portion 121c and locking portion 83a are located between left side portion 86a and right side portion 86b extending from the coil portion of biasing spring 86. In this manner, biasing spring 86 elastically restricts arm base portion 121 with respect to locking portion 83a of flange 831 in locking portion 121c, and locking portion 121c is biased to always face the same direction as locking portion 83a. According to this configuration, the rotation of shift shaft 83 rotates arm base portion 121. FIG. 19 illustrates "center line at neutral position" which is a center line of a neutral position extending the center line of locking portion 121c and locking portion 83a when intermittent feed section 120A is at the neutral position before the start of the transmission operation. The neutral position of intermittent feed section 120A is a position where intermittent feed section 120A moves index cam 130A in a direction of one of shift-up and shift-down.

The rotation of shift shaft 83 rotates arm base portion 121. For example, when arm base portion 121 is in the shift operation of shift-up for example, arm base portion 121 rotates clockwise in FIGS. 15 and 19.

First feed arm portion 122 and second feed arm portion 123 include rod portions having a curved shape that approach each other toward the tips. Here, first feed arm portion 122 and second feed arm portion 123 are curved to surround pins 170 (171, 172) of index cam 130A, at positions overlapping index cam 130A.

Stopper portions 1223 and 1233 are provided on inner side portions of the rod portions of first feed arm portion 122 and second feed arm portion 123, the stopper portions 1223 and 1233 preventing arm base portion 121 that turns along with the rotation of shift shaft 83 from turning to the maximum turning position of shift shaft 83. Stopper portions 1223 and 1233 define steps in the inner side portions of the rod portions of first and second feed arm portions 122 and 123. As a result, the shapes closer to the tips from stopper portions 1223 and 1233 are provided so that stopper portions 1223 and 1233 are engaged with pins 170 (171, 172, and the like) of index cam 130A when intermittent feed section 120A returns to the reference position, and shift cam 110 is not rotated. Shift shaft 83 is reversed after the rotation of shift shaft 83 in the transmission operation and after a predetermined turning operation by intermittent feed section 120A, and intermittent feed section 120A returns to the reference position.

Claw portions 1221 and 1231 engaged with pins 170 (171, 172, and the like) of index cam 130A are provided on tip portions of first feed arm portion 122 and second feed arm portion 123. Biasing member (tension coil spring) 124 is suspended from first feed arm portion 122 and second feed arm portion 123, and biasing member 124 provides a bias so that outer edge portions of claw portions 1221 and 1231 overlap and abut each other. Biasing member 124 (see FIG. 15) biases first feed arm portion 122 and second feed arm portion 123 to surround and pull pins 170.

First feed arm portion 122 and second feed arm portion 123 move the center of oscillation of arm portions 122 and 123 based on the rotation of arm base portion 121 around shaft center C1 and oscillate based on the rotation relative to extension portion 121a. In this manner, one of claw portions 1221 and 1231 is engaged (hooked) with pin 170 (171, 172, or the like) of index cam 130A positioned in the oscillation direction, and hooked pin 170 is dislocated in the circumferential direction around shaft center C2 to rotate shift cam 110.

As in the first preferred embodiment, cam phase holding portion 140 holds index cam 130A in the phase corresponding to a predetermined transmission stage. In this manner, shift cam 110 fixed to index cam 130A is held in the phase corresponding to the transmission stage.

More specifically, in cam phase holding portion 140 shown in FIG. 17, follower 150 that has received the biasing force of follower spring 142 through follower arm 144 is abutted to index cam 130A to press index cam 130A substantially toward shaft center C2 (see FIG. 19). In this manner, the rotational force (torque) is provided to index cam 130A. The torque driven and input by shift actuator 81 is transmitted from pins 170 to index cam 130A through claw portions 1221 and 1231. The action of the torque enables stable rotation of shift cam 110 around shaft center C2.

Figure 20:
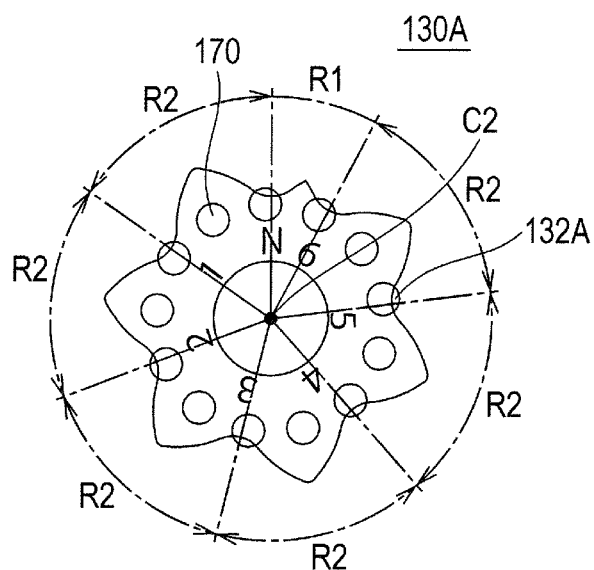
FIG. 20 is a diagram for explaining an index cam in FIG. 19.

FIG. 20 is a diagram provided for explaining index cam 130A and is equivalent to a right side diagram of engine unit 8A.

Index cam 130A is fixed to one end portion of shift cam 110 with the same shaft center as the shaft center of shift cam 110.

Like index cam 130 of the first preferred embodiment, the peripheral portion of index cam 130A is continuous in the circumferential direction, and the peripheral portion has a concave-convex (peak-valley) shape relative to the shaft center of index cam 130A. The positions of concave portions 132A defining the concave portions of the concave-convex shape are gear positions (stage entry positions) of the transmission gears in shift cam 110. More specifically, concave portions 132A in the peripheral portion of index cam 130A are engaged with follower 150 (see FIG. 17) when shift cam 110 intermittently turns, and cam phase holding portion 140 defines the phases of shift cam 110 corresponding to the transmission stages.

Index cam 130A is used in a bottom-neutral transmission apparatus with a six-stage transmission. Compared to index cam 130 of the first preferred embodiment, arranged phases of concave portions 132A are different in index cam 130A. Therefore, the rotation angle of index cam 130A and the arrangement of pin 170 in the transmission of each stage are different.

More specifically, concave portions 132A are provided on the peripheral portion of index cam 130A so that rotation angle R2 between neutral "N" and first gear "1" is the same as rotation angle R2 between first gear "1" and second gear "2". Rotation angle R2 is the same as the rotation angle between second gear "2" and third gear "3", the rotation angle between third gear "3" and fourth gear "4", the rotation angle between fourth gear "4" and fifth gear "5", and the rotation angle between fifth gear "5" and sixth gear "6".

In concave portions 132A, angle R1 of a range that the shift cam does not turn that is an acute angle between the concave portion of the top gear (here, sixth gear "6") and the concave portion of neutral "N" is smaller than rotation angle R2 between the concave portion of neutral "N" and the concave portion of first gear "1". Angle R1 here is ½ of angle R2.

On the peripheral cam surface on the peripheral portion of index cam 130A, angle R2, which includes concave portions 132A arranged at equal intervals in the circumferential direction from neutral "N" to sixth gear "6" equivalent to the top gear through first gear "1", and angle R1, which is defined by the acute angle between sixth gear "6" and neutral "N", are expressed by the following equations 3 and 4.

$$M = Q \times K - S \quad \text{(Equation 1)}$$

$$P = 360°/M \quad \text{(Equation 2)}$$

$$R2 = P \times Q \quad \text{(Equation 3)}$$

$$R1 = P \times S \quad \text{(Equation 4)}$$

K denotes the number of phases that the turn of index cam 130A is stopped between the first gear and the top gear including neutral, i.e., the number of concave portions 132, which is the number of variable gear stages in transmission mechanism 7 plus one (neutral position). In this case, M denotes the total number of pins 170 disposed on index cam 130A. In other words, M is the total number of driven sections set on the driven side of intermittent feed section 120A. 360° is an angle of one circle of shift cam 110, and P denotes an interval (angle) of arrangement of pins 170 in the circumferential direction. Q denotes a natural number indicating the number of intervals of pins 170 equivalent to the angle that index cam 130A is turned for the transmission of each stage (the number of pins necessary for advancing one stage). Particularly, Q=2 is desirable, although this is a design item. In other words, Q denotes the number of segments of engagement passive sections (pins 170) on the driven section side that the drive side of intermittent feed section 120A advances (rotates) in the transmission of one stage. S denotes the number of pins 170 included in angle R1 and is a natural number smaller than Q. Although this is a design item, S=1 when Q=2.

For example, the transmission apparatus is a bottom-neutral system with a six-stage transmission, and K is 7 in the equation. If Q is set to 2, S is 1, and total number M of pins 170 is 13. Interval P of pins 170 preferably is about 27.69°, for example, and R1 and R2 are calculated as follows according to the equations. Angle R1, i.e., angle R1 defined by an acute angle between the concave portion of the top gear (here, sixth gear "6") and the concave portion of neutral "N", is preferably about 27.69°, for example. Angle R2, i.e., angle R2 between adjacent concave portions in the circumferential direction of the other concave portions (concave portions corresponding to the other transmission stages ("1" to "6")), preferably is about 55.38°, for example.

Index cam 130A rotates around shaft center C2 of shift cam 110. Pins 170 in index cam 130A are disposed to protrude in the circumferential direction at constant radii from shaft center C2, on the side surface opposite shift cam 110 across the peripheral cam surface.

Pins 170 are engaged with claw portion 1221 of first feed arm portion 122 or with claw portion 1231 of second feed arm portion 123 to rotate index cam 130 around shaft center C2. The number of pins 170 (equivalent to number M calculated by equation 1) is preferably thirteen, for example, and pins 170 are disposed at equal intervals (equivalent to angle P calculated by equation 2) in the circumferential direction around shaft center C2. In the transmission of each stage, pins 170 are rotated by Q (two here) satisfying equations 1 to 4, and the gear stage is changed, i.e., concave portion 132 engaged with follower 150 is changed to adjacent concave portion 132 in the circumferential direction.

In index cam 130A, as shown in FIG. 19, when intermittent feed section 120A is at a predetermined neutral position before the rotation, i.e., when follower 150 is at the position of the concave portion of neutral "N", pins 170 are positioned so that claw portions 1221 and 1231 hold pin 171 protruding from near the bottom portion of the concave portion of "2" corresponding to the second gear toward the surface and pin 172 adjacent to pin 171 on the concave portion side of third gear "3" in the circumferential direction.

When shift mechanism 80A (see FIG. 17) performs an operation of shift-up, one pin 170 is locked with first arm portion 122 by the clockwise rotation of arm base portion 121, and index cam 130A is rotated clockwise. When shift mechanism 80A (see FIG. 17) performs an operation of shift-down, one pin 170 is locked with second arm portion 122 by the counterclockwise rotation of arm base portion 121, and index cam 130A is rotated counterclockwise.

In this manner, in both of the operation of shift-up and the operation of shift-down by shift mechanism 80A (see FIG. 17), the angle of the rotation of index cam 130A is equivalent to Q pins 170, Q satisfying equations 1 to 4. The shift operation driven by shift mechanism 80A will be specifically described below.

The shift-up operation performed by intermittent feed section 120A of the transmission apparatus will be described with reference to FIGS. 21A to 22C. An example of transmission from the neutral position (neutral reference phase in shift cam 110) in shift mechanism 80A (see FIG. 17) to the first speed neutral position (first gear reference phase) will be described here. In FIGS. 21A to 22C as well as FIGS. 23A to 25B, the concave portions that hold index cam 130A in the phases corresponding to the gear positions of each speed in the periphery of index cam 130A are designated with reference numerals (N and 1 to 6) corresponding to the gear positions of each speed, for convenience.

Figure 21A:
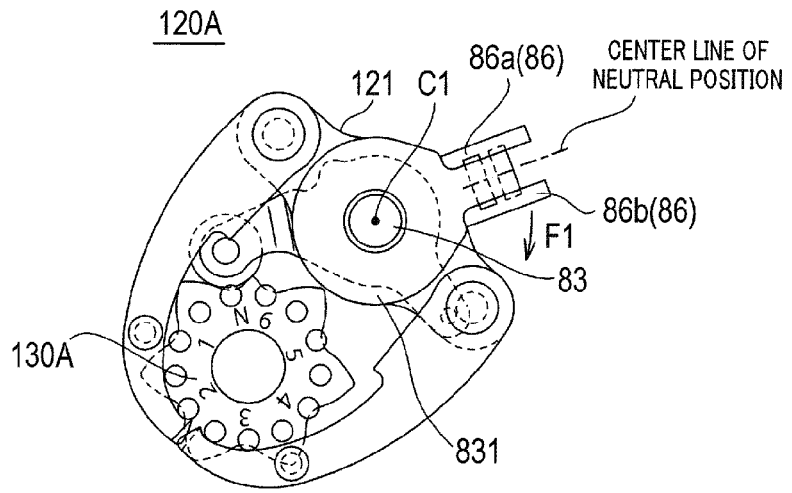
FIGS. 21A to 21C are diagrams for explaining a shift-up operation by the shift mechanism shown in FIG. 19.
Figure 21B:
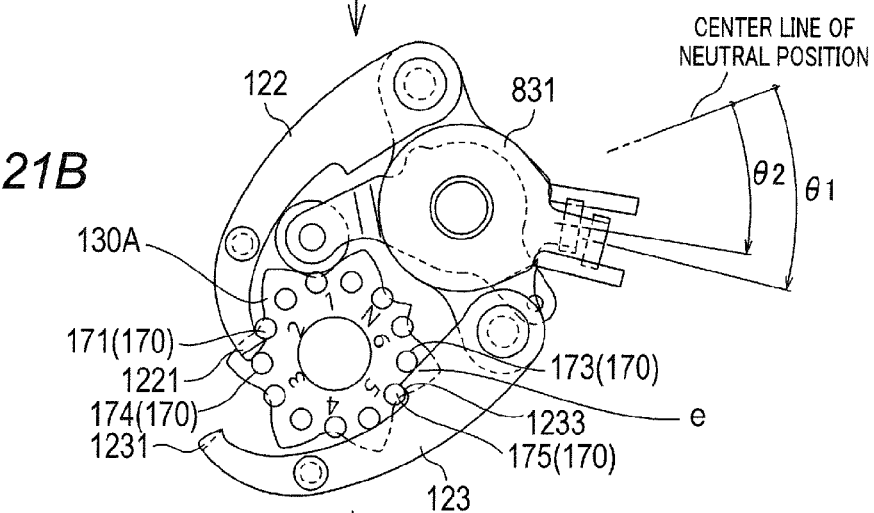

Intermittent feed section 120A is at the standby position (arm base portion 121 is at the neutral position) in intermittent feed section 120A in the neutral position state shown in FIG. 21A. In intermittent feed section 120A shown in FIG. 21A, shift shaft 83 is rotated and driven clockwise (arrow F1 direction). As a result, arm base portion 121 also turns clockwise (arrow F1 direction) through flange portion 831 and biasing spring 86 integrated with shift shaft 83. Along with the turn of arm base portion 121, claw portion 1221 at the tip of first feed arm portion 122 is engaged with pin (pin near the concave portion of second speed) 171 positioned in the middle of the movement as shown in FIG. 21B. Claw portion 1221 hooks pin 171 to rotate and drive index cam 130A clockwise. In this manner, follower 150 of cam phase holding portion 140 rolls into concave portion 132 of first speed "1". Thus, shift cam 110 moves to the phase of first gear.

In this case, shift shaft 83 is rotated and driven to the maximum range of the rotation range set in shift actuator 81 (equivalent to angle indicated by angle θ1 from the center line of the neutral position). Due to the rotation of shift shaft 83, arm base portion 121 and first feed arm portion 122 rotate shift cam 110, and shift cam 110 moves to the phase of the first gear. Although shift cam 110 rotates up to an angle slightly exceeding the first gear reference phase before shift actuator 81 reaches the maximum rotation angle (angle θ1 from the center line of the neutral position), pin 173 (170) is abutted to edge e of the rod portion of second feed arm portion 123. This regulates the turn of index cam 130A and stops the clockwise (shift-up direction) rotation of shift cam 110. In this case, at the tip portion of first feed arm portion 122, pin 174 (170) adjacent counterclockwise from pin 171 pulled by claw portion 1221 is abutted to the outer edge portion of claw portion 1221. Another pin 175 (170) is also abutted to stopper portion 1233 of second feed arm portion 123. This regulates the turn of shift cam 110 in the counterclockwise direction and the clockwise direction. Further turn of arm base portion 121 in the clockwise direction is regulated, and the rotation is stopped.

More specifically, arm base portion 121 rotates and drives index cam 130A to the first gear phase through first arm portion 122 in the shift-up operation, and arm base portion 121 stops rotating when index cam 130A is rotated to the first gear phase. The turning angle of arm base portion 121 in this case is rotation operation range (θ2) in the shift-up operation. Shift shaft 83 (flange 831 of shift shaft 83) transmits the rotational force to arm base portion 121 through biasing spring 86. Therefore, the deflection of biasing spring 86 increases until shift actuator 81 (see FIG. 17) stops, and shift shaft 83 (flange 831) rotates in a turning range greater than the rotation operation range of arm base portion 121. Turning angle range θ1 of shift shaft 83 shown in FIG. 21B is an angle greater than turning angle range θ2 of arm base portion 121 regulated by first feed arm portion 122 and second feed arm portion 123 (θ1>θ2).

Figure 21C:
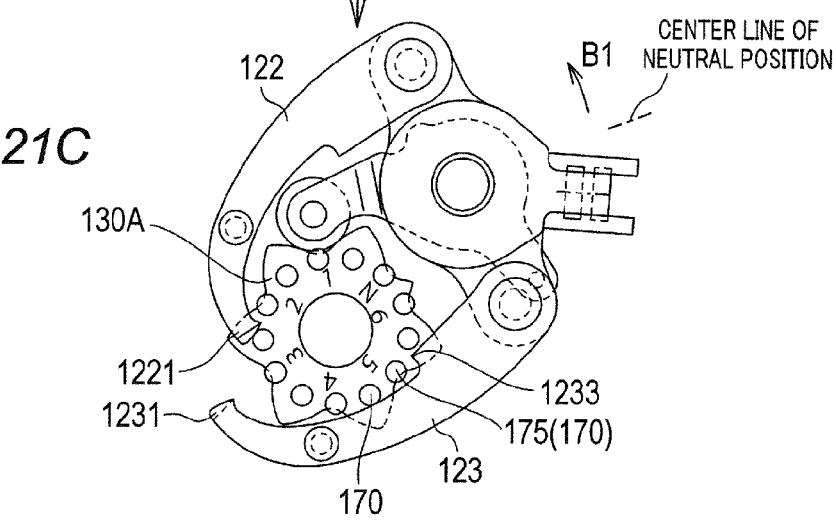
Figure 22A:
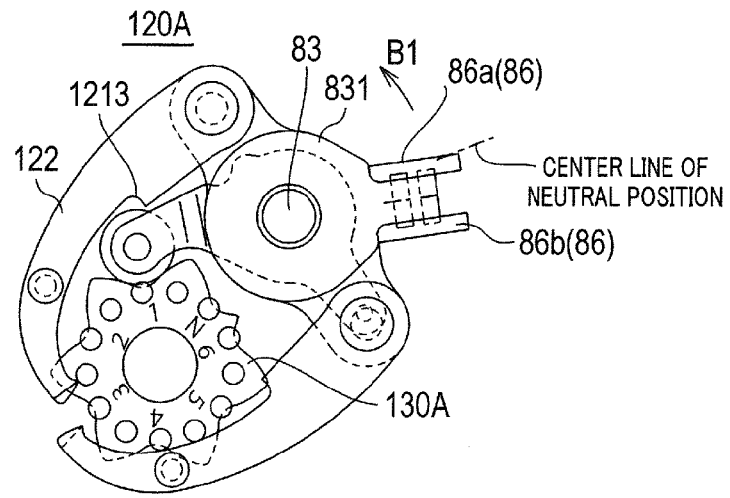
FIGS. 22A to 22C are diagrams for explaining the shift-up operation by the shift mechanism shown in FIG. 19.
Figure 22B:
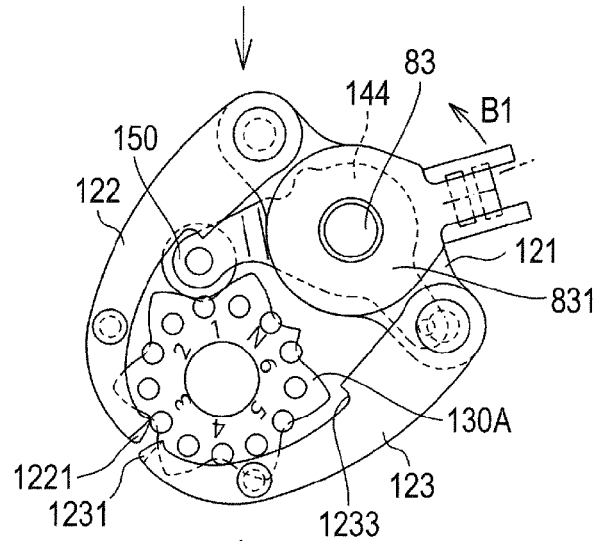
Figure 22C:
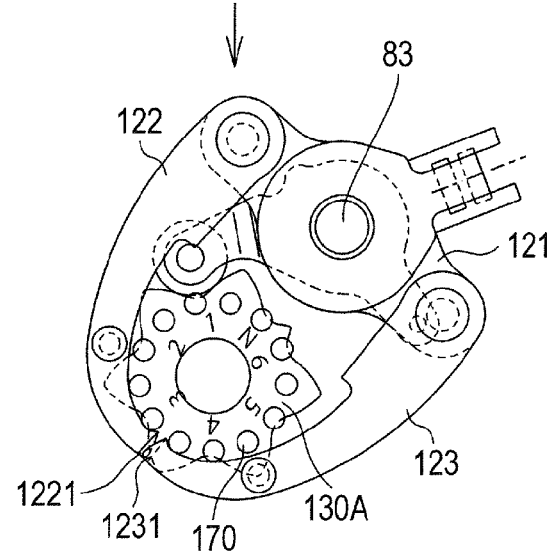

The rotation of shift cam 110 is converged through cam phase holding portion 140, and shift cam 110 is held in the first gear reference phase. Arm base portion 121 is rotated counterclockwise (arrow B1 direction) from this state to return intermittent feed section 120A to the neutral position. In this manner, first feed arm portion 122 and second feed arm portion 123 connected to arm base portion 121 follow this to slide while being abutted to pins 170 and move to return to the neutral position. In this case, as shown in FIG. 21C, second feed arm portion 123 is guided and slid while being abutted to pin 170 at the inner side portion, and second feed arm portion 123 moves without being engaged to pin 170 (175 or the like). First feed arm portion 122 oscillates relative to arm base portion 121, and the outer edge portion of claw portion 1221 at the tip is abutted to, but not engaged with, pin 170 (174 or the like) and moves beyond pin 170 (see FIG. 21C→FIG. 22A→FIG. 22B).

In this manner, shift cam 110 is not rotated when intermittent feed section 120A (arm base portion 121, first feed arm portion 122, and second feed arm portion 123) returns to the neutral position. This completes the series of operations of disposing intermittent feed section 120A in the first speed neutral position, disposing index cam 130A in the first gear reference phase (see FIG. 22C), returning index cam 130A to the neutral position that is the standby state before the drive, and rotating shift cam 110 to position shift cam 110 by changing the phase from the neutral reference phase to the first gear reference phase.

Although the transmission from the neutral to the first gear has been described as an example of the shift-up operation, the same operation applies to the transmission from the first gear to the second gear, the transmission from the second gear to the third gear, and the transmission to the top gear (here, sixth gear).

The shift-down operation by intermittent feed section 120A of the transmission apparatus will be described with reference to FIGS. 23A to 25B. An example of transmission from the sixth speed neutral position (sixth gear reference phase in shift cam 110) to the fifth speed neutral position (fifth gear reference phase) in shift mechanism 80A (see FIG. 17) will be described here.

Figure 23A:
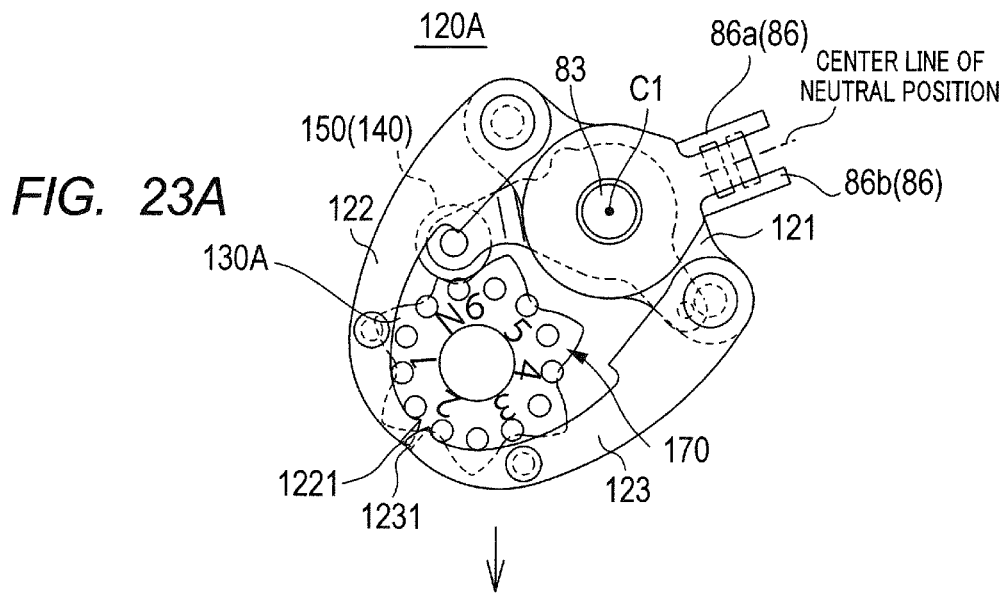
FIGS. 23A to 23C are diagrams for explaining a shift-down operation by the shift mechanism shown in FIG. 19.
Figure 23B:
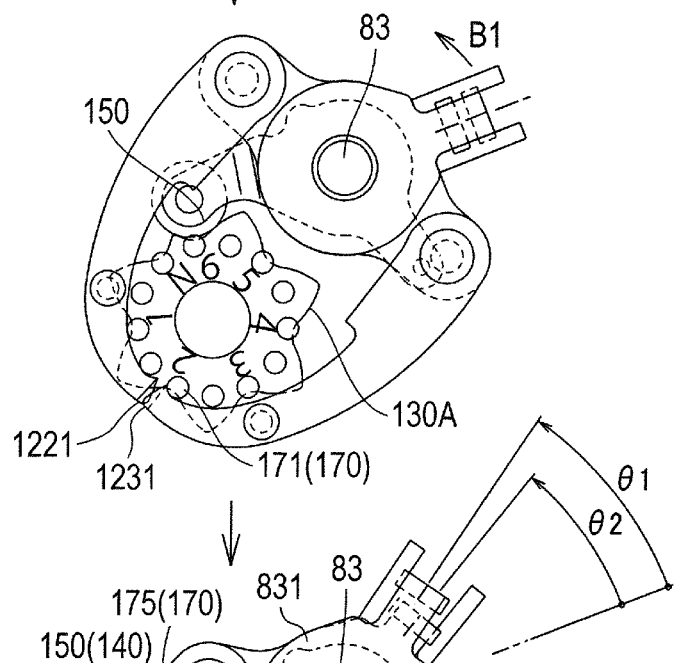

FIG. 23A illustrates intermittent feed section 120A, in which intermittent feed section 120A is in the sixth speed neutral position, and the shift cam is in the sixth gear reference phase. Intermittent feed section 120A of FIG. 23A is in the standby state (arm base portion 121 is positioned in the neutral position). In the shift-down operation, shift shaft 83 is rotated and driven counterclockwise (arrow B1 direction) as shown in FIG. 23B. As a result, arm base portion 121 also turns counterclockwise (arrow B1 direction) through flange portion 831 and biasing spring 86 integrated with shift shaft 83. In this manner, claw portion 1231 at the tip of second feed arm portion 123 is engaged with pin 171 positioned in the middle of the movement to hook pin 171 to rotate and drive index cam 130A counterclockwise. As a result, follower 150 of cam phase holding portion 140 rolls into concave portion 132 of fifth gear "5". Thus, shift cam 110 moves to the reference phase of fifth gear (see FIG. 23C).

Figure 23C:
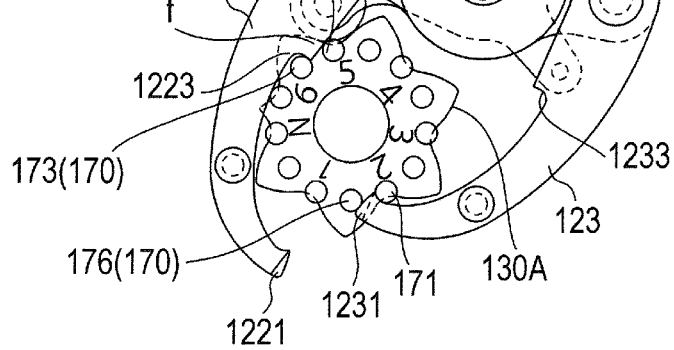

In this case, as shown in FIG. 23C, shift shaft 83 is rotated and driven to the maximum range of the rotation range set in shift actuator 81 (equivalent to the angle indicated by angle θ1 from the neutral position). As a result of the rotation of shift shaft 83, arm base portion 121 and second feed arm portion 123 rotate to rotate shift cam 110 through index cam 130A to move shift cam 110 to the phase of the fifth gear. In this case, shift cam 110 rotates up to an angle slightly exceeding the fifth gear reference phase before shift actuator 81 reaches the maximum rotation angle (angle θ1 from the center line of the neutral position). Meanwhile, pin 175 (170) is abutted to edge f of the rod portion of first feed arm portion 122 to regulate the turn of index cam 130A to stop the rotation of shift cam 110 counterclockwise (shift-down direction). In this case, at the tip portion of second feed arm portion 123, pin 176 (170) adjacent clockwise from pin 171 pulled by claw portion 1231 is abutted to the outer edge portion of claw portion 1231. Another pin 173 (170) is also abutted to stopper portion 1223 of first feed arm portion 122. This regulates the turn of shift cam 110 in the clockwise direction and the counterclockwise direction. Further turn of arm base portion 121 in the counterclockwise direction is restricted, and the rotation is stopped.

More specifically, arm base portion 121 rotates and drives index cam 130A to the fifth gear phase through second feed arm portion 123 in the shift-down operation, and arm base portion 121 stops rotating when index cam 130A is rotated to the fifth gear phase. The turning angle of arm base portion 121 in this case is rotation operation range (θ2) in the shift-down operation. Shift shaft 83 (flange 831 of shift shaft 83) transmits the rotational force to arm base portion 121 through biasing spring 86. Therefore, the deflection of biasing spring 86 increases until shift actuator 81 stops, and shift shaft 83 (flange 831) rotates in a turning range greater than the rotation operation range of arm base portion 121. Turning angle range θ1 of shift shaft 83 shown in FIG. 23C is an angle greater than turning angle range θ2 of arm base portion 121 regulated by first feed arm portion 122 and second feed arm portion 123 (θ1>θ2).

The rotation of shift cam 110 is converged by cam phase holding portion 140, and shift cam 110 is held in the fifth gear phase. Arm base portion 121 is rotated clockwise (arrow F1 direction shown in FIG. 24A) from this state to return intermittent feed section 120A to the neutral position. First feed arm portion 122 and second feed arm portion 123 connected to arm base portion 121 follow this to slide while being abutted to pins 170 and move to return to the neutral position. In this case, as sequentially shown in FIGS. 23C, 24A, and 24B, first feed arm portion 122 is guided and slid while being abutted to pins 170 (173, 175, and the like) at the inner side portion, and first feed arm portion 122 moves without being engaged to pins 170.

Figure 24A:
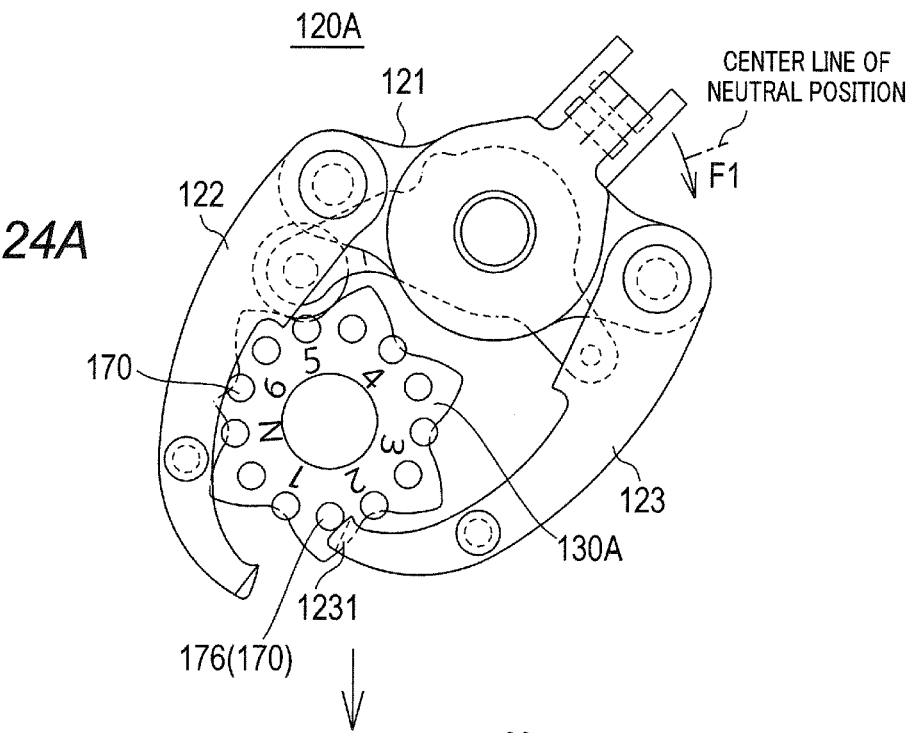
FIGS. 24A and 24B are diagrams for explaining the shift-down operation by the shift mechanism shown in FIG. 19.
Figure 24B:
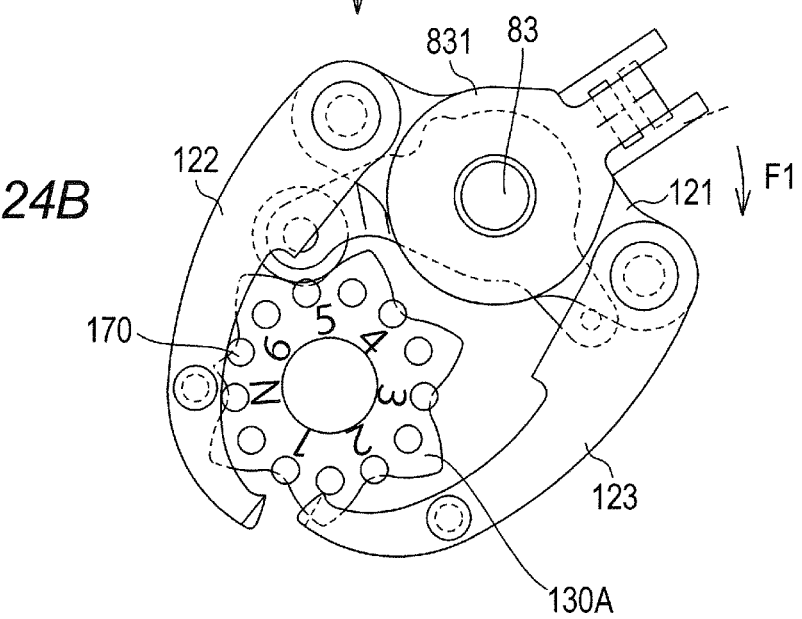

Meanwhile, as shown in FIGS. 23C and 24A, the outer edge portion of claw portion 1231 of second feed arm portion 123 is abutted to pin 176 between concave portion "1" and concave portion "2" among pins 170. However, second feed arm portion 123 oscillates, and claw portion 1231 exceeds pin 176 (170) without being hooked to pin 176 (170) (see FIG. 24B).

In this manner, arm base portion 121, first feed arm portion 122, and second feed arm portion 123 defining the drive side in intermittent feed section 120A position (cam feed) index cam 130A on the driven side in intermittent feed section 120A and shift cam 110 fixed to index cam 130A in predetermined phases. Arm base portion 121, first feed arm portion 122, and second feed arm portion 123 in intermittent feed section 120A return to the neutral positions without rotating the driven side (index cam 130A and shift cam 110) after the cam feed (see FIG. 25A).

Figure 25A:
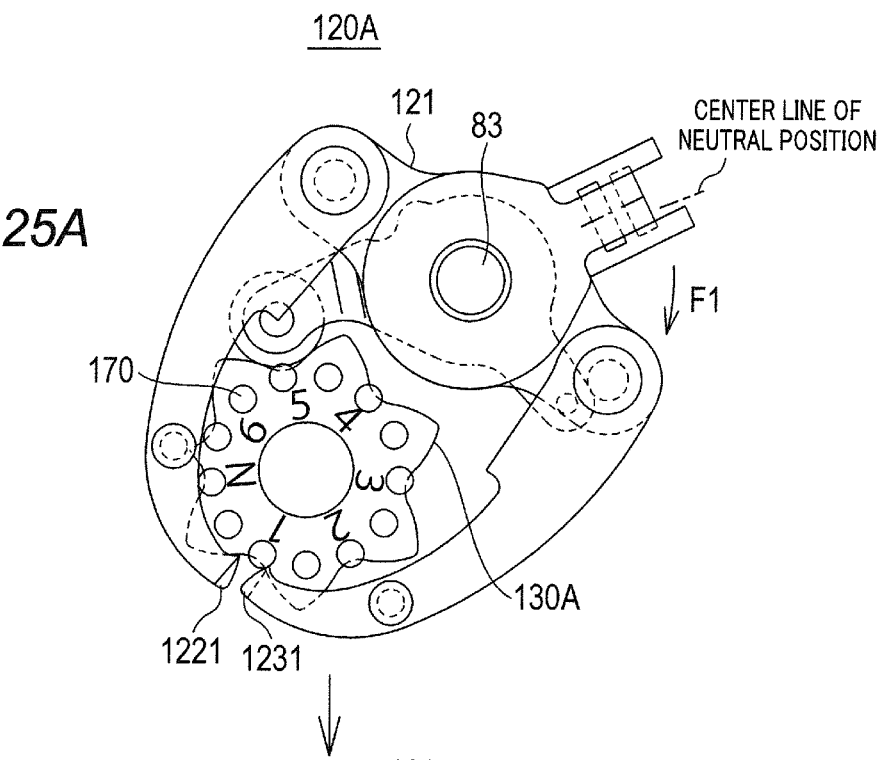
FIGS. 25A and 25B are diagrams for explaining the shift-down operation by the shift mechanism shown in FIG. 19.
Figure 25B:
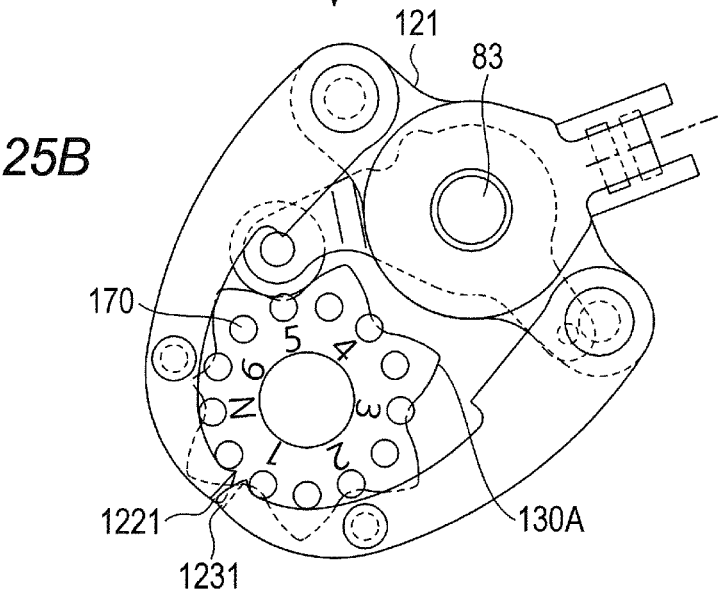

In this manner, as shown in FIG. 25B, intermittent feed section 120A disposes shift cam 110 in the fifth gear reference phase and returns shift cam 110 to the neutral position that is the standby state before the drive. This completes the series of operations of rotating shift cam 110 to change the position from the sixth speed neutral position (sixth gear reference phase) to the fifth speed neutral position (fifth gear reference phase).

Although the transmission from the sixth speed neutral position (sixth gear reference phase in shift cam 110) to the fifth speed neutral position (fifth gear reference phase) is described as an example of the shift-up operation, the same operation preferably is applied to the transmission from the fifth gear to the fourth gear, the transmission from the fourth gear to the third gear, and the transmission to the neutral to allow movement to the gear position of each transmission gear stage and the reference phase.

According to the second preferred embodiment, the same effects as in the first preferred embodiment are obtained. More specifically, in bottom-neutral shift cam 110 configured to rotate according to six gears, the phases that hold shift cam 110 according to the gear positions are set at constant intervals in the circumferential direction without significantly narrowing down the angles to turn the shift cam between the transmission stages. Therefore, the increase in torque necessary to rotate the shift cam is significantly reduced or prevented, and the transmission is favorably performed.

Third Preferred Embodiment

Figure 26:
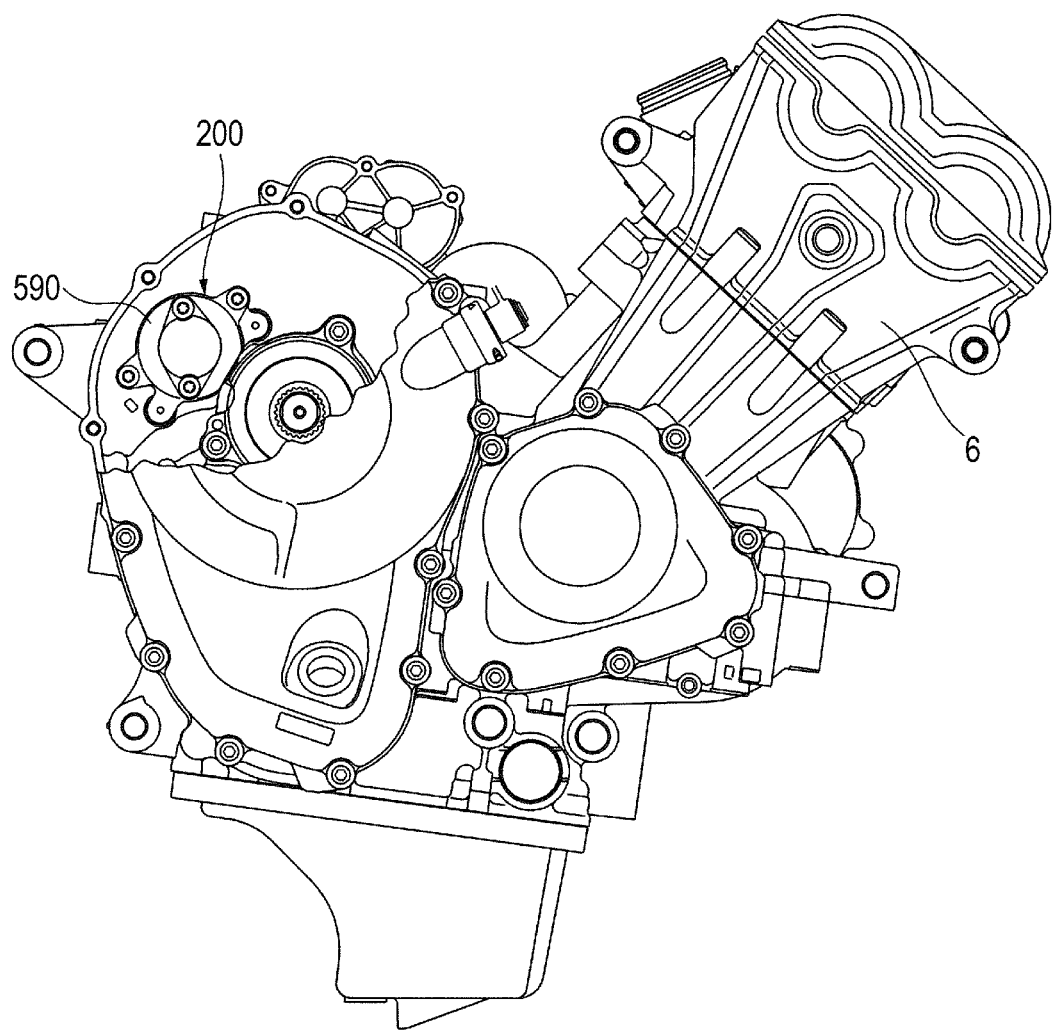
FIG. 26 illustrates a right side surface and a partially exploded view of an engine unit for explaining a transmission apparatus including a shift mechanism according to a third preferred embodiment of the present invention.
Figure 27:
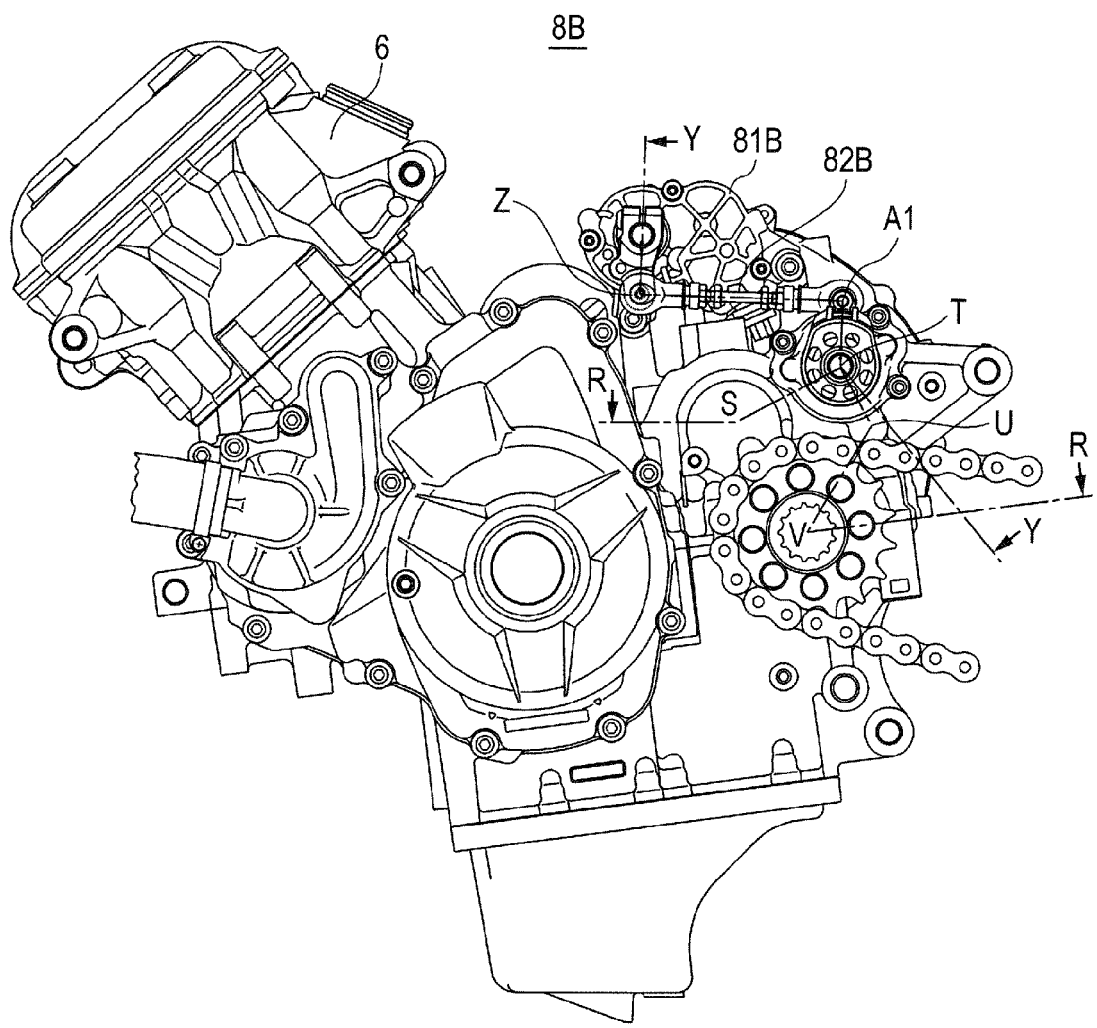
FIG. 27 illustrates a left side surface and a partially exploded view of the engine unit for explaining the transmission apparatus including the shift mechanism of the third preferred embodiment of the present invention.
Figure 28:
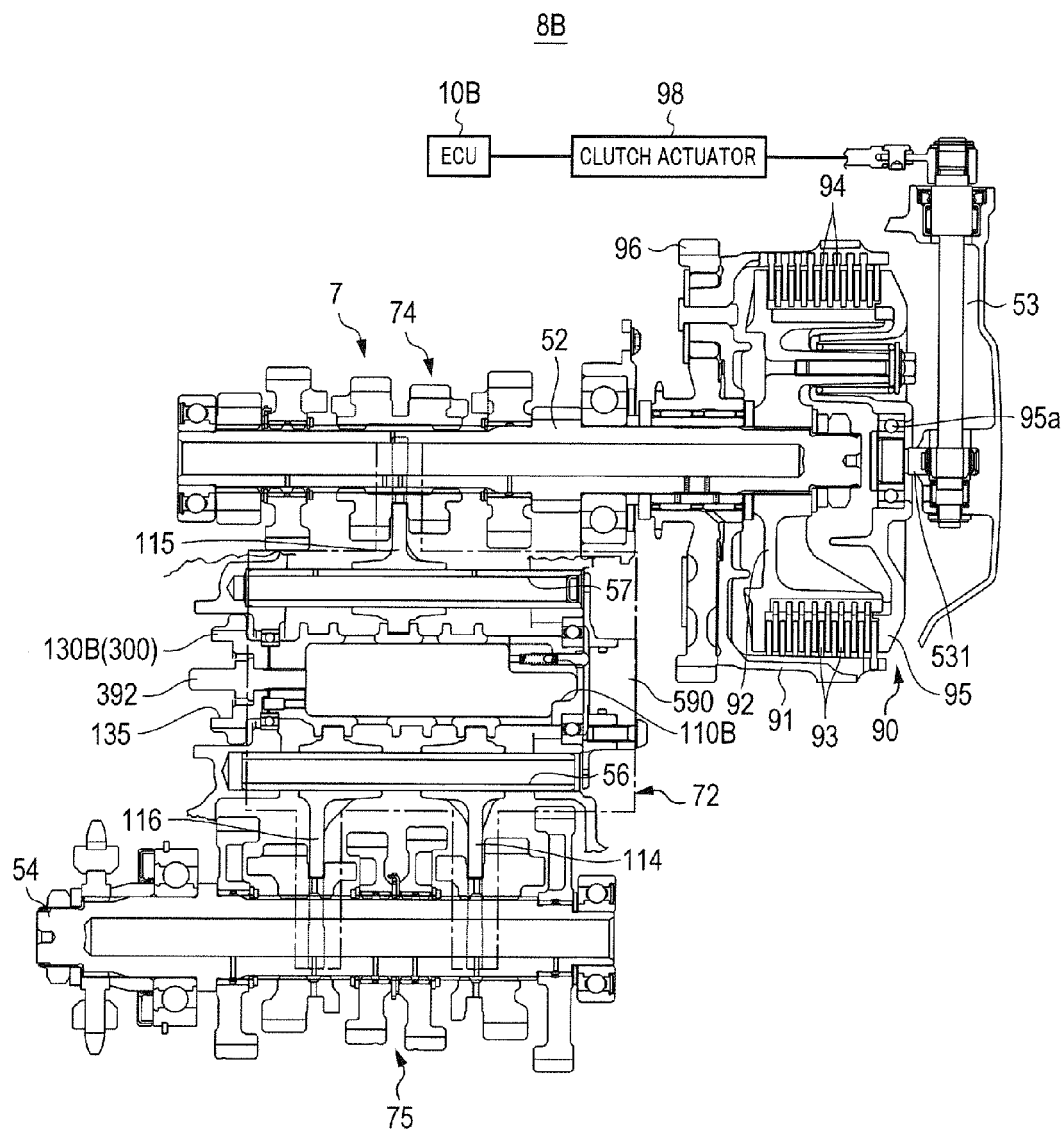
FIG. 28 is a cross-sectional developed view taken along line R-S-T-U-V-R in FIG. 27.
Figure 29:
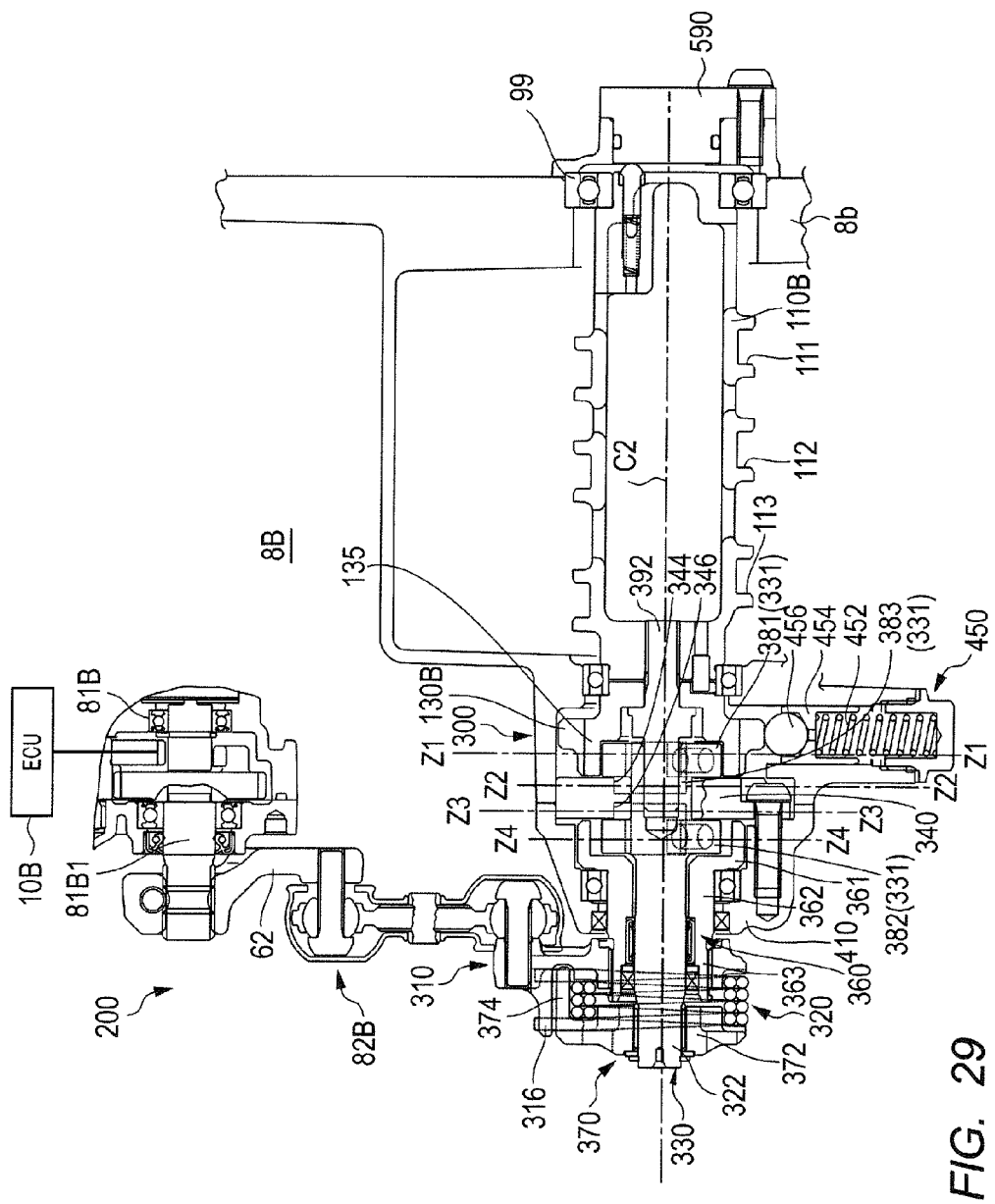
FIG. 29 is a cross-sectional developed view taken along line Y-Z-A1-T-Y in FIG. 27.

FIG. 26 is a right side diagram of engine unit 8B for explaining a transmission apparatus including a shift mechanism of the third preferred embodiment of the present invention, partially illustrating a state that a cover lid and the like are removed. FIG. 27 is a left side diagram of the engine unit for explaining the transmission apparatus including the shift mechanism of the third preferred embodiment of the present invention, partially illustrating the state that the cover lid and the like are removed. FIG. 28 is a developed view of a cross-section taken along line R-S-T-U-V-R in FIG. 27, and FIG. 29 is a developed view of a cross-section taken along line Y-Z-A1-T-Y in FIG. 27.

Compared to engine unit 8 of the first preferred embodiment, engine unit 8B shown in FIG. 26 has a different configuration of the shift mechanism including the intermittent feed section, and other basic configurations are the same. Therefore, different constituent elements will be described below, and the other same constituent elements are designated with the same reference numerals and will not be described.

Engine unit 8B is mounted in place of engine unit 8 in vehicle 1 of the first preferred embodiment.

As shown in FIGS. 26 to 29, engine unit 8B includes engine 6, ECU 10B, shift actuator (motor) 81B, clutch 90, clutch actuator 98, transmission mechanism 7, and shift mechanism 200. ECU 10B, transmission mechanism 7, shift mechanism 200, shift actuator 81B, clutch 90, and clutch actuator 98 define the transmission apparatus.

As shown in FIG. 28, transmission mechanism 7 is a staged transmission mechanism and includes main shaft 52, output shaft 54 disposed parallel or substantially parallel to main shaft 52, and sequential shift mechanism 72.

As shown in FIG. 29, shift mechanism 200 includes shift cam drive apparatus 300 that receives a driving force of motor 81B. Shift cam drive apparatus 300 accumulates the input driving force of motor 81B as a biasing force to rotate shift cam 110B and applies the biasing force to shift cam 110B to intermittently rotate and drive shift cam 110B.

Figure 30:
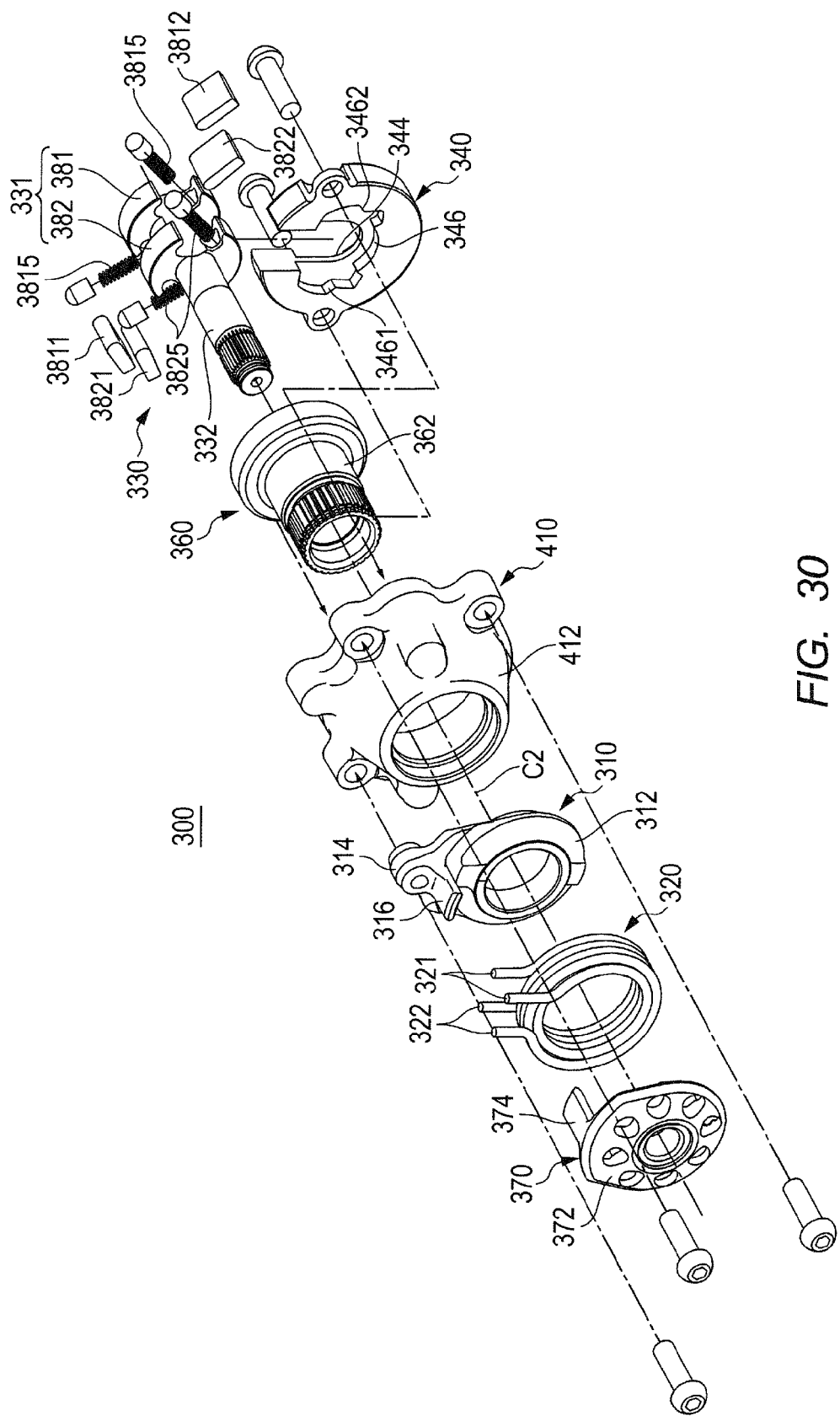
FIG. 30 is an exploded sketch of a shift cam drive apparatus shown in FIG. 29.

FIG. 30 is an exploded sketch of shift cam drive apparatus 300.

Shift cam drive apparatus 300 shown in FIGS. 29 and 30 includes index cam 130B (see FIGS. 28 and 29), rotation input section 310, power accumulation portion 320, rotation portion 330, regulation member 340, and cam phase holding portion 450. Shift cam 110B, index cam 130B (see FIGS. 28 and 29), rotation input section 310, power accumulation portion 320, and rotation portion 330 rotate around the same shaft center C2. Shift cam drive apparatus 300 includes functions of intermittent feed section 120 and the like of the first preferred embodiment.

A motor that is shift actuator 81B inputs a driving force to rotation input section 310 through shift rod 82.

Rotation input section 310 includes annular body portion 312 and link portion 314. Regulation cylindrical member 360 is cylindrical and is inserted to and supported by cylindrical housing member 410 fixed to a case, and regulation cylindrical member 360 is configured to turn. Regulation cylindrical member 360 includes first cylindrical portion 361, second cylindrical portion 362, and third cylindrical portion 363. Body portion 312 of rotation input section 310 includes a cylindrical base portion and includes a hole spline. Body portion 312 is fitted outside and engaged with a shaft spline of third cylindrical portion 363 in regulation cylindrical member 360 and is fixed to regulation cylindrical member 360. Rotation input section 310 is supported by housing member 410 along with regulation cylindrical member 360 and is disposed to regularly and reversely rotate around the same shaft center C2 as shift cam 110 based on the rotation of the motor.

Link portion 314 of rotation input section 310 extends upward from the peripheral portion of body portion 312 and is linked to one end of shift rod 82B at the upper end. The other end of shift rod 82B is linked to oscillation arm 62 fixed to output shaft 81B1 in which a reduction gear decelerates the rotation of the motor in shift actuator 81B. Link portion 314 is provided with plate-shaped locking portion 316 extending toward one end in a base portion opening direction of body portion 312.

Transmission passive section 370 includes disk-shaped body portion 372 and locking portion 374 having a substantially L-shaped cross-section above body portion 372. A tip portion of locking portion 374 extends in the opposition direction of the extension direction of locking portion 316 and is separated from locking portion 316 of rotation input section 310 in the radial direction from the rotation axis of shift cam 110B.

Rotation portion 330 includes rotor portion 331 and shaft portion 332 extending in a direction away from the shift cam along the axial direction of rotor portion 331. Shaft portion 332 is inserted to and supported by the internal diameter of regulation cylindrical member 360, and shaft portion 332 rotates. One end of shaft portion 332 protrudes from one end of third cylindrical portion 363.

Body portion 372 of transmission passive section 370 includes a hole spline at the base and is fixed to rotation portion 330 by being fitted outside and engaged with a shaft spline of shaft portion 332 protruding from one end of third cylindrical portion 363. Therefore, transmission passive section 370 relatively rotates around the rotation axis with respect to regulation cylindrical member 360 and rotation input section 310 along with rotation portion 330 and rotates around the same shaft center as shift cam 110B.

Power accumulation portion 320 is a torsion spring and includes first locking portion 321 and second locking portion 322. First locking portion 321 is defined by one winding end extending from the coil portion of the torsion spring of power accumulation portion 320, and second locking portion 322 is defined by another winding end. Power accumulation portion 320 is preferably provided by combining two torsion springs with different winding directions and winding diameters of coil portions, and one coil portion is inserted to the other coil portion. First locking portion 321 and second locking portion 322 are disposed parallel or substantially parallel to each other.

Power accumulation portion 320 is disposed between rotation input section 310 and transmission passive section 370 in the rotational axis direction of shift cam 110B. Body portion 312 and body portion 372 are inserted to the internal diameter of the coil portion of power accumulation portion 320, and body portion 312 and body portion 372 substantially define and serve as a rotation axis of power accumulation portion 320.

Locking portion 316 of rotation input section 310 and locking portion 374 of transmission passive section 370 are located between first locking portion 321 and second locking portion 322 of power accumulation portion 320 in the circumferential direction of the rotation axes, and the relative rotation in the circumferential direction is restricted by the biasing force (torque) of power accumulation portion 320.

Therefore, power accumulation portion 320 provides a bias so that locking portion 316 and locking portion 374 always face the same direction. Power accumulation portion 320 includes a preload, and based on the preload, power accumulation portion 320 elastically restricts transmission passive section 370 and rotation portion 330 relative to rotation input section 310. When rotation input section 310 rotates around rotation axis C2 of shift cam 110B, transmission passive section 370 and rotation portion 330 rotate to follow the turn of rotation input section 310 through the biasing force (torque) provided to locking portion 374 by power accumulation portion 320.

Rotation portion 330, along with regulation member 340 and index cam 130B, defines and functions as an intermittent feed section that intermittently feeds shift cam 110B. Rotation portion 330, along with regulation member 340, defines and functions as a drive-side portion of the intermittent feed section to rotate and drive index cam 130B that is a driven side.

Specifically, rotation portion 330 includes rotor portion 331 and shaft portion 332 that extend in the axial direction of rotor portion 331. A shaft center portion of rotor portion 331 is provided with a cylindrical hole opened toward the axis end facing shift cam 110B.

Rotor portion 331 includes first ratchet holding portion 381, second ratchet holding portion 382, and link portion 383 linking first ratchet holding portion 381 and second ratchet holding portion 382.

Nail plates 3811 and 3812 are attached to first ratchet holding portion 381, and nail plates 3821 and 3822 are attached to second ratchet holding portion 382 (see FIG. 30).

First ratchet holding portion 381 is provided with concave portions curving toward the central axis on both sides across the central axis. Nail plates 3811 and 3812 are disposed in the concave portions.

One end portion of nail plate 3811 is inserted to a curved corner portion on the upper side of the concave portion. Nail plate 3811 oscillates with the one end portion as the center of oscillation. One end portion of nail plate 3812 is inserted to a curved corner portion on the upper side of the other concave portion. Nail plate 3812 oscillates with the one end portion as the center of oscillation. Hereinafter, the other end of nail plate 3811 will be called a tip of nail plate 3811, and the other end of nail plate 3812 will be called a tip of nail plate 3812.

The lower side of the concave portion of first ratchet holding portion 381 is provided with capped spring 3815 that provides a bias to open the tips of nail plates 3811 and 3812 in the direction away from the rotation axis of rotation portion 330.

In the rotational axis direction of rotation portion 330, first ratchet holding portion 381 is inserted to cylindrical portion 135 (see FIG. 28) of index cam 130B. The width of nail plates 3811 and 3812 is larger than the width of first ratchet holding portion 381, and the tips of nail plates 3811 and 3812 are disposed across the internal diameter portion of cylindrical portion 135 of index cam 130B and first concave portion 344 of regulation member 340.

Second ratchet holding portion 382 is configured in the same manner as first ratchet holding portion 381 and is disposed on the side where transmission passive section 370 is attached, alongside first ratchet holding portion 381 in the axial direction of shift cam 110B.

Second ratchet holding portion 382 is provided with concave portions curving toward the central axis on both sides across the central axis. Nail plates 3821 and 3822 are disposed in the concave portions.

One end portion of nail plate 3821 is inserted to a curved corner portion on the upper side of the concave portion. Nail plate 3821 oscillates with the one end portion as the center of oscillation. One end portion of nail plate 3822 is inserted to a curved corner portion on the upper side of the other concave portion. Nail plate 3822 oscillates with the one end portion as the center of oscillation. Hereinafter, the other end of nail plate 3821 will be called the tip of nail plate 3821, and the other end of nail plate 3822 will be called the tip of nail plate 3822.

The lower side of the concave portion of second ratchet holding portion 382 is provided with capped spring 3825 that provides a bias to open the tips of nail plates 3821 and 3822 in the direction away from the rotation axis of rotation portion 330.

In the rotational axis direction of rotation portion 330, second ratchet holding portion 382 is inserted to first cylindrical portion 361 of regulation cylindrical member 360. The width of nail plates 3821 and 3822 is larger than the width of second ratchet holding portion 382, and the tips of nail plates 3821 and 3822 are disposed across the internal diameter portion of first cylindrical portion 361 of regulation cylindrical member 360 and second concave portion 346 of regulation member 340.

The hole of the shaft center portion of rotor portion 331 defines and functions as a bolt that fastens index cam 130B to shift cam 110B, and shaft 392 to support rotation portion 330 is inserted. As a result, the rotation axis of index cam 130B, rotation portion 330, and regulation cylindrical member 360 is arranged on the same straight line relative to the rotation axis of shift cam 110B.

Regulation cylindrical member 360 is mounted in housing member 410, and regulation cylindrical member 360 is configured to turn. First cylindrical portion 361 and second cylindrical portion 362 are housed in housing portion 412. Third cylindrical portion 363 protrudes from one end of housing member 410.

Housing member 410 includes cylindrical housing portion 412. Housing member 410 is attached to the case. In this manner, housing member 410 is fixed. Regulation member 340 is fixed to housing member 410.

Regulation member 340 has a disk shape and regulates the rotation of rotation portion 330. First concave portion 344 is provided on regulation member 340 on a center portion on the surface closer to shift cam 110B. Second concave portion 346 is provided on regulation member 340 on the center portion on the surface opposite first concave portion 344. In regulation member 340, an inner circumference surface defining a concave contour of second concave portion 346 regulates or releases regular and reverse rotations of rotation portion 330, and an inner circumference surface defining a concave counter to first concave portion 344 transmits or cuts off the rotational force from rotation portion 330 to index cam 130B.

Regulation member 340 is provided with a cut portion extending upward from the center portion. Link portion 383 of rotation portion 330 is inserted to the cut portion.

Cam phase holding portion 450 holds the phase of shift cam 110B and includes spring 452, movement member 454, and ball 456. Cam phase holding portion 450 holds shift cam 110B in a phase at each certain rotation angle (for example, 360°/13×2=55.38° in the present preferred embodiment), along with the peripheral surface shape (peak portion 134 and concave portion 132) of index cam 130B.

Spring 452 opens toward the peripheral surface of index cam 130B and is disposed in the hole portion of unit case 8 orthogonal or substantially orthogonal to rotation axis C2 of shift cam 110B. Movement member 454 is abutted to one end of spring 452. Movement member 454 is provided to move in the axial direction of spring 452.

Ball 456 is provided between movement member 454 and the peripheral surface (area provided with peak portion 134 and concave portion 132) of index cam 130B. Spring 452 biases ball 456 toward the central axis of index cam 130B (rotation axis C2 of shift cam 110B) through movement member 454.

The combination of spring 452, movement member 454, ball 456, peak portion 134, and concave portion 132 supplies a rotational force (torque) to rotating shift cam 110B.

Figure 31:
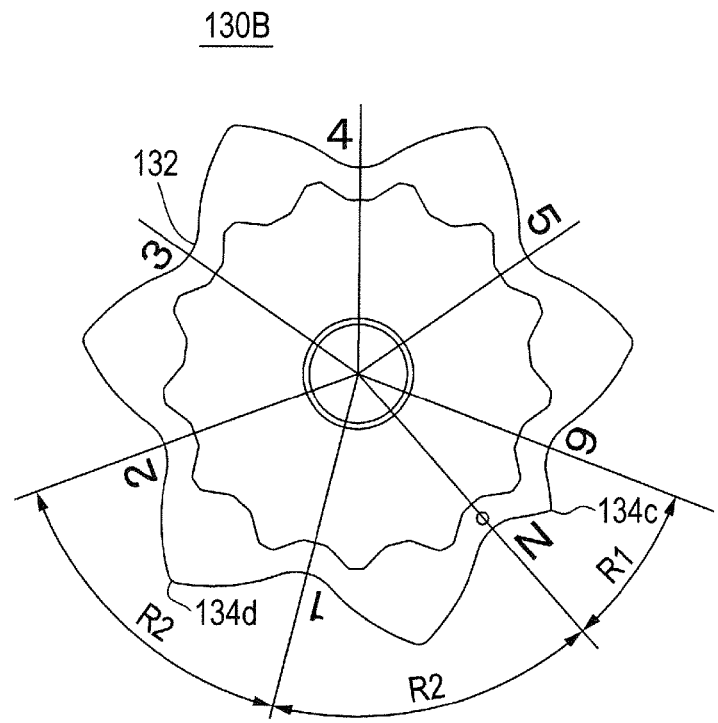
FIG. 31 illustrates a shape of an outer diameter cam in the index cam for explaining a phase angle set in a cam phase holding portion of the index cam.

FIG. 31 illustrates the shape of index cam 130B viewed from the rotational axis direction of shift cam 110B (left side in FIG. 29). In FIG. 31, reference numerals (N and 1 to 6) corresponding to the gear positions of each speed are provided near the concave portions that hold index cam 130B in the phases corresponding to the gear positions of each speed in the periphery of index cam 130B, for convenience. Reference numerals (N and 1 to 6) are also provided in FIGS. 32 to 40D for convenience.

Index cam 130B shown in FIGS. 28, 29, and 31 is fixed to one end portion of shift cam 110B by the same shaft center as shift cam 110B through shaft 392. The other end portion of shift cam 110B that turns is supported by wall portion 8b of the unit case through bearing 99, and the position in the axial direction is fixed by gear position sensor section 590.

In index cam 130B, the peripheral portion is continuous in the circumferential direction and has a concave-convex (peak-valley) shape relative to the shaft center of index cam 130B. The positions of concave portions 132 defining the concave portions of the concave-convex shape are gear positions (stage entry positions) of the transmission gears in shift cam 110B. Therefore, concave portions 132 that define the phases of shift cam 110B corresponding to the transmission stages when shift cam 110B intermittently turns are provided along the periphery of the peripheral portion of index cam 130B. Concave portions 132 are engaged with ball 456 of cam phase holding portion 450 to converge and hold shift cam 110B in predetermined phases.

Concave portions 132 are provided on the peripheral portion of index cam 130B so that rotation angle R2 between neutral "N" and first gear "1" is the same as rotation angle R2 between first gear "1" and second gear "2". In addition, concave portions 132 are configured so that angle R1 defined by an acute angle between the concave portion corresponding to the top gear (here, sixth gear "6") and neutral "N" is smaller than rotation angle R2 between neutral "N" and first gear "1".

In the present preferred embodiment, the transmission apparatus is a bottom-neutral transmission apparatus with a six-stage transmission, and the position of the neutral position is below the first speed gear position in the shift pattern. Therefore, concave portions 132 of index cam 130B are provided in the peripheral portion from neutral position "N", through the first gear, and sequentially in the phases corresponding to the second gear, the third gear, . . . , and the sixth gear in the counterclockwise direction. Hereinafter, the concave portion provided at the position corresponding to neutral and the concave portions provided at the positions corresponding to n transmission stages will also be called "neutral concave portion" or "n-th speed concave portions" for convenience.

The height of peak portion (convex portion) 134c provided in the arc on one side defined by an acute angle between the concave portion of neutral "N" and the concave portion of sixth gear "6" in index cam 130B is lower than the height of peak portion 134d provided between adjacent concave portions in the circumferential direction in the arc on the other side with the concave portion of first gear "1" (see FIG. 31).

Therefore, the rotation angle between the phase of neutral and the phase of first gear is the same as the rotation angle between the phase of first gear and the phase of second gear in index cam 130B. The rotation angle between the phase of first gear and the phase of second gear is the same as the rotation angles between second gear and third gear, between third gear and fourth gear, between fourth gear and fifth gear, and between fifth gear and sixth gear.

Figure 32:
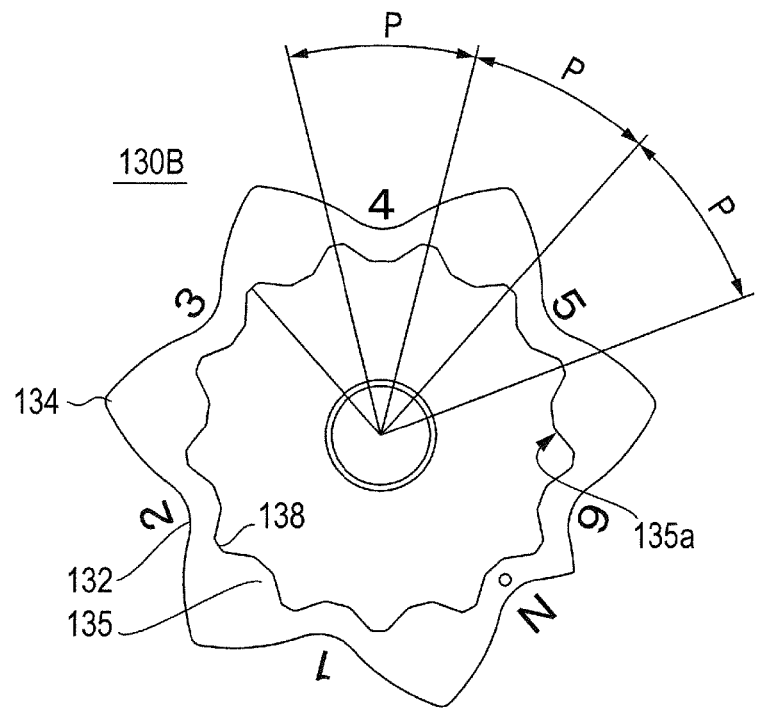
FIG. 32 illustrates a shape of an internal tooth gear in the index cam for explaining a feed angle set in a driven section of an intermittent turn mechanism.

FIG. 32 illustrates an arrangement of concave surfaces 138 with a substantially V-shaped cross-section set in an engagement passive section on the driven section side in the intermittent feed section of the present preferred embodiment. Concave surfaces 138 shown in FIG. 32 are provided along inner circumference surface 135a of cylindrical portion 135 (see FIGS. 28 and 29) of index cam 130B. On the inner circumference surface of cylindrical portion 135, the number of concave surfaces 138 is expressed by M in the following equations, and concave surfaces 138 are disposed at equal intervals at an angle expressed by P in the following equations.

On the peripheral cam surface provided on the peripheral portion of index cam 130B, angle R2 for disposing concave portions 132 at equal intervals in the circumferential direction from neutral "N" to sixth gear "6" equivalent to the top gear through first gear "1" and angle R1 defined by the acute angle between sixth gear "6" and neutral "N" are expressed by the following equations 3 and 4.

$$M = Q \times K - S \quad \text{(Equation 1)}$$

$$P = 360°/M \quad \text{(Equation 2)}$$

$$R2 = P \times Q \quad \text{(Equation 3)}$$

$$R1 = P \times S \quad \text{(Equation 4)}$$

K denotes the number of phases that the turn of index cam 130B is stopped between the first gear and the top gear including neutral, i.e., the number of variable gear stages in transmission mechanism 7 plus one (neutral position). In this case, M denotes the total number of concave surfaces 138 disposed on index cam 130B. In other words, M denotes the total number of engagement passive sections set on the driven section side of the intermittent feed section 360° is an angle of one circle of shift cam 110B, and P denotes an interval (angle) of arrangement of concave surfaces 138 in the circumferential direction.

Q denotes a natural number indicating the number of intervals of concave surfaces 138 equivalent to the angle that index cam 130B is rotated for the transmission of each stage. Although Q is a design item, Q=2 is particularly desirable. In other words, Q denotes the number of segments of engagement passive sections (concave surfaces 138) on the driven section side that first ratchet holding portion 381 that is the drive side of intermittent feed section advances in the transmission of one stage. S denotes the number of concave surfaces 138 included in angle R1 and is a natural number smaller than Q. Although this is a design item, S=1 when Q=2.

For example, the transmission apparatus is a bottom-neutral system with a six-stage transmission, and K is 7 in the equation. If Q is set to 2, S is 1, and M is 13. Interval P of concave surfaces 138 is about 27.69°, and the values are assigned to equations 1 to 4. As for rotation angles R1 and R2, angle R1 defined by an acute angle between the concave portion of the top gear (here, sixth gear "6") and the concave portion of neutral "N" preferably is about 27.69°, for example, and angle R2 between adjacent concave portions in the circumferential direction of the other concave portions (concave portions corresponding to the other transmission stages ("1" to "6")) preferably is about 55.38°, for example.

Concave surfaces 138 are engaged with nail plate 3811 or 3812 in first ratchet holding portion 381 of rotation portion 330 defining the intermittent feed section to rotate rotation portion 330 to rotate index cam 130B. The number of concave surfaces 138 (M in the equation) is preferably thirteen, for example, and concave surfaces 138 are disposed at equal intervals (angle P in the equation) in the circumferential direction around shaft center C2. In the transmission of each stage, concave surfaces 138 are rotated by Q segments in the equation (here, two parts) to change the gear stage, i.e., to change concave portion 132 engaged with ball 456 to concave portion 132 adjacent in the circumferential direction.

In shift mechanism 200, the rotation of shift actuator (motor) 81B regularly or reversely rotates rotation input section 310, and power accumulation portion 320 accumulates the rotational force as a biasing force to rotate rotation portion 330. Rotation portion 330 is configured to rotate shift cam 110B through index cam 130B.

When the rotation angles of rotation input section 310 and regulation cylindrical member 360 are predetermined angles, the accumulated biasing force causes rotation input section 310, regulation member 340, and regulation cylindrical member 360 to rotate rotation portion 330 to rotate shift cam 110B through nail plates 3811 and 3812 and index cam 130B.

ECU 10B preferably has the same function as ECU 10, except that the control target is shift mechanism 200 in place of shift mechanism 80.

ECU 10B is programmed or configured to control the drive of clutch actuator 98 and shift actuator 81B and to control the drive of clutch 90 and shift mechanism 200.

Particularly, through shift rod 82B of shift mechanism 200, ECU 10B rotates rotation input section 310 at a predetermined rotation angle in one of regular and reverse directions around the axis of shift cam drive apparatus 300.

The angles for intermittent feed are arranged at positions of an integral multiple (Q in the equation) of the interval of concave surfaces 138 provided in the circumferential direction, and the rotation angle range of rotation input section 310 rotated by motor 81B that is a shift actuator is made constant to perform efficient transmission.

Particularly, in shift mechanism 200 according to the third preferred embodiment, from the state that shift mechanism 200 is at the neutral position before the start of the transmission operation, ECU 10B drives shift actuator 81B in the shift-up or shift-down operation to input a rotational force to rotation input section 310. In this case, nail plate 3821 or 3822 is locked with second concave portion 346 of regulation member 340 to regulate the turn of rotation portion 330. Along with the regulation of the turn, the biasing force accumulated in power accumulation portion 320 based on the input of rotation input section 310 is provided to rotation portion 330 through transmission passive section 370. When the rotation angles of rotation input section 310 and regulation cylindrical member 360 are predetermined angles, the lock of nail plate 3821 or 3822 with second concave portion 346 of regulation member 340 is released. In this manner, rotation portion 330 is rotated by the biasing force accumulated in power accumulation portion 320 and transmits the rotational force to concave surfaces 138 through nail plate 3811 or 3812 to rotate index cam 130B and shift cam 110B.

The tip of nail plate 3821 or 3822 locked with second concave portion 346 of regulation member 340 is dislocated and folded in the direction of rotation axis C2 of rotation portion 330 to release the regulation of the turn of rotation portion 330. The portion of the shape of the internal diameter portion of first cylindrical portion 361 is rotated along with regulation cylindrical member 360 to displace the tip of nail plate 3821 or 3822. More specifically, the turn of rotation portion 330 is regulated or deregulated by a predetermined unique rotation angle relative to regulation member 340, of the internal diameter portion of first cylindrical portion 361 of regulation cylindrical member 360 rotated along with rotation input section 310. Therefore, a predetermined angle that rotation input section 310 rotates relative to transmission passive section 370 is provided between (angle) the neutral position of rotation input section 310 and the position of the deregulation of the turn of rotation portion 330. In this manner, a sufficiently large biasing force (torque) to be provided by power accumulation portion 320 is always accumulated at the start of the turn of shift cam 110B along with rotation portion 330 after the elimination of the regulation of the turn of rotation portion 330. Therefore, the transmission to any gear stage (gear position) is efficiently performed.

FIGS. 33A to 40D are diagrams for explaining an operation of the transmission apparatus of the third preferred embodiment. In FIGS. 33A to 40D, A to D illustrate cross-sections at the same time (same moment) of the portions corresponding to cross-sections Z1 to Z4 in FIG. 29.

The operation of transmission of shift mechanism 200 from the neutral (N) position to the first speed neutral position is illustrated here.

In shift cam drive apparatus 300 shown in FIGS. 33A to 33D, motor 81B (see FIG. 29) that is a shift actuator is driven to move rotation input section 310 through shift rod 82B. Since this is the transmission from N to the first gear, rotation input section 310 is driven in the shift-up direction (F2 direction). As a result, transmission passive section 370 is restricted by rotation input section 310 due to the torsion spring that is power accumulation portion 320, and transmission passive section 370 follows rotation input section 310 to rotate (see FIG. 33D).

Rotation portion 330 is integrated with transmission passive section 370, and rotation portion 330 also rotates from the reference phase according to the rotation of transmission passive section 370.

As shown in FIGS. 34A to 34D, when rotation portion 330 slightly rotates from the neutral position, second ratchet holding portion 382 (specifically, nail plate 3821) is abutted to rotation regulation surface 3461 in second concave portion 346 of regulation member 340. This regulates the rotation of rotation portion 330. In this case, a gap still remains between the tip of nail plate 3811 of first ratchet holding portion 381 and concave surface 138 of index cam 130B, and index cam 130B is not rotated.

Shift actuator 81B rotates rotation input section 310. Since rotation input section 310 is integrated with regulation cylindrical member 360, regulation cylindrical member 360 also rotates along with rotation input section 310.

Consequently, as shown in FIGS. 35A to 35D, trigger surface 365 that is a slope provided on the inner circumference surface of first cylindrical portion 361 of regulation cylindrical member 360 is abutted to second ratchet holding portion 382 (specifically, nail plate 3821) of rotation portion 330. While regulation cylindrical member 360 is rotated along with rotation input section 310, and second ratchet holding portion 382 is abutted to trigger surface 365, second ratchet holding portion 382 is abutted to rotation regulation surface 3461. As a result, the rotation of rotation portion 330 is regulated, and rotation portion 330 does not rotate. In this manner, relative rotation is generated between transmission passive section 370 and rotation input section 310 integrated with rotation portion 330, and torque greater than the preload is accumulated in power accumulation portion 320.

When regulation cylindrical member 360 rotates along with the rotation of rotation input section 310, trigger surface 365 of regulation cylindrical member 360 pushes out second ratchet holding portion 382 from rotation regulation surface 3461 of regulation member 340 as shown in FIGS. 36A to 36D. Specifically, trigger surface 365 presses and folds the tip of nail plate 3821 of second ratchet holding portion 382 in the direction of shaft center C2. In this manner, nail plate 3821 is released from engaged rotation regulation surface 3461, and the regulation of the rotation of rotation portion 330 is eliminated.

In this case, the torque accumulated in power accumulation portion 320 through transmission passive section 370 acts on rotation portion 330, and rotation portion 330 is rotated and driven in the rotation direction of rotation input section 310 when the regulation is eliminated. The rotation angle of regulation cylindrical member 360 when the regulation of the turn of rotation portion 330 is eliminated is equal or substantially equal to the angle of the rotation of shift cam 110B when the gear is transmitted by one stage.

As a result, as shown in FIGS. 37A to 37D, rotation portion 330 transmits the torque to concave surfaces 138 of index cam 130B fixed to shift cam 110B through nail plate 3811 on one side in first ratchet holding portion 381 to rotate shift cam 110B. In this case, nail plate 3812 on the other side of first ratchet holding portion 381 is guided to the contour shape of first concave portion 344 of regulation member 340 and is folded in the direction of shaft center C2 along with the rotation of rotation portion 330.

Rotating rotation portion 330 stops rotating when nail plates 3811 and 3821 of first ratchet holding portion 381 and second ratchet holding portion 382 are abutted to stopper surfaces 3444 and 3464 of first concave portion 344 and second concave portion 346 of regulation member 340, respectively.

A convex portion protruding toward the center of regulation member 340 is provided on first concave portion 344 of regulation member 340, between stopper surfaces 3443 and 3444. The tip portion of nail plate 3811 of first ratchet holding portion 381 is abutted to side surface 3446 of the convex portion to prevent nail plate 3811 from being folded in the rotation axis center direction of rotation portion 330.

The rotational inertia of shift cam 110B and index cam 130B presses the tip portion of nail plate 3811 from side surface 1381 of concave surface 138 of index cam 130B toward the direction that rotation portion 330 is folded in the rotational axis center direction. However, the tip portion of nail plate 3811 is positioned between side surface 3446 of the convex portion and side surface 1381 of concave surface 138, and the turn of index cam 130B (shift cam 110B) is surely braked.

While index cam 130B (shift cam 110B) rotates from the state of FIGS. 36A to 36D to the state of FIGS. 37A to 37D, cam phase holding portion 450 presses the peripheral cam surface of index cam 130B in the direction of shaft center C2 through ball 456. When index cam 130B is rotated to the state of FIGS. 37A to 37D, cam phase holding portion 450 presses ball 456 against the concave portion of first gear "1", and shift cam 110B is converged and held in the phase of the first gear.

Shift actuator 81B rotates rotation input section 310 and regulation cylindrical member 360 up to a predetermined angle greater than the rotation angle of rotation portion 330 and then starts the reverse drive in the neutral position direction.

As a result, rotation input section 310 rotates in the opposite direction (neutral position direction). As shown in FIGS. 38A to 38D, transmission passive section 370 restricted by the torsion spring that is power accumulation portion 320 also rotates to return in the neutral position direction along with the rotation of rotation input section 310. In this case, cam phase holding portion 450 holds the phase of shift cam 110B through index cam 130B. In rotation portion 330 that rotates with transmission passive section 370, first ratchet holding portion 381 folds nail plate 3811 to exceed the peak portion between concave surfaces 138 of inner circumference surface 135a of index cam 130B and guides nail plate 3812 to be folded by the contour shape of first concave portion 344 of regulation member 340. Rotation portion 330 rotates while the transmission of the rotation to index cam 130B (specifically, concave surfaces 138) is cut off. Therefore, shift cam 110B cannot be rotated.

As shown in FIGS. 39A to 39D, shift actuator (motor) 81B rotates rotation portion 330 up to an angle that first ratchet holding portion 381 exceeds second (Q-th in the equation) concave surface 138 from concave surface 138 engaged first, after rotation input section 310 exceeds the neutral position to reversely drive. In this case, in rotation portion 330, second ratchet holding portion 382 is abutted to symmetrical rotation regulation surface 3462 across the turn shaft center relative to rotation regulation surface 3461 in second concave portion 346. As a result, the rotation of rotation portion 330 stops. Subsequently, motor 81B that is an actuator is driven in a direction to return rotation input section 310 to the neutral position (in the same direction as the original drive). Along with the drive, rotation input section 310 moves in the neutral position direction, and transmission passive section 370 and rotation portion 330 restricted by rotation input section 310 through the torsion spring that is power accumulation portion 320 also rotate in the direction for returning to the neutral positions.

In this manner, as shown in FIGS. 40A to 40D, each section of shift cam drive apparatus 300 returns to the neutral position after the transmission of the gear stage and enters the standby state.

The shift-up operations between the transmission stages of first speed→second speed→third speed→fourth speed→fifth speed→sixth speed are performed in the same way as the shift-up operation from N to first speed. Compared to the shift-up operations, the shift-down operations of sixth speed→fifth speed→fourth speed→third speed→second speed→first speed→N are performed in the opposition direction from the neutral position and performed symmetrically with the shift-up operations.

According to the third preferred embodiment, the same effects as in the first preferred embodiment are obtained. More specifically, according to the third preferred embodiment, even if the transmission apparatus is a bottom-neutral six-speed AMT with a large number of stages, the lead angle of the shift fork movement groove set in the shift cam does not have to be a steep slope compared to the six-speed MT. When the shift arm (including rotation input section 310) is moved to the rotation positions corresponding to the large number of stages, an increase in the torque to rotate the shift cam is significantly reduced or prevented, and the shift cam easily rotates to perform transmission to a desired gear stage.

Although the transmission apparatus according to the present preferred embodiment preferably is a bottom-neutral system with six-stage transmission, the transmission apparatus is not limited to this. The transmission apparatus may be a bottom-neutral system in which the maximum speed gear is the second stage, the third stage, the fourth stage, or the fifth stage, or the transmission apparatus may be a bottom-neutral system with seven or more stages.

Preferred embodiments of the present invention have been described. The foregoing description is an illustration of the preferred embodiments of the present invention, and the scope of the present invention is not limited to this. The description of the configuration of the apparatus and the shapes of the elements and portions is an example, and it is apparent that various changes and additions of the example can be made within the scope of the present invention.

The shift mechanism, the transmission apparatus, and the saddle-riding type vehicle according to the preferred embodiments of the present invention provide an advantageous effect that transmission is favorably performed without unnecessarily increasing the torque to turn a shift cam, even in a bottom-neutral system. The shift mechanism, the transmission apparatus, and the saddle-riding type vehicle are useful in a motorcycle, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A shift mechanism that intermittently rotates a shift cam in response to a transmission operation and holds the shift cam in each phase in an order of a neutral phase corresponding to a neutral position, a first gear phase corresponding to a first speed gear position, at least one subsequent gear phase corresponding to at least one subsequent speed gear position, and a maximum speed gear phase corresponding to a maximum speed gear position, the shift mechanism comprising:
an index cam fixed to one end of the shift cam, the index cam rotating integrally with the shift cam to position the shift cam in each of the phases;
a drive section that rotates the index cam; and
a cam phase holding portion that holds the shift cam in each of the phases; wherein
the index cam includes concave portions on a peripheral portion thereof, the concave portions are arranged in a circumferential direction corresponding to the respective phases in the order of the neutral position, the first speed gear position, the at least one subsequent speed gear position, and the maximum speed gear position that is a top speed gear position;
the concave portions are engaged with the cam phase holding portion to converge and to hold the shift cam in a predetermined phase; and
the concave portions are disposed on the peripheral portion of the index cam so that a rotation angle between the concave portions corresponding to the neutral position and the first speed gear position is the same as a rotation angle between the concave portions corresponding to the first speed gear position and a second speed gear position, and an angle between the concave portions corresponding to the maximum speed gear position and the neutral position is smaller than the rotation angle between the concave portions corresponding to the neutral position and the first speed gear position.

2. The shift mechanism according to claim 1, wherein the index cam includes engagement passive sections arranged in a circumferential direction for each of the angles corresponding to each of the phases, the engagement passive sections being engaged by the drive section and transmitted in the circumferential direction to rotate the shift cam; and
an angle R1 defined by an acute angle between the maximum speed gear phase and the neutral phase and an angle R2 defined by a rotation angle between the neutral phase and the first gear phase and that is the same as a rotation angle between each pair of adjacent phases from the first gear phase to the maximum speed gear phase are obtained by the following equations 1 to 4:

$$M = Q \times K - S \quad \text{(Equation 1)}$$

$$P = 360°/M \quad \text{(Equation 2)}$$

$$R2 = P \times Q \quad \text{(Equation 3)}$$

$$R1 = P \times S \quad \text{(Equation 4)}$$

where M denotes a total number of engagement passive sections, Q denotes a number of engagement passive sections advanced in transmission of each stage, K denotes a number of phases where the index cam stops turning between the first speed gear position and the maximum speed gear position including the neutral position (the number of gear stages+1), P denotes an arrangement interval of the engagement passive sections in the circumferential direction, and S denotes a natural number that indicates the number of engagement passive sections included in angle R1 and that is smaller than Q.

3. A transmission apparatus comprising:
the shift mechanism according to claim 1; and
the shift cam including one end to which the index cam of the shift mechanism is fixed, the shift cam including groove portions that move shift forks on a peripheral surface of the index cam, the shift cam rotating integrally with the index cam and is held by the cam phase holding portion in each of the phases to engage with a dog at a gear position corresponding to each of the phases through the shift forks.

4. A vehicle comprising the shift mechanism according to claim 1.

5. A transmission apparatus comprising:
a shift cam including groove portions that move shift forks on a peripheral surface thereof, the shift cam rotating in an order of a neutral phase corresponding to a neutral position, a first gear phase corresponding to a first speed gear position, at least one subsequent gear phase corresponding to at least one subsequent speed gear position, and a maximum speed gear phase corresponding to a maximum speed gear position that is a top speed gear position to change engagement of a dog corresponding to each phase through the shift forks; and a shift mechanism that intermittently rotates the shift cam in response to a transmission operation to hold the phase of the shift cam in each phase of a corresponding transmission stage in the order of the neutral position, the first speed gear position, the at least one subsequent speed gear position, and the maximum speed gear position; wherein the shift mechanism holds the shift cam in each phase angle in which a rotation angle between the neutral phase and the first gear phase is the same as a rotation angle between the first gear phase and a second gear phase, and an angle defined by an acute angle between the maximum speed gear phase and the neutral phase is smaller than the rotation angle between the neutral phase and the first gear phase.

\* \* \* \* \*